(12) United States Patent
Kataoka et al.

(10) Patent No.: US 9,954,416 B2
(45) Date of Patent: Apr. 24, 2018

(54) ACTUATOR, STATOR, MOTOR, ROTATIONAL-TO-LINEAR MOTION CONVERSION MECHANISM, AND LINEAR ACTUATOR

(75) Inventors: Takashi Kataoka, Fujisawa (JP); Yusuke Ota, Fujisawa (JP); Toshifumi Taguchi, Fujisawa (JP); Hayao Watanabe, Fujisawa (JP)

(73) Assignee: NSK LTD., Tokyo (JP)

( * ) Notice: Subject to any disclaimer, the term of this patent is extended or adjusted under 35 U.S.C. 154(b) by 825 days.

(21) Appl. No.: 14/377,364

(22) PCT Filed: Jun. 12, 2012

(86) PCT No.: PCT/JP2012/065021
§ 371 (c)(1),
(2), (4) Date: Aug. 7, 2014

(87) PCT Pub. No.: WO2013/118319
PCT Pub. Date: Aug. 15, 2013

(65) Prior Publication Data
US 2015/0015104 A1 Jan. 15, 2015

(30) Foreign Application Priority Data

Feb. 8, 2012 (JP) .................................. 2012-025323
Mar. 14, 2012 (JP) .................................. 2012-057745
Mar. 28, 2012 (JP) .................................. 2012-074938

(51) Int. Cl.
*H02K 7/06* (2006.01)
*H02K 16/02* (2006.01)
(Continued)

(52) U.S. Cl.
CPC ............... *H02K 7/06* (2013.01); *H02K 1/165* (2013.01); *H02K 16/02* (2013.01); *H02K 19/103* (2013.01); *H02K 21/12* (2013.01); *H02K 2201/18* (2013.01)

(58) Field of Classification Search
CPC .......... H02K 16/02; H02K 7/06; H02K 16/00; H02K 7/07; H02K 7/075; H02K 19/103;
(Continued)

(56) References Cited

U.S. PATENT DOCUMENTS 4,749,898 A 6/1988 Suzuki et al.
6,081,051 A 6/2000 Kitazawa et al.
(Continued)

FOREIGN PATENT DOCUMENTS

CN 1934770 A 3/2007
JP 63-92242 A 4/1988
(Continued)

OTHER PUBLICATIONS

Decision of a Patent Grant dated Jun. 16, 2015 from the Japanese Patent Office in counterpart application No. 2014-266132.
(Continued)

*Primary Examiner* — Michael Andrews
(74) *Attorney, Agent, or Firm* — Sughrue Mion, PLLC

(57) ABSTRACT

An actuator, a stator, a motor, a rotational-to-linear motion conversion mechanism, and a linear actuator are provided. The motor, the actuator, and the linear actuator at least include a screw shaft and a nut. The screw shaft is a rod-like member, and at least a part of the surface of the screw shaft has a thread. The nut is screwed onto the thread on the screw shaft, and moves the screw shaft in a linear motion direction that is a direction in parallel with a rotational center. The stator, the motor, the actuator, and the linear actuator can at least convert a rotational motion into a linear motion.

17 Claims, 34 Drawing Sheets

(51) Int. Cl.
*H02K 1/16* (2006.01)
*H02K 21/12* (2006.01)
*H02K 19/10* (2006.01)

(58) Field of Classification Search
CPC ........ H02K 21/12; H02K 41/02; H02K 41/00; H02K 2201/18
USPC ..................... 310/80, 114, 12.14, 12.15, 266
See application file for complete search history.

(56) References Cited

U.S. PATENT DOCUMENTS

| | | | |
|---|---|---|---|
| 7,626,299 B2 | 12/2009 | Yoshikawa et al. | |
| 2008/0127757 A1* | 6/2008 | Eberlein ................ | H02K 16/02 310/114 |
| 2008/0309179 A1* | 12/2008 | Eberlein ................ | H02K 16/02 310/80 |
| 2009/0072650 A1* | 3/2009 | Yoshikawa ............ | H02K 16/02 310/156.43 |
| 2010/0226802 A1* | 9/2010 | Kawamura ............ | H02K 16/02 310/114 |
| 2011/0181129 A1 | 7/2011 | Aso et al. | |
| 2015/0015104 A1 | 1/2015 | Kataoka et al. | |

FOREIGN PATENT DOCUMENTS

| | | |
|---|---|---|
| JP | 0279167 U | 6/1990 |
| JP | 03124770 U | 12/1991 |
| JP | 07-011870 U | 2/1995 |
| JP | 08-261208 A | 10/1996 |
| JP | 09-056010 A | 2/1997 |
| JP | 2000060159 A | 2/2000 |
| JP | 2000-220715 A | 8/2000 |
| JP | 2000-341904 A | 12/2000 |
| JP | 2002-156069 A | 5/2002 |
| JP | 2003-065416 A | 3/2003 |
| JP | 2003111351 A | 4/2003 |
| JP | 2004-332873 A | 11/2004 |
| JP | 2004312801 A | 11/2004 |
| JP | 2005-333728 A | 12/2005 |
| JP | 2007-259541 A | 10/2007 |
| JP | 2008-502297 A | 1/2008 |
| JP | 2010-057271 A | 3/2010 |
| JP | 2010166744 A | 7/2010 |
| JP | 2010-193578 A | 9/2010 |
| JP | 2011-188605 A | 9/2011 |
| JP | 5780352 B2 | 9/2015 |
| KR | 10-2011-0060968 A | 6/2011 |
| WO | 2005/122366 A1 | 12/2005 |
| WO | 2007/123107 A1 | 11/2007 |

OTHER PUBLICATIONS

Communication dated Jul. 5, 2016, issued by the Japan Patent Office in corresponding Japanese Application No. 2015-148069.
Machine translation of JP 2003-65416 A (published Mar. 5, 2003).
Communication dated Jul. 12, 2016, issued by the Japan Patent Office in corresponding Japanese Application No. 2015-133079.
Communication dated Nov. 8, 2016, from the Japanese Patent Office in counterpart Japanese application No. 2015-090645.
Machine Translation of JPH08-216208 published Aug. 27, 1996 previously disclosed on Aug. 7, 2014.
International Search Report of PCT/JP2012/065021 dated Sep. 11, 2012.
Communication dated Nov. 4, 2014 from the Japanese Patent Office in counterpart Japanese Patent Application No. 2013019950.
Communication dated May 13, 2016 from the State Intellectual Property Office of the P.R.C. issued in corresponding Application No. 201280069440.1.
Communication dated Mar. 6, 2018, issued by the Korean Patent Office in counterpart Korean application No. 10-2014-7022055.

\* cited by examiner

ACTUATOR, STATOR, MOTOR, ROTATIONAL-TO-LINEAR MOTION CONVERSION MECHANISM, AND LINEAR ACTUATOR

CROSS REFERENCE TO RELATED APPLICATIONS

This is a National Stage of International Application No. PCT/JP2012/065021 filed Jun. 12, 2012, claiming priority based on Japanese Patent Application No. 2012-025323 filed Feb. 8, 2012, Japanese Patent Application No. 2012-057745 filed Mar. 14, 2012, and Japanese Patent Application No. 2012-074938 filed Mar. 28, 2012, the contents of all of which are incorporated herein by reference in their entirety.

FIELD

The present invention relates to an actuator, a stator, a motor, a rotational-to-linear motion conversion mechanism, and a linear actuator.

BACKGROUND

Patent Literature 1, for example, discloses an actuator that uses a ball screw mechanism to convert a rotation of an electric motor into a linear motion by which a driven mechanism is caused to operate. Patent Literature 2 discloses a bidirectional actuator performing a rotational operation and a linear operation simultaneously so that a protruding end of the rotation shaft is caused to move rotationally and linearly smoothly along a given path.

Patent Literature 3, for example, discloses a dual rotor motor provided with a permanent magnet rotor serving as an inner rotor positioned most internally in the radial direction, and a rotor with a birdcage coil serving as an outer rotor positioned between the inner rotor and a stator positioned most externally in the radial direction.

The motor disclosed in Patent Literature 4 is provided with a stator including a stator core having a circular stator yoke, a plurality of inner teeth protruding toward radial interior from the stator yoke, a plurality of outer teeth provided in the same number as the inner teeth and protruding toward radial exterior from the stator yoke, inner slots formed between the inner teeth, and outer slots formed between the outer teeth. The stator also includes star-connected or delta-connected three-phase coils wound around the stator yoke between the inner slot and the outer slot.

Also available as linear actuators used in the field of industrial machinery such as those used in robots and conveyors are apparatuses for converting a rotational motion of a motor into a linear motion, and outputting the power in a linear motion direction. For example, the linear actuator disclosed in Patent Literature 5 is provided with a rotational-to-linear motion conversion mechanism including a nut having a threaded inner circumferential surface, a screw shaft having a threaded outer circumferential surface and onto which the nut is screwed, and a movement conversion mechanism for moving the shaft in axial direction upon receiving a rotational force from the nut, while restraining the rotation of the shaft. This actuator moves the screw shaft axially by rotating the nut in the rotational-to-linear motion conversion mechanism together with the rotor of the motor.

CITATION LIST

Patent Literature

Patent Literature 1: Japanese Patent Application Laid-open No. 2010-193578
Patent Literature 2: Japanese Patent Application Laid-open No. 8-261208
Patent Literature 3: Japanese Patent Application Laid-open No. 2010-057271
Patent Literature 4: International Publication WO2007/123107
Patent Literature 5: Japanese Patent Application Laid-open No. 2000-220715

SUMMARY

Technical Problem

The actuator disclosed in Patent Literature 1 requires another electric motor to communicate the rotational motion. The actuator disclosed in Patent Literature 2 moves the rotation shaft linearly and rotationally with a hydraulic piston sliding inside of a cylindrical tube, but the rotation of the rotor in the electric motor remains unused. It is also quite difficult for the actuator disclosed in Patent Literature 2 to take out only one of the linear motion and the rotational motion.

In the stators disclosed in Patent Literature 3 and Patent Literature 4, the outer and the inner teeth are both provided on the same back yoke. While this structure certainly has an advantage that the back yoke that is a core member can be manufactured with one mould, it is necessary to magnetize the outer teeth and the inner teeth separately in order to drive the inner rotor and the outer rotor independently in the stator disclosed in Patent Literature 3 and Patent Literature 4. In such a configuration, magnetic interference between the inner and the outer teeth might occur via the back yoke that is shared between the inner and the outer teeth. In the stator disclosed in Patent Literature 3 and Patent Literature 4, therefore, operations of the inner rotor or the outer rotor can become less accurate, because of the magnetic interference.

The linear actuator disclosed in Patent Literature 5 requires a linear motion guide for guiding the axial motion of the screw shaft while restraining the screw shaft rotation. Such a rotational-to-linear motion conversion mechanism thus requires an increased number of parts, which could increase the complexity of the mechanism.

The present invention is made in consideration of the above, and a first object of the present invention is to provide an actuator capable of communicating a rotational motion and a linear motion, as well as converting a rotational motion into a linear motion.

The present invention is made in consideration of the above, and a second object of the present invention is to provide a stator, a motor, and an actuator capable of improving a rotational accuracy of a first rotor positioned radially internal and relatively rotating, and of improving a rotational accuracy of a second rotor positioned radially external and relatively rotating.

The present invention is made in consideration of the above, and a third object of the present invention is to provide a rotational-to-linear motion conversion mechanism and a linear actuator capable of guiding a linear motion of the screw shaft with a simple structure.

Solution to Problem

In order to solve the above-mentioned problems and achieve the first object, it is characterized that an actuator includes: a stator including a magnetizing coil and a stator core; a housing on which the stator is fixed; a first rotor that is positioned radially internal to the stator and is rotated relatively to the stator; a screw shaft that is a rod-like member positioned at rotational center of the first rotor, at least a part of a surface of the screw shaft having a thread; a nut that is screwed onto the thread of the screw shaft and rotates with the first rotor to move the screw shaft in a linear motion direction that is a direction in parallel with the rotational center of the first rotor; and a second rotor that is positioned radially external to the stator and is rotated relatively to the stator.

With this structure, the actuator can convert a rotational motion into a linear motion, and communicate the rotational motion and the linear motion. The actuator can also communicate only the rotational motion. The actuator can also communicate only the linear motion, too. Because two electric motors, one for a rotational motion and the other for linear motion, are not required, the parts for connecting these two electric motors can be omitted, so that the actuator can be reduced in size. Because the number of parts is reduced, the actuator can improve reliability, save a space, and reduce costs.

As a preferable aspect, it is preferable that the actuator further includes: a first bearing that rotatably supports the first rotor with respect to the housing; and a second bearing that rotatably supports the second rotor with respect to first rotor.

With this structure, the first rotor and the second rotor can be rotated independently.

As a preferable aspect, it is preferable that the actuator further includes a preload mechanism that preloads the first bearing and the second bearing in a direction in parallel with the linear motion direction.

With this structure, the first rotor and the second rotor can be supported stably while the screw shaft is moved in the linear motion direction. Furthermore, a simple single-row bearing which alone cannot provide preloading can be used as the first bearing and the second bearing.

As a preferable aspect, it is preferable that the actuator further includes: a first bearing that rotatably supports the first rotor with respect to the housing; and a second bearing that rotatably supports the second rotor with respect to the housing.

With this structure, it is less likely for the first rotor to be affected by the reactive force received from the second rotor acting a starting frictional torque of the second bearing.

As a preferable aspect, it is preferable that the rotational center of the first rotor and the rotational center of the second rotor are positioned in parallel with and offset from each other.

This structure can restrain the screw shaft from being rotated by the rotating second rotor. The actuator can therefore not only convert a rotational motion into a linear motion, but also communicate at last one of the rotational motion and the linear motion. Furthermore, the actuator can reduce costs, because the number of components of members for restraining the rotation of the screw shaft can be reduced.

As a preferable aspect, it is preferable that the actuator further includes: a rotating body that is rotated with the second rotor; a flange that is fixed to the screw shaft; and a third bearing that rotatably supports the second rotor with respect to the flange.

With this structure, the rotating body can move in the linear motion direction while rotating.

As a preferable aspect, it is preferable that frictional torque of the second bearing is smaller than frictional torque of the third bearing.

With this structure, the screw shaft is less likely rotated by the rotation of the rotating body.

As a preferable aspect, it is preferable that the actuator according further includes a linear motion guiding mechanism that guides motion of the rotating body in the linear motion direction, wherein the linear motion guiding mechanism is rotated with the second rotor to cause the rotating body to rotate.

This structure can guide the linear motion of the screw shaft while communicating the rotation of the second rotor to the rotating body.

As a preferable aspect, it is preferable that the linear motion guiding mechanism becomes extended or shrunk correspondingly to a distance by which the screw shaft moves in the linear motion direction.

With this structure, the actuator can accommodate with a change in the distance between the rotating body and the second rotor, for example. Furthermore, the internal space of the actuator can be used effectively, so that the space can be saved.

As a preferable aspect, it is preferable that the rotating body includes a cylindrical portion having a larger radius from the rotational center of the second rotor than the radius of the second rotor, and the linear motion guiding mechanism is positioned between the cylindrical portion and the second rotor to guide motion of the cylindrical portion in the linear motion direction.

With this structure, the actuator can improve the stiffness of the rotating body, thereby allowing the moving operation to be stabilized. Furthermore, the internal space of the cylindrical portion can be used effectively, so that the actuator can save space.

As a preferable aspect, it is preferable that the actuator further includes a second linear motion guiding mechanism that guides motion of the screw shaft in the linear motion direction, in addition to the linear motion guiding mechanism serving as a first linear motion guiding mechanism, wherein the first linear motion guiding mechanism and the second linear motion guiding mechanism are positioned with the stator interposed between the first and second linear motion guiding mechanisms in the linear motion direction.

With this structure, the second linear motion guiding mechanism in the actuator can restrain the screw shaft from being rotated by the rotating second rotor. The actuator can therefore communicate at least one of the rotational motion and the linear motion, as well as convert a rotational motion into a linear motion.

As a preferable aspect, it is preferable that the screw shaft is moved in the linear motion direction relatively to the housing.

With this structure, the actuator can convert a rotational motion into a linear motion, and communicate the linear motion of the housing.

As a preferable aspect, it is preferable that the actuator further includes: a first bearing that rotatably supports the first rotor with respect to the housing; a rotating body that is rotated with the second rotor; a flange that is fixed to the screw shaft; and a third bearing that rotatably supports the second rotor with respect to the flange, wherein a rotor core of the second rotor has a length in the linear motion direction that is longer than that of the stator core in the linear motion direction.

With this structure, the actuator can keep the rotor core rotating even when the rotor core is moved in the linear motion direction. Furthermore, the actuator can reduce the number of bearings, so that the number of parts can be reduced. The production costs can therefore be reduced.

As a preferable aspect, it is preferable that wherein, when rotation of the second rotor causes the screw shaft to rotate, movement of the screw shaft in the linear motion direction is restrained by rotating the first rotor and the second rotor reversely, while rotational motion of the second rotor is communicated.

With this structure, the actuator can stop the screw shaft at a given position in the linear motion direction, or move the screw shaft up or down in the linear motion direction at a given speed, even while the screw shaft is rotated by the rotation of the second rotor.

As a preferable aspect, it is preferable that the stator includes: a circular back yoke including: a plurality of slits that are voids arranged in a circumferential direction; an inner back yoke that is radially internal to the slits; an outer back yoke that is radially external to the slits; and a connecting portion that connects the inner back yoke and the outer back yoke and is provided between adjacent slits in the circumferential direction; a plurality of inner teeth circumferentially provided and protruding from the inner back yoke toward radial interior; and a plurality of outer teeth circumferentially provided and protruding from the outer back yoke toward radial exterior.

With this structure, because the voids are provided between the inner back yoke and the outer back yoke, the magnetic resistance is increased, so that the stator is less affected by the magnetic interference between the inner back yoke and the outer back yoke. As a result, it becomes less likely for the magnetic field generated in the outer teeth to interfere with the magnetic field generated in the inner teeth, and vice versa. Although the outer teeth and the inner teeth are separately magnetized when the actuator drives the first rotor that is positioned radially internal and relatively rotating independently from the second rotor that is positioned radially external and relatively rotating, it becomes less likely for these teeth to be affected by each other, so that the rotational accuracies of the first rotor and the second rotor can be improved.

With this structure, the circular back yoke, the inner teeth, and the outer teeth can be manufactured with one mould. The stator of this actuator can therefore reduce the mould cost. Furthermore, with this structure, the assembly costs of the stator can be reduced, so that the cost reduction of the stator can be promoted. Furthermore, because the stator can be manufactured with one mould, the hours required in stamping can be reduced as well. Furthermore, this actuator can be assembled simply by mounting the back yoke on which the outer teeth and the inner teeth are both provided, so that the hours required in the assembling can also be reduced.

With this structure, because the slits enable the back yoke to be a hollow structure, the stator can be reduced in weight. Furthermore, because the slits can be used as spaces for enclosing the connections of the magnetizing coils or the like, the connections can be prevented from sticking out, so that actuator can be reduced in size.

With this structure, the actuator can convert a rotational motion into a linear motion, and communicate the rotational motion and the linear motion. The actuator can also communicate only the rotational motion. Furthermore, the actuator can communicate only the linear motion, too. Because two stators, one for the electric motor for a rotational motion and the other for the electric motor for a linear motion, are not required, parts for connecting these two electric motors are rendered unnecessary. Hence, the actuator can be reduced in size. Because the number of parts is thus reduced, the actuator can improve reliability, save a space, and enables a further cost reduction.

As a preferable aspect, it is preferable that the inner teeth and the outer teeth on a radial extension are separated by the voids of the slits.

With this structure, because the outer teeth and the inner teeth are separated by the voids, it becomes less likely for these teeth to be affected by each other even when the outer teeth and the inner teeth are separately magnetized. The rotational accuracies of the first rotor and the second rotor can thus be improved.

As a preferable aspect, it is preferable that the slits extend circumferentially toward a base portion of an inner tooth and a base portion of an outer tooth that are adjacent to the inner tooth and the outer tooth on a radial extension.

With this structure, because the outer teeth and the inner teeth are separated by the voids extending in the circumferential direction, it becomes less likely for these teeth to be affected by each other, even when the outer teeth and the inner teeth are separately magnetized. The rotational accuracies of the first rotor and the second rotor can thus be improved.

As a preferable aspect, it is preferable that a circumferential width of the slits is longer than a circumferential width of the connecting portion.

With this structure, even when the outer teeth and the inner teeth are separately magnetized, it becomes less likely for these teeth to be affected by each other, because the circumferential width of the connecting portion is smaller. The rotational accuracies of the first rotor and the second rotor can therefore be improved.

As a preferable aspect, it is preferable that magnetic fluxes generated in the inner teeth or the outer teeth saturate at the connecting portion.

With this structure, even when the outer teeth and the inner teeth are separately magnetized, the actuator can reduce the possibility of these teeth being affected by each other, so that the rotational accuracies of the first rotor and the second rotor can be improved.

As a preferable aspect, it is preferable that a through-hole for fixing the stator is provided between adjacent slits in the circumferential direction.

As a preferable aspect, it is preferable that the rotational center of the first rotor is provided at a position offset from and extends in parallel with the rotational center of the second rotor, the stator includes: a circular back yoke; a plurality of inner teeth circumferentially provided and protruding from the back yoke toward radial interior; and a plurality of outer teeth circumferentially provided and protruding from the back yoke toward radial exterior, center of an outer circumferential circle that circumferentially connects most radially outer points of the outer teeth matches one of the rotational centers of the first rotor and the second rotor, and center of an inner circumferential circle that circumferentially connects most radially inner positions of the inner teeth matches the other of the rotational centers of the first rotor and the second rotor.

With this structure, the screw shaft can be restrained from being rotated by the rotating second rotor. The actuator can therefore communicate at least one of the rotational motion and the linear motion, as well as convert a rotational motion into a linear motion. Furthermore, the actuator can reduce costs, because the number of components of members for restraining the screw shaft from being rotated can be reduced.

As a preferable aspect, it is preferable that a radial width of the back yoke remains constant while a length by which the inner teeth or the outer teeth protrude varies in the circumferential direction.

With this structure, the center of the outer circumferential arc that circumferentially connects the most radially outer points of the outer teeth can be matched with the rotational center of the second rotor, and the center of the inner circumferential arc that circumferentially connects the most radially inner points of the inner teeth can be matched with the rotational center of the first rotor.

As a preferable aspect, it is preferable that a radial width of the back yoke varies in the circumferential direction while a length by which the inner teeth or the outer teeth protrude remains same in the circumferential direction.

With this structure, the center of the outer circumferential arc that circumferentially connects the most radially outer points of the outer teeth be matched with the rotational center of the second rotor, and the center of the inner circumferential arc that circumferentially connects the most radially inner points of the inner teeth can be matched with the rotational center of the first rotor.

As a preferable aspect, it is preferable that the back yoke comprises: a plurality of slits that are voids arranged in a circumferential direction; an inner back yoke that is radially internal to the slits; an outer back yoke that is radially external to the slits; and a connecting portion that connects the inner back yoke and the outer back yoke and is provided between adjacent slits in the circumferential direction, wherein a radial width of the slits is changed correspondingly to a radial width of the back yoke.

With this structure, because the radial width of the slits is changed correspondingly to the radial width of the back yoke, a uniform circumferential magnetic flux distribution can be achieved across the back yoke. The rotational accuracies of the first rotor and the second rotor can therefore be improved.

With this structure, because the same through-holes can be used for fixing the outer teeth and the inner teeth, the radial thickness of the back yoke can be reduced, thereby allowing the stator to be reduced in size. The actuator can therefore be reduced in size.

As a preferable aspect, it is preferable that the actuator further includes a linear motion guiding shaft that guides motion of the rotating body in the linear motion direction, wherein the linear motion guiding shaft has an axial line that is decentered with respect to and extends in parallel with an axial line of the screw shaft.

With this structure, even when the screw shaft receives a rotational force of the nut, the rotation of the screw shaft about the axial line of the screw shaft can be restrained, because the axial line of the screw shaft is decentered with respect to the axial line of the linear motion guiding shaft. Furthermore, because the linear motion guiding shaft is supported movably in the linear motion direction, the screw shaft can be moved linearly in the axial direction. The actuator can therefore guide the linear motion of the screw shaft without increasing the number of parts.

As a preferable aspect, it is preferable that the linear motion guiding shaft is provided in a manner projecting from both ends of the axial direction of the screw shaft.

As a preferable aspect, it is preferable that a distance by which the axial line of the linear motion guiding shaft is decentered with respect to the axial line of the screw shaft is larger than a radius of the screw shaft.

As a preferable aspect, it is preferable that a plurality of linear motion guiding shafts decentered with respect to and extending in parallel with the axial line of the screw shaft are provided to at least one of one end and the other end of the screw shaft in the axial direction.

In order to solve the above-mentioned problems and achieve the second object, a stator includes: a circular back yoke including: a plurality of slits that are voids arranged in a circumferential direction; an inner back yoke that is radially internal to the slits; an outer back yoke that is radially external to the slits; and a connecting portion that connects the inner back yoke and the outer back yoke and is provided between adjacent slits in the circumferential direction; a plurality of inner teeth circumferentially provided and protruding from the inner back yoke toward radial interior; and a plurality of outer teeth circumferentially provided and protruding from the outer back yoke toward radial exterior.

With this structure, because the voids are provided between the inner back yoke and the outer back yoke, the magnetic resistance is increased, so that the stator is less affected by the magnetic interference between the inner back yoke and the outer back yoke. As a result, it becomes less likely for the magnetic field generated in the outer teeth to interfere with the magnetic field generated in the inner teeth, and vice versa. Although the outer teeth and the inner teeth are separately magnetized when the actuator drives the first rotor positioned radially internal and relatively rotating independently from the second rotor positioned radially external and relatively rotating, it becomes less likely for these teeth to be affected by each other, so that the rotational accuracies of the first rotor and the second rotor can be improved.

With this structure, the circular back yoke, the inner teeth, and the outer teeth can be manufactured with one mould. The stator can therefore reduce the mould cost. Furthermore, with this structure, because the stator assembly cost can be reduced, the cost reduction of the stator can be promoted. Furthermore, because the stator can be manufactured with one mould, the hours required in stamping can be reduced as well.

With this structure, because the slits enable the back yoke to be a hollow structure, the stator can be reduced in weight. Furthermore, because the slits can be used as spaces for enclosing the connections of the magnetizing coils or the like, the connections can be prevented from sticking out, so that the motor or the actuator can be reduced in size.

As a preferable aspect, it is preferable that the inner teeth and the outer tooth on a radial extension are separated by the voids of the slits.

With this structure, because the outer teeth and the inner teeth are separated by the voids, it becomes less likely for these teeth to be affected by each other even when the outer teeth and the inner teeth are separately magnetized, so that the rotational accuracies of the first rotor and the second rotor can be improved.

As a preferable aspect, it is preferable that the slits extend circumferentially toward a base portion of an inner tooth and a base portion of an outer tooth that are adjacent to the inner tooth and the outer tooth on a radial extension.

With this structure, because the outer teeth and the inner teeth are separated by the voids extending in the circumferential direction, it becomes less likely for these teeth to be affected by each other, even when the outer teeth and the inner teeth are separately magnetized, so that the rotational accuracies of the first rotor and the second rotor can be improved.

As a preferable aspect, it is preferable that a circumferential width of the slits is longer than a circumferential width of the connecting portion.

With this structure, even when the outer teeth and the inner teeth are separately magnetized, it becomes less likely for these teeth to be affected by each other, because the circumferential width of the connecting portion is smaller, so that the rotational accuracies of the first rotor and the second rotor can be improved.

As a preferable aspect, it is preferable that magnetic fluxes generated in the inner teeth or the outer teeth saturate at the connecting portion.

With this structure, even when the outer teeth and the inner teeth are separately magnetized, it becomes less likely for these teeth to be affected by each other, so that the rotational accuracies of the first rotor and the second rotor can be improved.

As a preferable aspect, it is preferable that a through-hole for fixing the stator is provided between adjacent slits in the circumferential direction.

With this structure, because the same through-holes can be used for fixing the outer teeth and the inner teeth, the radial thickness of the back yoke can be reduced.

In order to solve the above-mentioned problems and achieve the second object, a motor includes: a stator including a magnetizing coil and a stator core; a housing to which the stator is fixed; a first rotor that is positioned radially internal to the stator, and rotates relatively to the stator; and a second rotor that is positioned radially external to the stator, and rotates relatively to the stator, wherein the stator includes: a circular back yoke including: a plurality of slits that are voids arranged in a circumferential direction; an inner back yoke that is radially internal to the slits; an outer back yoke that is radially external to the slits; and a connecting portion that connects the inner back yoke and the outer back yoke and is provided between adjacent slits in the circumferential direction; a plurality of inner teeth circumferentially provided and protruding from the inner back yoke toward radial interior; and a plurality of outer teeth circumferentially provided and protruding from the outer back yoke toward radial exterior.

With this structure, because the voids are provided between the inner back yoke and the outer back yoke, the magnetic resistance is increased, so that the stator is less affected by the magnetic interference between the inner back yoke and the outer back yoke. As a result, it becomes less likely for the magnetic field generated in the outer teeth to interfere with the magnetic field generated in the inner teeth, and vice versa. Although the outer teeth and the inner teeth are separately magnetized when the motor drives the first rotor positioned radially internal and relatively rotating independently from the second rotor positioned radially external and relatively rotating, it becomes less likely for these teeth to be affected by each other, so that the rotational accuracies of the first rotor and the second rotor can be improved.

With this structure, the circular back yoke, the inner teeth, and the outer teeth can be manufactured with one mould. The stator of the motor can therefore reduce the mould cost. Furthermore, with this structure, the stator assembly cost can be reduced, so that the cost reduction of the stator can be promoted. Furthermore, because the stator can be manufactured with one mould, the hours required in stamping can be reduced as well. Furthermore, this motor can be assembled simply by mounting the back yoke on which the outer teeth and the inner teeth are both provided, the hours required in the assembling can also be reduced.

With this structure, because the slits enable the back yoke to be a hollow structure, the stator can be reduced in weight. Furthermore, because the slits can be used as spaces for enclosing the connections of the magnetizing coils or the like, the connections can be prevented from sticking out, so that the motor can be reduced in size.

As a preferable aspect, it is preferable that the inner teeth and the outer teeth on a radial extension are separated by the voids of the slits.

With this structure, even when the outer teeth and the inner teeth are separately magnetized, it becomes less likely for these teeth to be affected by each other, because the outer teeth and the inner teeth are separated by the voids. The rotational accuracies of the first rotor and the second rotor can thus be improved.

As a preferable aspect, it is preferable that the slits extend circumferentially toward a base portion of an inner tooth and a base portion of an outer tooth that are adjacent to the inner tooth and the outer tooth on a radial extension.

With this structure, because the outer teeth and the inner teeth are separated by the voids extending in the circumferential direction, it becomes less likely for these teeth to be affected by each other, even when the outer teeth and the inner teeth are separately magnetized, so that the rotational accuracies of the first rotor and the second rotor can be improved.

As a preferable aspect, it is preferable that a circumferential width of the slits is longer than a circumferential width of the connecting portion.

With this structure, even when the outer teeth and the inner teeth are separately magnetized, it becomes less likely for these teeth to be affected by each other, because the circumferential width of the connecting portion is smaller. The rotational accuracies of the first rotor and the second rotor can therefore be improved.

As a preferable aspect, it is preferable that magnetic fluxes generated in the inner teeth or the outer teeth saturate at the connecting portion.

With this structure, even when the outer teeth and the inner teeth are separately magnetized, the motor can reduce the possibility of these teeth being affected by each other, so that the rotational accuracies of the first rotor and the second rotor can be improved.

As a preferable aspect, it is preferable that a through-hole for fixing the stator is provided between adjacent slits in the circumferential direction.

With this structure, because the same through-holes can be used for fixing the outer teeth and the inner teeth, the radial thickness of the back yoke can be reduced, thereby allowing the stator to be reduced in size. The motor can therefore be reduced in size.

In order to solve the above-mentioned problems and achieve the third object, a rotational-to-linear motion conversion mechanism includes: a screw shaft; a nut having an inner circumferential surface screwed onto an outer circumferential surface of the screw shaft; a linear motion guiding shaft that is provided in a manner projecting from an axial end of the screw shaft; a casing that houses therein the screw shaft and the nut; and a bearing holder that is provided as a part of the casing and supports an axial movement of the linear motion guiding shaft via a thrust bearing member, wherein a rotational force communicated from a rotation driving unit to the nut is further communicated to the screw shaft as a linear motion while rotation of the screw shaft is restrained, and the linear motion guiding shaft has an axial line that is decentered with respect to and extends in parallel with an axial line of the screw shaft.

With this rotational-to-linear motion conversion mechanism, because the axial line of the screw shaft is decentered with respect to the axial line of the linear motion guiding shaft, the rotation of the screw shaft about the axial line of the screw shaft can be restrained, even when a rotational force of the nut is communicated to the screw shaft. In addition, because the linear motion guiding shaft is supported movably in the axial direction by the thrust bearing member, the screw shaft moves linearly in the axial direction. The linear motion of the screw shaft can thus be guided with a simple structure, and without increasing the number of parts.

As a preferable aspect, it is preferable that the linear motion guiding shaft is provided in a manner projecting from both axial ends of the screw shaft.

As a preferable aspect, it is preferable that a distance by which the axial line of the linear motion guiding shaft is decentered with respect to the axial line of the screw shaft is larger than a radius of the screw shaft.

As a preferable aspect, it is preferable that a plurality of linear motion guiding shafts decentered with respect to and extending in parallel with the axial line of the screw shaft are provided in a manner projecting from any one of one end and the other end of the screw shaft in the axial direction or both.

As a preferable aspect, it is preferable that a linear actuator includes the rotational-to-linear motion conversion mechanism, wherein a rotational motion communicated from the rotation driving unit to the nut is converted into and output as a linear motion of the linear motion guiding shaft.

With this linear actuator, because the axial line of the screw shaft is decentered with respect to the axial line of the linear motion guiding shaft, the linear motion guiding shaft is radially preloaded, so that the radial stiffness can be improved. The linear motion guiding shaft is thus allowed to move in the linear motion direction smoothly.

Advantageous Effects of Invention

According to the present invention, an actuator capable of converting a rotational motion into a linear motion, and communicating the rotational motion and the linear motion can be provided. Furthermore, according to the present invention, a stator, a motor, and an actuator capable of improving the rotational accuracy of the first rotor positioned radially internal and relatively rotating and the rotational accuracy of the second rotor positioned radially external and relatively rotating can be provided. Furthermore, according to the present invention, a rotational-to-linear motion conversion mechanism and a linear actuator capable of guiding a linear motion of the screw shaft smoothly with a simple structure can be provided.

DESCRIPTION OF EMBODIMENTS

Embodiments of the present invention will now be explained in detail with reference to some drawings. The embodiments described hereunder are not intended to limit the scope of the present invention in any way. The elements described hereunder include those that can be easily thought of by those skilled in the art, and those that are substantially the same. The elements described hereunder may be combined as appropriate.

First Embodiment

Figure 1:
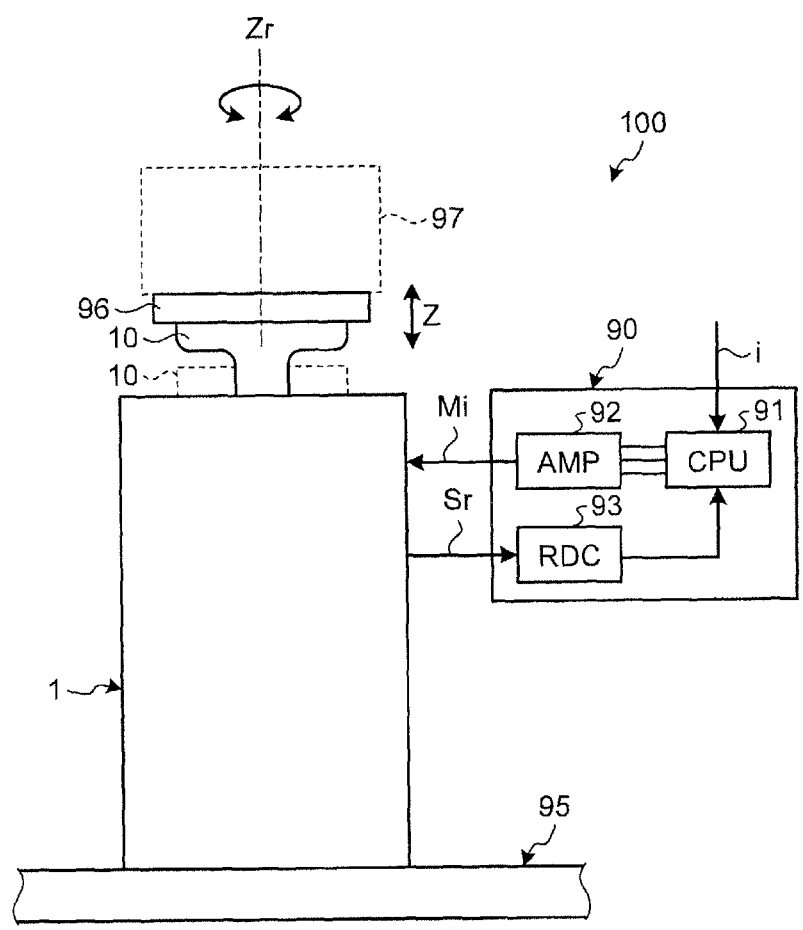
FIG. 1 is a schematic illustrating a general structure of an actuator device according to a first embodiment of the present invention.

FIG. 1 is a schematic illustrating a general structure of an actuator device according to a first embodiment of the present invention. As illustrated in FIG. 1, this actuator device 100 includes an actuator 1 and a controller (motor controlling circuit) 90. The actuator 1 has a housing a part of which is fixed to a support 95 with fasteners. Examples of the fasteners include screws, bolts, and pins. The actuator 1 is thus fixed to the support 95. A rotating body (rotated body) 10 of the actuator 1 is moved rotationally about a rotational center Zr, and linearly in a linear motion direction (in a Z direction in parallel with the rotational center Zr). The actuator 1 can move the rotating body 10 from the position in a dotted line to the position in a solid line, for example. The actuator 1 can also move the rotating body 10 reversely, from the position in the solid line to the position in the dotted line. A structure of the actuator 1 will be described later. The controller 90 is a device that controls driving of the actuator 1.

The controller 90 controls the directions and the speed of the rotation of the actuator 1 by controlling the amplitude, the frequency, and the waveform of the current and the voltage to be supplied to the actuator 1, and controls the direction and the speed of a linear motion of a movable element moving linearly. When a rotation instruction i is received from an external computer, for example, the controller 90 causes a central processing unit (CPU) 91 to output a driving signal to a three-phase amplifier (AMP) 92, and the AMP 92 is caused to supply a driving current Mi to the actuator 1. The actuator 1 receiving the driving current Mi moves a workpiece 97 by rotating a loaded table 96. When the loaded table 96 is rotated, an angle detector such as a resolver described later detects the rotation angle, and outputs a detection signal (resolver signal) Sr. The controller 90 then causes a resolver-to-digital converter (RDC) 93 to convert the detection signal Sr into digital information. Based on the digital information of the detection signal Sr received from the RDC 93, the CPU 91 determines if the workpiece 97 has reached the instructed position. If the workpiece 97 has reached the instructed position, the CPU 91 stops outputting the driving signal to the AMP 92.

The workpiece 97 is placed on the rotating body 10 via the loaded table 96. The workpiece 97 may be positioned directly on top of the rotating body 10, without using the loaded table 96. The actuator device 100 can move the workpiece 97 or the loaded table 96 by causing the controller 90 to control the operation of the actuator 1, thereby causing the actuator 1 to move the rotating body 10 linearly (in the direction of arrow Z in FIG. 1).

Figure 2:
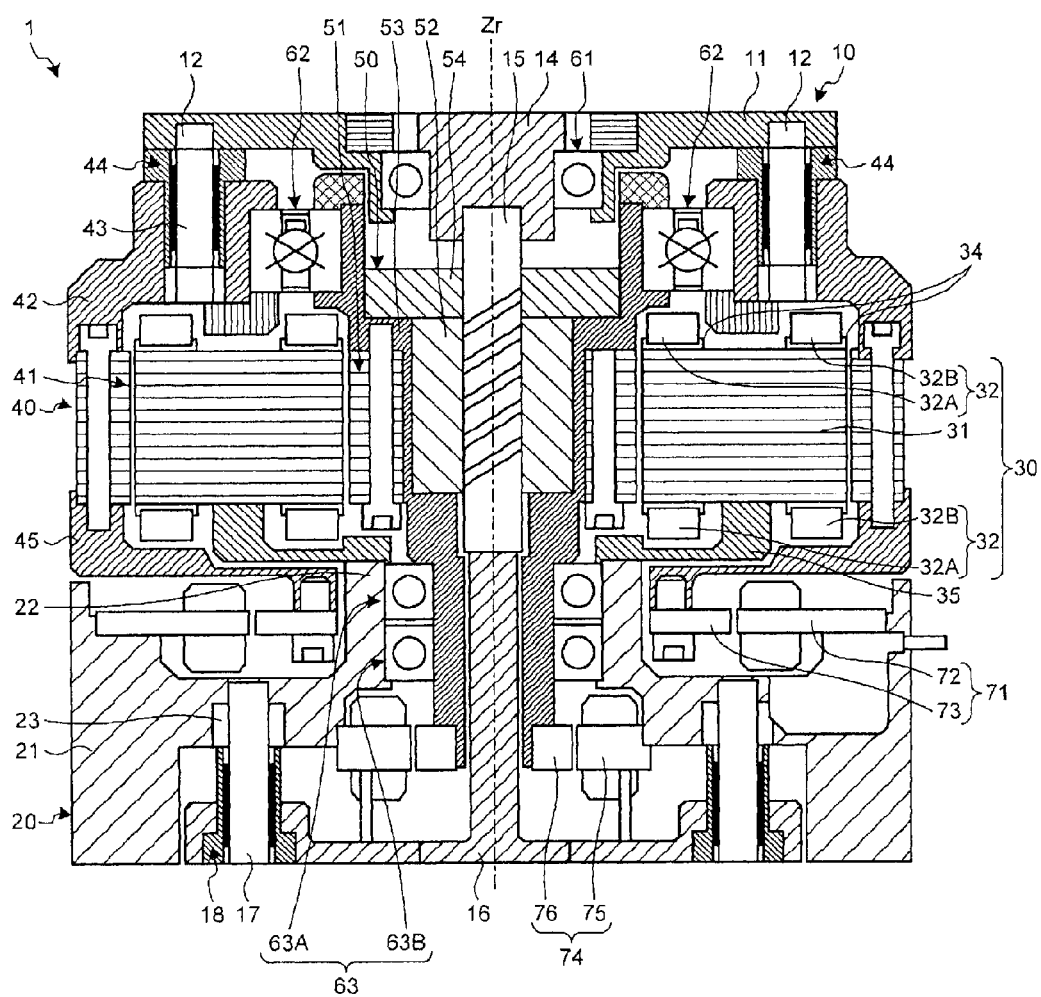
FIG. 2 is a schematic cross-sectional view taken along a virtual plane including a rotational center in an actuator according to the first embodiment.
Figure 3:
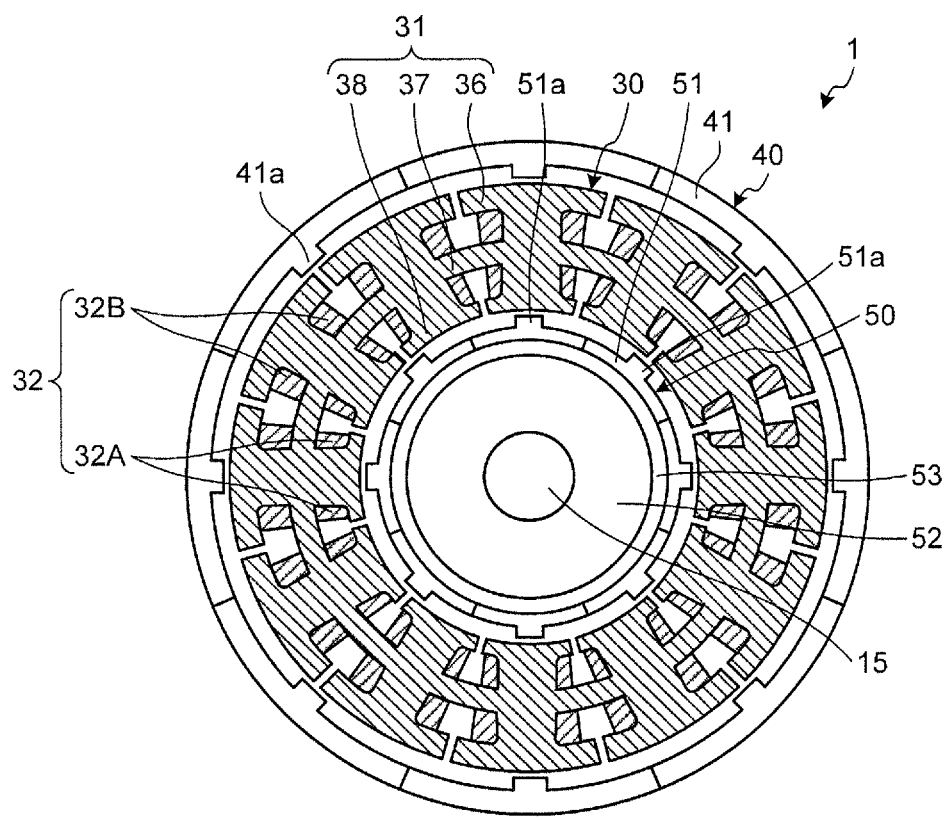
FIG. 3 is a schematic cross-sectional view taken along a virtual plane that is perpendicular to the rotational center in a first rotor, a second rotor, and a stator in the structure of the actuator according to the first embodiment illustrated in FIG. 2.

A structure of the actuator 1 will now be explained with reference to FIGS. 2 and 3. FIG. 2 is a schematic cross-sectional view taken along a virtual plane including a rotational center in an actuator according to the first embodiment. FIG. 3 is a schematic cross-sectional view taken along a virtual plane that is perpendicular to the rotational center in the first rotor, the second rotor, and the stator in the structure of the actuator according to the first embodiment illustrated in FIG. 2.

As illustrated in FIG. 2, the actuator 1 is what is called a brushless motor, and includes a ball screw shaft 15, a stator 30 kept at a fixed position, a first rotor 50 and a second rotor 40 that are two rotors provided rotatably with respect to the stator 30, a housing 20 mounted on the support 95 and to which the stator 30 is fixed, and a nut 52 fixed to the first rotor 50 and screwed onto the ball screw shaft 15.

The ball screw shaft 15 is a rod-like member positioned at the rotational center Zr of the first rotor 50. The ball screw shaft 15 has different shapes depending on the sections in the direction in which the rod-like member extends, that is, a direction in parallel with the rotational center Zr (linear motion direction). Specifically, the ball screw shaft 15 is a screw shaft of which central section near the center of the ball screw shaft 15 is threaded. The thread on the ball screw shaft 15 is provided longer than the length of the nut 52, in a direction in parallel with the rotational center Zr. A flange 14 is fixed to one end of the ball screw shaft 15, and a stopper 16 is fixed to the other end. The flange 14 and the stopper 16 moves in directions in parallel with the rotational center Zr (linear motion direction), following the movement of the ball screw shaft 15. The balls are filled and roll between the ball screw shaft 15 and the nut 52 to reduce the friction, so that the actuator 1 can improve the efficiency of conversion of a rotational motion into a linear motion.

The actuator 1 according to the first embodiment may use other types of screw shafts instead of the ball screw shaft 15. Examples of the other type of screw shafts include those with a trapezoidal thread and a triangular thread. When another type of a screw shaft such as that with a trapezoidal or a triangular thread is used instead of the ball screw shaft 15, the screw shaft can be restrained from moving in the reverse direction by means of the frictional force generated between the thread of the trapezoidal or triangular thread shaft and the nut engaging with the thread. Because reversal motion of the screw shaft is restrained, the actuator 1 can minimize the rotating torque to be generated in the first rotor 50. Such a screw shaft can also maintain its position even when the actuator 1 stops magnetizing the magnetizing coils 32A giving the rotating torque to the first rotor 50, for example.

On the outer circumference of the flange 14, a third bearing 61 rotatably supporting the second rotor 40 is provided. The stopper 16 is provided with linear bushes 18 into each of which a slider 17 are inserted, at positions where the stopper 16 overlap with the housing 20 that is positioned radially outer, in a view in a direction in parallel with the rotational center Zr (linear motion direction). The linear bushes 18 are capable of linearly guiding the sliders 17. Inside of the linear bush 18, a plurality of roller grooves are provided to allow the slider 17 to be supported via spherical rolling elements. The linear bush 18 may also be a sliding bearing such as an oil-impregnated bearing made from a porous material impregnated with oil.

In the actuator 1 according to the first embodiment, as an example, four linear motion guiding mechanisms, each of which is a combination of the slider 17 and the linear bush 18, are provided along the circumferential direction of the housing 20. The linear motion guiding mechanism such as the slider 17 and the linear bush 18 may be provided at least one in the circumferential direction of the housing 20. When a plurality of linear motion guiding mechanisms are provided, it is preferable for the linear motion guiding mechanisms to be provided at a given interval along the circumferential direction of the housing 20. It is more preferable that a plurality of linear motion guiding mechanisms be provided at an equal interval along the circumferential direction of the housing 20.

The actuator 1 according to the first embodiment may have a structure in which the slider 17 is fixed to the stopper 16, and the housing 20 has the linear bush 18 into which the slider 17 is inserted.

Because the actuator 1 has a structure including the rotating body 10 rotating with the second rotor 40, the flange 14 fixed to the ball screw shaft 15, and the third bearing 61 supporting the second rotor 40 rotatably with respect to the flange 14, the actuator 1 can linearly move and rotate the rotating body 10 at the same time.

The rotating body 10 has its rotational center at the rotational center Zr. In the actuator 1 according to the first embodiment, the rotating body 10 is a disk-like plate 11, and capable of rotating integrally with a second rotor bracket 42 provided on the outer circumference of the rotating body 10. The actuator 1 also includes, for example, sliders 43 that restrain the position to which the rotating body 10 is permitted to slide the linear motion direction. The sliders 43 are fixed to the plate 11, which is the rotating body 10, with fixing members 12 such as bolts, and inserted into respective linear bushes 44 in the second rotor bracket 42. The linear bushes 44 are capable of linearly guiding the sliders 43. A plurality of roller grooves are provided in the linear bush 44, and the linear bush 44 supports the slider 43 via spherical rolling elements. The linear bush 44 may also be a sliding bearing such as an oil-impregnated bearing made from a porous material impregnated with oil.

The sliders 43 are rotated with the second rotor bracket 42 provided to the second rotor 40, thereby causing the rotating body 10 to rotate. The linear motion guiding mechanism including the sliders 43 and guiding the linear motion of the rotating body 10 is rotated with the second rotor 40. With this structure, the rotation of the second rotor 40 can be communicated to the rotating body 10 even when the rotating body 10 being rotated is moved linearly.

In the actuator 1 according to the first embodiment, as an example, four linear motion guiding mechanisms, each of which is a combination of the slider 43 and the linear bush 44, are provided in the circumferential direction of the rotating body 10. The linear motion guiding mechanism such as the slider 43 and the linear bush 44 may be provided at least one in the circumferential direction of the rotating body 10. When a plurality of linear motion guiding mechanisms are provided, it is preferable for the linear motion guiding mechanisms to be provided at a given interval along the circumferential direction of the rotating body 10. It is more preferable that a plurality of linear motion guiding mechanisms be provided at an equal interval along the circumferential direction of the rotating body 10. With such a structure, the rotating body 10 can be kept equally balanced when the rotating body 10 is rotated.

The actuator 1 according to the first embodiment may have a structure in which the slider 43 is fixed to the second rotor bracket 42, and the plate 11 serving as the rotating body 10 has the linear bush 44 into which the sliders 43 is inserted.

The housing 20, the rotating body 10, the second rotor 40, and the stator 30 all have a circular structure. The rotating body 10, the first rotor 50, the second rotor 40, and the stator 30 are positioned coaxially, with the center at the rotational center Zr. In the actuator 1, the ball screw shaft 15, the nut 52, the first rotor 50, the stator 30, and the second rotor 40 are positioned in the order listed herein, radially from the rotational center Zr toward the exterior. In the actuator 1, the rotating body 10, the first rotor 50, the second rotor 40, and the stator 30 are positioned above the housing 20. The first rotor 50 is positioned radially internal to the stator 30, and capable of rotating relatively to the stator 30. The second rotor 40 is positioned radially external to the stator 30, and is capable of rotating relatively to the stator 30.

The housing 20 includes a hollow, disk-like housing base 21, a housing inner protrusion 22, and recesses 23 formed on one end of the housing base 21 (the end on the opposite side of where the stator 30 is provided). Each of the sliders 17 is fixed inside of the corresponding recess 23. The housing inner protrusion 22 is a concentric circular protrusion provided surrounding the rotational center Zr and protruding from the inner circumferential side of the disk-like housing base 21.

As mentioned earlier, the stopper 16 moves in the direction in parallel with the rotational center Zr (linear motion direction), following the movement of the ball screw shaft 15. Because the sliders 17 are inserted in the respective linear bushes 18, vibrations in the linear motion direction can be reduced. Each of the linear bushes 18 is inserted into the corresponding recess 23. The recess 23 is a hole into which the corresponding linear bush 18 escapes so that the linear motion of the stopper 16 is not interfered. The recess 23 may be therefore a groove.

The stator 30 is fixed to the housing base 21. A first bearing 63 for supporting the first rotor 50 rotatably with respect to the housing 20 is fixed to the inner wall of the hollow in the housing inner protrusion 22. The first bearing 63 includes a first bearing 63A and another first bearing 63B that together form a back-to-back duplex bearing. A support member 35 on which the stator 30 is fixed is provided connected to the housing inner protrusion 22. Examples of magnetic materials of which the housing base 21 is made include general steel such as a steel plate cold commercial (SPCC) and electromagnetic soft iron.

The first rotor 50 includes a rotor core 51, a first rotor bracket 53, and a fixing member 54. The fixing member 54 has a hole into which the ball screw shaft 15 can be inserted. The fixing member 54 is a substantially disk-like member for closing one open end of the first rotor bracket 53, and connects the first rotor bracket 53 to the nut 52. The fixing member 54 may be a member integrated with the nut 52. The rotor core 51 is fixed on the outer circumference of the first rotor bracket 53, and is rotatably supported by the first bearing 63 with respect to the housing 20. The first rotor bracket 53 has a second bearing 62 rotatably supporting the second rotor 40, at a position not overlapping with the stator 30.

Because the actuator 1 includes the first bearing 63 rotatably supporting the first rotor 50 with respect to the housing 20, and the second bearing 60 supporting the second rotor 40 rotatably with respect to the first rotor 50, the actuator 1 can rotate the first rotor 50 and the second rotor 40 independently.

The nut 52 is fixed into an opening that is provided on the radially inner side of the first rotor bracket 53, at a position at the approximate center of the first rotor bracket 53. The radially inner circumferential surface of the nut 52 is threaded. The ball screw shaft 15 is inserted into the nut 52 so that the threaded section of the ball screw shaft 15 is rotatably supported by the nut 52. The nut 52 has a recirculating system for recirculating rolling elements, such as a return-tube recirculating system, a deflector recirculating system, or an end-cap recirculating system so that the rolling elements can recirculate. While the rolling elements are filled in the thread on the inner circumferential surface of the nut 52, the nut 52 is screwed onto the thread on the ball screw shaft 15. With this structure, the nut 52 supports the ball screw shaft 15 having inserted into the inner circumferential surface of the nut 52. Because the ball screw shaft 15 is inserted in the nut 52, the ends of the ball screw shaft 15 are exposed from the respective ends of the nut 52.

The center of the nut 52 is positioned at the rotational center Zr that is the rotational center of the first rotor 50. The rotational centers of the stator 30, the first rotor 50, and the second rotor 40 are also positioned at the rotational center Zr, as well as the rotational center of the nut 52. With this structure, the nut 52 is rotated with the first rotor 50, thereby causing the ball screw shaft 15 to move in the linear motion direction which is a direction in parallel with the rotational center Zr of the first rotor 50.

The second rotor 40 includes a rotor core 41, a second rotor bracket 42, and a support member 45 on which a resolver rotor 73 of an angle detector 71 is supported. The second rotor bracket 42 and the support member 45 are fixed to the respective ends of the rotor core 41 in the direction in parallel with the rotational center Zr. The second rotor bracket 42 and the support member 45 are thus rotated as the rotor core 41 is rotated.

The stator 30 includes a cylindrical stator core 31, and a magnetizing coil 32. The magnetizing coil 32 is wound around the stator core 31 of the stator 30. The magnetizing coil 32 is an electric wire. The magnetizing coil 32 is wound around the outer circumference of the stator core 31 with a coil insulator 34 interposed between the magnetizing coil 32 and the stator core 31. A wire for supplying the power from a power source is connected to the stator 30, and the magnetizing coil 32 receives the power from the controller 90 via the wire. The magnetizing coil 32 includes magnetizing coils 32A wound around the teeth provided radially internal to the stator core 31, and magnetizing coils 32B wound around the teeth provided radially external to the stator core 31, both teeth are described later.

The stator core 31, the rotor core 41, and the rotor core 51 are manufactured by laminating thin steel sheets such as magnetic steel sheets or cold rolled sheets, through bonding, bossing, or caulking. The stator core 31, the rotor core 41, and the rotor core 51 are sequentially laminated in the mould, and discharged from the mould. The stator core 31, the rotor core 41, and the rotor core 51 may dust cores made of compressed magnetic powder.

As illustrated in FIG. 3, the first rotor 50 has a cylindrical shape surrounding the ball screw shaft 15 on the side of the rotational center Zr. The stator 30 has a cylindrical shape surrounding the first rotor 50 on the side of the rotational center Zr. The second rotor 40 has a cylindrical shape surrounding the stator 30 on the side of the rotational center Zr.

The stator core (stator pole) 31 of the stator 30 has teeth (magnetic poles) 36, 38 that are provided equally spaced along the circumferential direction with the center at the rotational center Zr and are integrated with a back yoke 37. The stator 30 may be a divided core in which a plurality of stator cores 31 circumferentially divided are arranged equally spaced in the circumferential direction with the center at the rotational center Zr, without limitation to the integral core. The stator core 31 is fixed to the housing base 21, as illustrated in FIG. 2.

Cuts may be provided on the surface of the stator core 31. Such cuts allow the magnetic field to locally saturate in the stator core 31 so that leakage of the magnetic flux from the rotor core 41 and the rotor core 51 can be suppressed.

The magnetizing coil 32A is wound around each of the radially inner teeth 38, and the magnetizing coil 32B is wound around each of the radially outer teeth 36, as illustrated in FIG. 3. The magnetizing coils 32B produce magnetic fluxes in the radially outer teeth 36, and the magnetizing coils 32A produce magnetic fluxes in the radially inner teeth 38, for example.

By making the radial thicknesses of the outer teeth 36 and the inner teeth 38 different, for example, it becomes possible to make the magnetic flux in the radially outer teeth 36 different from the magnetic flux in the radially inner teeth 38, both magnetic fluxes generated by the magnetizing coils 32. In this manner, the actuator 1 can produce desirable torque in the rotor core 41 and the rotor core 51.

The back yoke 37 may be divided in the radial direction to provide a divided core in which the teeth 36 positioned radially outer and the teeth 38 positioned radially inner are radially divided. With this structure, leakage of the magnetic flux from the rotor cores 41 and 51 can be suppressed.

The rotor core 41 is provided with teeth 41a protruding from the inner circumferential surface. The rotor core 51 is provided with teeth 51a protruding from the radially outer circumferential surface. The rotor core 41 and the rotor core 51 are what are called variable reluctance (VR) rotors. Taking advantage of the fact that the reluctance (magnetic resistance) changes depending on the position in rotation, the rotor core 51 is rotated in such a manner that the magnetic resistance becomes minimum synchronously with the rotating magnetic fields in the teeth 38 of the stator core 31 generated by the magnetizing coils 32B. Also taking advantage of the fact that the reluctance (magnetic resistance) changes depending on the position in rotation, the rotor core 41 is also rotated so that the magnetic resistance becomes minimum synchronously with the rotating magnetic fields generated by the magnetizing coils 32A in the teeth 36 of the stator core 31.

Figure 4:
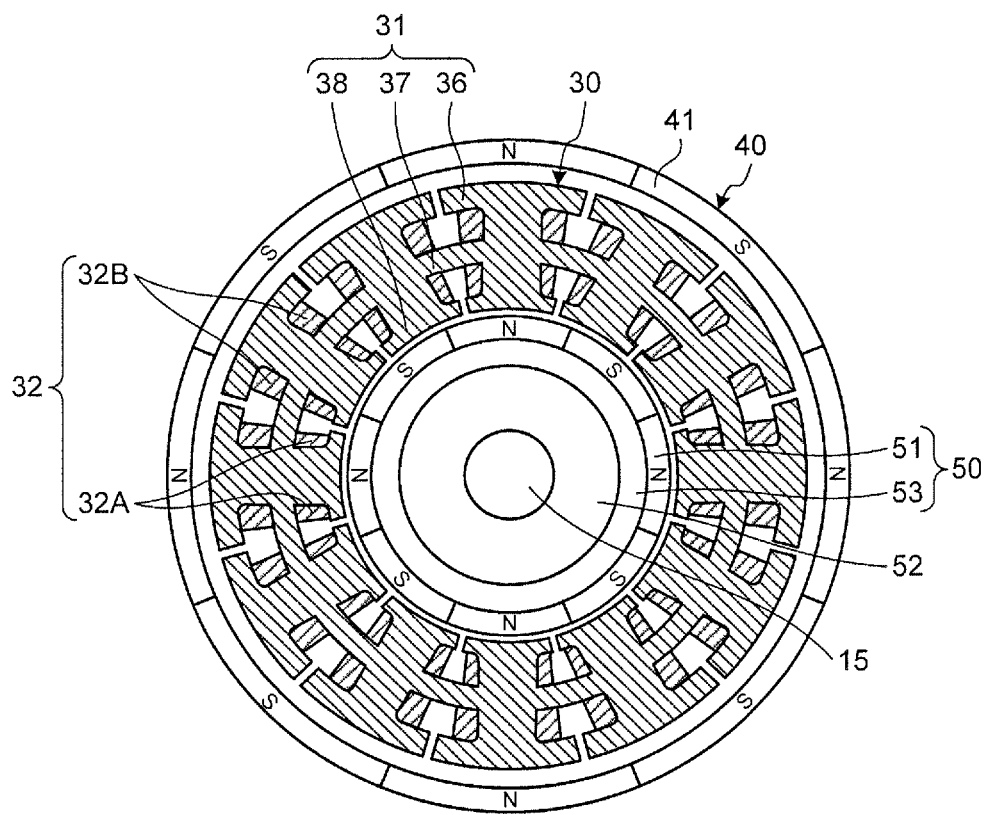
FIG. 4 is a schematic cross-sectional view of a first rotor, a second rotor, and a stator taken along a virtual plane that is perpendicular to the rotational center in a modification of the structure of the actuator according to the first embodiment illustrated in FIG. 2.

FIG. 4 is a schematic cross-sectional view taken along a virtual plane that is perpendicular to the rotational center in the first rotor, the second rotor, and the stator in a modification of the structure of the actuator according to the first embodiment illustrated in FIG. 2. The rotor core 41 is provided with a plurality of magnets mounted on the inner circumferential surface of the second rotor 40. The rotor core 51 is provided with a plurality of magnets mounted on the radially outer circumferential surface of the first rotor 50. The magnets are permanent magnets, the S pole and the N pole of which are positioned alternatingly along the circumferential direction of the rotor cores 41 and 51. Such rotor cores 41, 51 are generally referred to as permanent magnet (PM) rotors. The rotor core 51 is rotated by the rotating magnetic fields generated by the magnetizing coils 32B on the teeth 38 of the stator core 31. The rotor core 41 is rotated by the rotating magnetic fields generated by the magnetizing coils 32A on the teeth 36 of the stator core 31.

In the controller 90 of the actuator device 100, the CPU 91 outputs a driving signal to the three-phase AMP 92, and the AMP 92 supplies the driving current Mi to the actuator 1. Based on the driving current Mi, the actuator 1 drives the magnetizing coils 32A and the magnetizing coils 32B illustrated in FIG. 3 or FIG. 4 independently. The controller 90 can thus control to drive and to stop the first rotor 50 independently from driving and stopping of the second rotor 40. In the same manner, the controller 90 can control to drive and to stop the second rotor 40 independently from driving and stopping of the first rotor 50. The controller 90 can also control the rotational frequency and the rotating direction of the second rotor 40 independently from those of the first rotor 50, and vice versa.

The actuator 1 is preferably provided with angle detectors 71, 74. The angle detectors 71, 74 are, for example, resolvers. The angle detector 71 is capable of detecting a rotation position of the second rotor 40 highly precisely. The angle detector 74 is capable of detecting a rotation position of the first rotor 50 highly precisely. Explained hereinafter is an example in which the angle detectors 71, 74 are resolvers, but the angle detectors may be any other sensors or encoders of which type is not particularly limited.

The angle detectors 71, 74 include a resolver stators 72, 75, respectively, that are kept at a fixed position, and resolver rotors 73, 76 positioned facing the resolver stators 72, 75 and capable of being rotated with respect to the resolver stators 72, 75 with a predetermined clearance ensured between the resolver rotors 73, 76 and the resolver stators 72, 75. The resolver stators 72, 75 are disposed on the housing base 21. The resolver rotor 73 is disposed on the support member 45 of the second rotor 40. The resolver rotor 76 is disposed on the first rotor bracket 53 of the first rotor 50.

When the magnetizing coils 32 of the stator 30 become magnetized, thereby causing the first rotor 50 and the second rotor 40 to rotate, the resolver rotors 73, 76 are driven to rotate simultaneously.

The resolver stators 72, 75 have a circular laminated iron core with stator poles provided equally spaced in the circumferential direction, with a resolver coil wound around each of the stator pole. A wire to which a detection signal (resolver signal) Sr is output is connected to each of the resolver coils.

The resolver rotors 73, 76 are made from a laminated iron core that is circular and hollow. The positions at which the angle detectors 71, 74 are disposed are not particularly limited, as long as the rotations of the first and second rotor 50 and 40 can be detected, and may be disposed at any position depending on the shape of the housing 20.

In the angle detectors 71 and 74, the reluctance between the resolver rotor 73 and the resolver stator 72, and the reluctance between the resolver rotor 76 and the resolver stator 75 change continuously. The angle detectors 71, 74 detect such a change in the reluctance, and the RDC 93 converts the detection signal Sr into a digital signal. With the electric signal supplied from the RDC 93, the CPU 91 in the controller 90 controlling the actuator 1 can calculate the positions and the rotational angles of the rotating body 10 and the ball screw shaft 15 per unit time, the rotating body 10 and the ball screw shaft 15 with which the resolver rotors 73, 76 move. The controller 90 controlling the actuator 1 is thus enabled to make measurements of the rotating conditions of the rotating body 10 (e.g., the rotational frequency, the rotating direction, and the rotational angle) and of the position to which the ball screw shaft 15 has moved in the linear motion direction.

The angle detectors 71, 74 are preferably a combination of a unipolar resolver and a multi-polar resolver. A unipolar resolver outputs a unipolar resolver signal in which the fundamental wave component of a change in the reluctance cycles once as the first rotor 50 or the second rotor 40 is rotated once. A multi-polar resolver outputs a multi-polar resolver signal in which the fundamental wave component of a change in the reluctance cycles a plurality of number of times as the first rotor 50 or the second rotor 40 is rotated once.

Because the actuator 1 is provided with angle detectors of which fundamental wave components of a reluctance change cycle by different number of times as the first rotor 50 or the second rotor 40 is rotated once, the actuator 1 is allowed to recognize the absolute positions of the first rotor 50 and of the second rotor 40, so that the precision of the measurements of the rotating conditions or the like of the first rotor 50 or the second rotor 40 (e.g., the rotational frequency, the rotating direction, and the rotational angle) can be improved. Furthermore, the actuator 1 can determine such positions without being required to perform a pole detecting operation with a single phase current, or to perform a return-to-origin operation.

The magnetizing coils 32A may include a plurality of coil circuits each of which is driven with a pulse, and the timing at which each of the coil circuits is driven may be changed with the pulse. The magnetizing coils 32B may also include a plurality of coil circuits each of which is driven with a pulse, and the timing at which the coil circuits are driven may be changed with the pulse. With this structure, the magnetizing coils 32A and the magnetizing coils 32B are driven with a pulse, so that the rotor core 41 and the rotor core 51 function as what is called stepping motors positioned internally and externally and are independently rotated in synchronization with the respective driving pulses. The controller 90 can control to drive and to stop the first rotor 50 independently from driving and stopping of the second rotor 40, by controlling the pulse of the driving current Mi. The actuator 1 can thus determine the positioning of the first rotor 50 and the second rotor 40 without the angle detectors 71, 74. Furthermore, the actuator 1 can reduce the number of parts, so that the space can be saved and costs can be reduced. The actuator 1 can also improve reliability because the number of parts is reduced.

Figure 5:
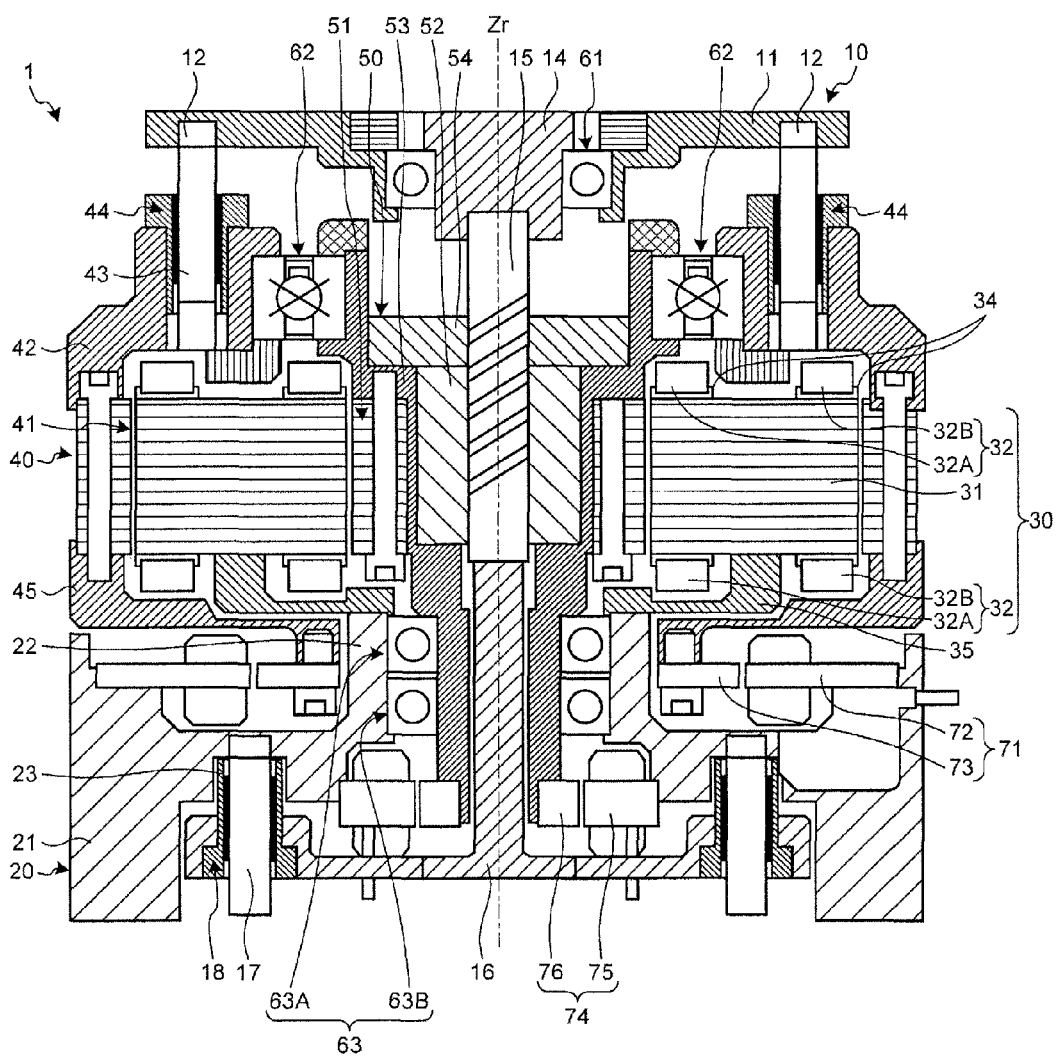
FIG. 5 is a schematic for explaining an operation of the actuator according to the first embodiment.

The actuator device 100 and the actuator 1 will now be explained with reference to FIGS. 1, 2, and 5. FIG. 5 is a schematic for explaining an operation of the actuator according to the first embodiment. The controller 90 of the actuator device 100 generates driving power causing the first rotor 50 and the second rotor 40 to rotate with respect to the stator 30 by applying, for example, an alternating current to the magnetizing coils 32 in the stator 30 while switching the voltage applied to the magnetizing coils 32 at a predetermined interval.

When the first rotor 50 of the actuator 1 is rotated, the nut 52 fixed to the first rotor bracket 53 is also rotated. In the actuator 1, because the nut 52 is screwed onto the thread on the ball screw shaft 15, the thread on the ball screw shaft 15 is carried along the thread of the nut 52 in the linear motion direction, as the nut 52 is rotated. The ball screw shaft 15 is thus moved relatively to the nut 52 in the linear motion direction, as the nut 52 is rotated. In the embodiment, the actuator device 100 can move the ball screw shaft 15 upwardly in a plane in front of the paper, as illustrated in FIG. 5, as the nut 52 is rotated. The actuator device 100 can also move the ball screw shaft 15 downwardly in a plane in front of the paper, reversely to the operation illustrated in FIG. 5, as the nut 52 is reversely rotated.

The second rotor 40 in the actuator 1 is also rotated independently from the rotating operation causing the first rotor 50 to rotate. When the second rotor 40 is rotated, the rotation of the rotor core 41 causes the second rotor bracket 42 and the support member 45 to rotate. Because the sliders 43 rotate with the second rotor bracket 42 on the second rotor 40, the rotating body 10 is also rotated. The rotating body 10 is rotatably supported by the flange 14 via the third bearing 61. As the ball screw shaft 15 moves upwardly, the flange 14 is also moved upwardly in a plane in front of the paper, as illustrated in FIG. 5. The rotating body 10 is rotated around the flange 14, with the center at the rotational center Zr.

The frictional torque of the second bearing 62 is preferably smaller than the frictional torque of the third bearing 61, so that the actuator 1 can restrain the second rotor 40 from being rotated by the rotating first rotor 50.

The frictional torque of the first bearings 63A, 63B is preferably larger than frictional torque of the second bearing 62. With such a configuration, the possibility of the rotating body 10 carrying the nut 52 along and rotating the nut 52, thereby unintentionally causing of the ball screw shaft 15 to move linearly, can be reduced when the rotating body 10 is rotated around the flange 14 with the center at the rotational center Zr.

To increase the frictional torque of these bearings, the size of the rolling elements may be increased, or bearings with a large friction such as a cross roller bearing may be used. It is also possible to preload the bearings.

The actuator device 100 and the actuator 1 are capable of converting a rotational motion of the first rotor 50 in the actuator 1 into a linear motion of the ball screw shaft 15. The actuator device 100 and the actuator 1 can also rotate the rotating body 10 while moving the ball screw shaft 15 linearly. In this manner, the actuator device 100 and the actuator 1 can linearly and rotationally move the workpiece 97 illustrated in FIG. 1.

By adjusting the pitch (lead) of the screws, the actuator device 100 and the actuator 1 can change the conversion ratio at which a rotational motion is converted into a linear motion and the distance by which the ball screw shaft 15 moves linearly when the first rotor 50 is rotated once. In this manner, actuators achieving different levels of performance can be manufactured through simple design modifications.

As explained above, the actuator 1 according to the first embodiment includes the stator 30, the housing 20, the first rotor 50, the ball screw shaft 15, the nut 52, and the second rotor 40. The stator 30 is provided with the magnetizing coil 32 and the stator core 31. The stator 30 is fixed to the housing 20. The first rotor 50 is positioned radially internal to the stator 30, and is rotated relatively to the stator 30. The ball screw shaft 15 is a rod-like member positioned at the rotational center Zr of the first rotor 50, and at least a part of the surface of the ball screw shaft 15 has a thread. The nut 52 is screwed onto the thread of the ball screw shaft 15. The nut 52 is rotated with the first rotor 50, thereby causing the ball screw shaft 15 to move in the linear motion direction (Z direction) that is the direction in parallel with the rotational center Zr of the first rotor 50. The second rotor 40 is positioned on the radially external to the stator 30, and is rotated relatively to the stator 30.

With this structure, the actuator 1 can convert a rotational motion of the first rotor 50 into a linear motion, and communicate this linear motion as well as the rotational motion of the second rotor 40. The actuator 1 can also convert a rotational motion of the first rotor 50 into a linear motion, and communicate only the linear motion. The actuator 1 can also communicate only the rotational motion of the second rotor 40, while keeping the first rotor 50 not rotated. In this manner, the actuator 1 can communicate the linear motion achieved by the first rotor 50 and the rotational motion of the second rotor 40 independently. By communicating the linear motion achieved by the first rotor 50 and the rotational motion of the second rotor 40 separately or simultaneously, the actuator 1 can perform complex operations to the workpiece 97 or the load on the loaded table 96. This structure does not require two electric motors, one for rotationally moving the loaded table 96 and the other for linearly moving the loaded table 96, for example, so that the parts for connecting these two electric motors are rendered unnecessary. Hence, the size of the actuator itself can be reduced. Because the number of parts is reduced, the actuator device 100 and the actuator 1 can improve reliability, save a space, and enables a further cost reduction.

Second Embodiment

Figure 6:
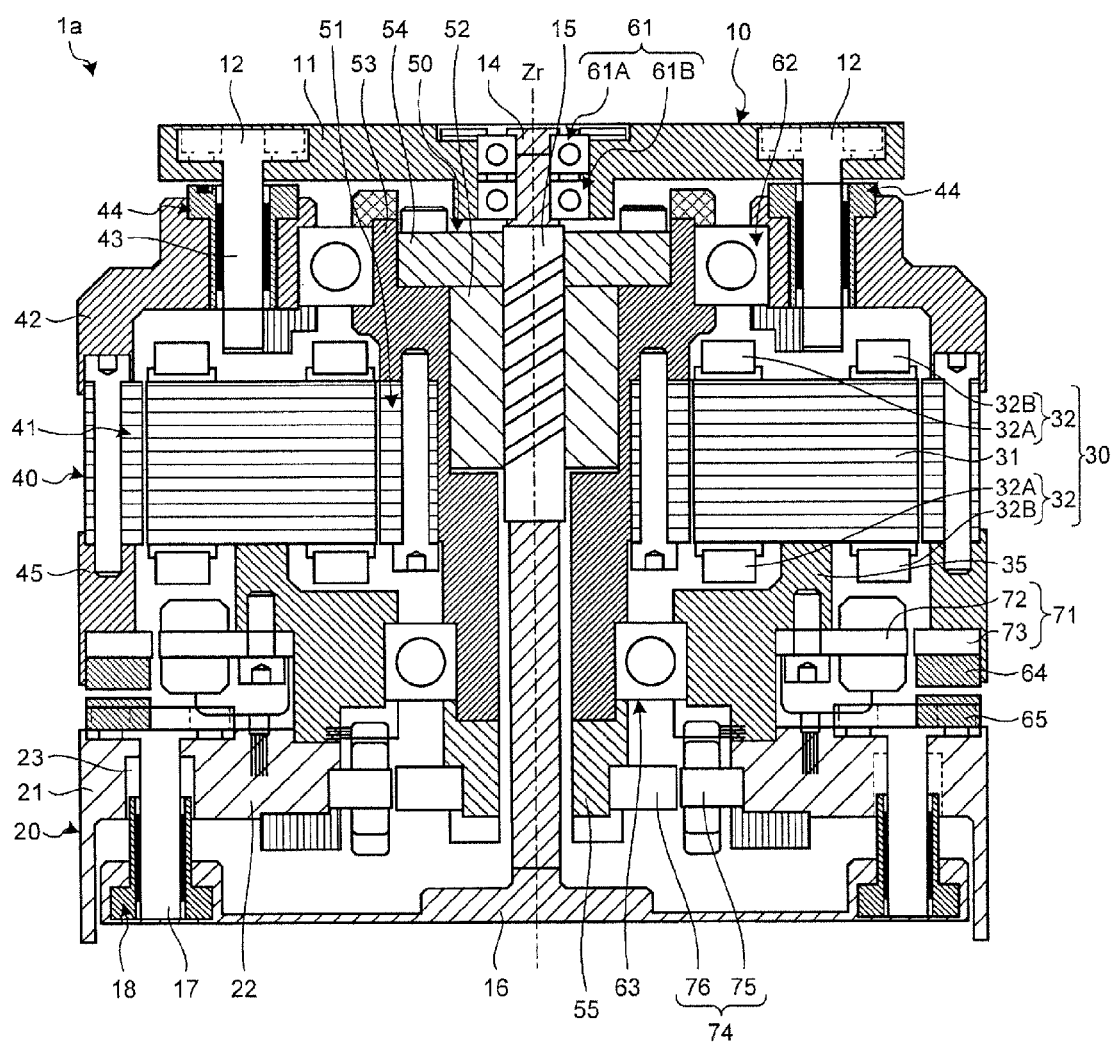
FIG. 6 is a schematic cross-sectional view taken along a virtual plane including a rotational center in an actuator according to a second embodiment of the present invention.

FIG. 6 is a schematic cross-sectional view taken along a virtual plane including a rotational center in an actuator according to a second embodiment of the present invention. The same elements as those explained in the embodiment described above are assigned with the same reference signs, and redundant explanations thereof are omitted hereunder.

This actuator 1a according to the second embodiment further includes a preload mechanism that preloads the first bearing 63 and the second bearing 62 in a direction in parallel with the rotational center Zr (linear motion direction). The preload mechanism includes a magnetic body 64 and a magnet 65. The magnetic body 64 is made of electromagnetic soft iron, for example. The magnetic body 64 may also be a magnet. The magnet 65 of the preload mechanism is provided on the outer circumferential edge of the housing base 21, and the magnetic body 64 is mounted on the support member 45 in a manner facing the magnet 65 in the linear motion direction.

The preload mechanism preloads the first bearing 63 and the second bearing 62 in a direction in parallel with the linear motion direction using the attraction of the magnetic body 64 to the magnet 65. With this structure, the first bearing 63 and the second bearing 62 can support the first rotor 50 and the second rotor 40 stably while the ball screw shaft 15 moves in the linear motion direction. This structure also allows a single-row bearing, which cannot provide a preload mechanism alone, to be used as the first bearing 63 and the second bearing 62.

The first bearing 63 according to the embodiment is fixed to a fixing flange 55 mounted on the first rotor bracket 53. The third bearing 61 according to the embodiment is configured as third bearings 61A, 61B that are a back-to-back duplex bearing.

Third Embodiment

Figure 7:
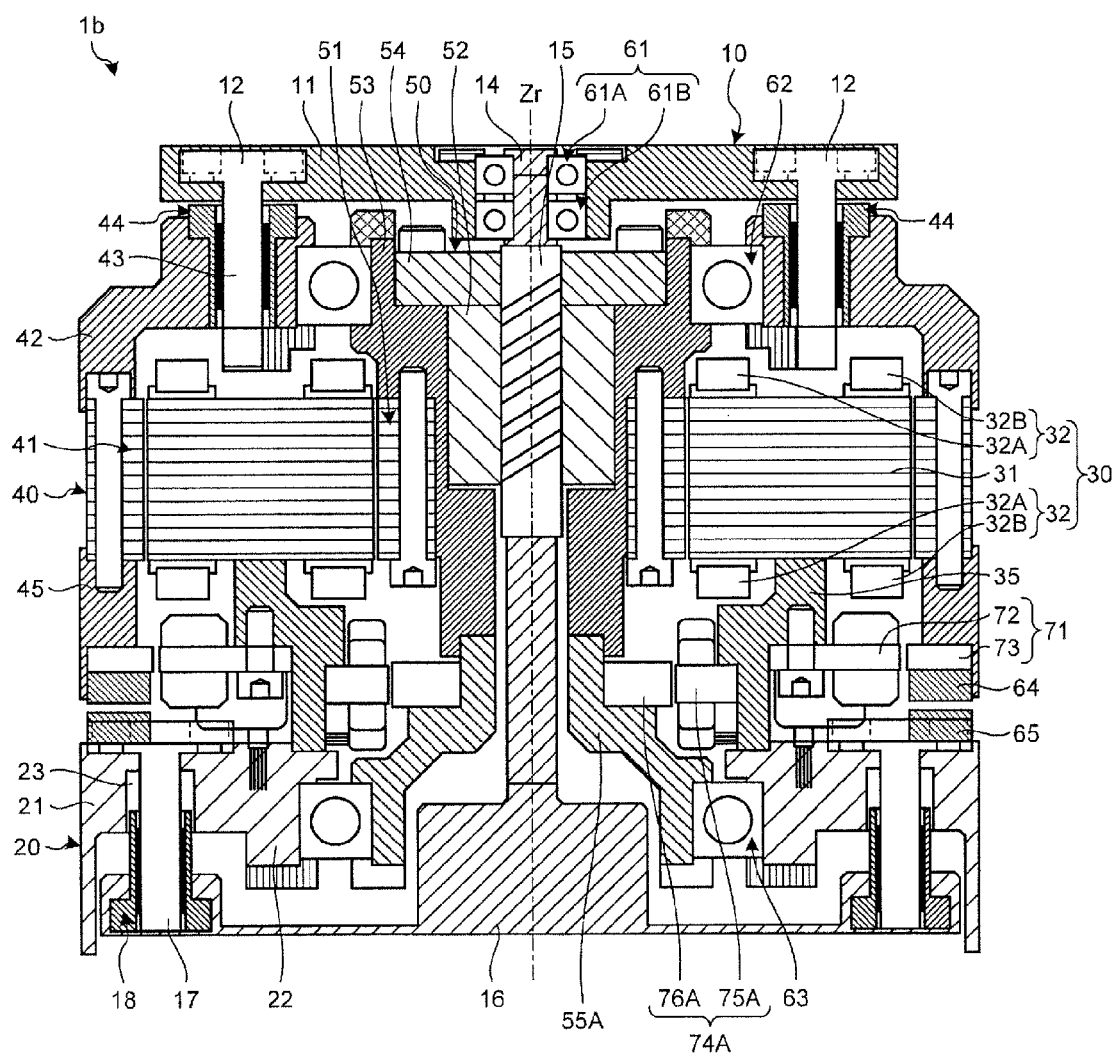
FIG. 7 is a schematic cross-sectional view taken along a virtual plane including a rotational center in an actuator according to a third embodiment of the present invention.

FIG. 7 is a schematic cross-sectional view taken along a virtual plane including a rotational center in the actuator according to a third embodiment of the present invention. The same elements as those explained in the embodiments described above are assigned with the same reference signs, and redundant explanations thereof are omitted hereunder.

In this actuator 1b according to the third embodiment, the first bearing 63 is fixed to a fixing flange 55A mounted on the first rotor bracket 53. The fixing flange 55A also supports an angle detector 74A. The angle detector 74A includes a resolver stator 75A and a resolver rotor 76A, in the same manner as the resolver stator 75 and the resolver rotor 76 provided to the angle detector 74 described above, but disposed at different positions. The first bearing 63 is mounted on the fixing flange 55A at a position further away from the first rotor bracket 53 than the angle detector 74A. Such a structure can improve the moment stiffness of the rotating nut 52. The first bearing 63 is also provided at a position allowing a maintenance job to be provided easily from the outside of the housing 20.

Fourth Embodiment

Figure 8:
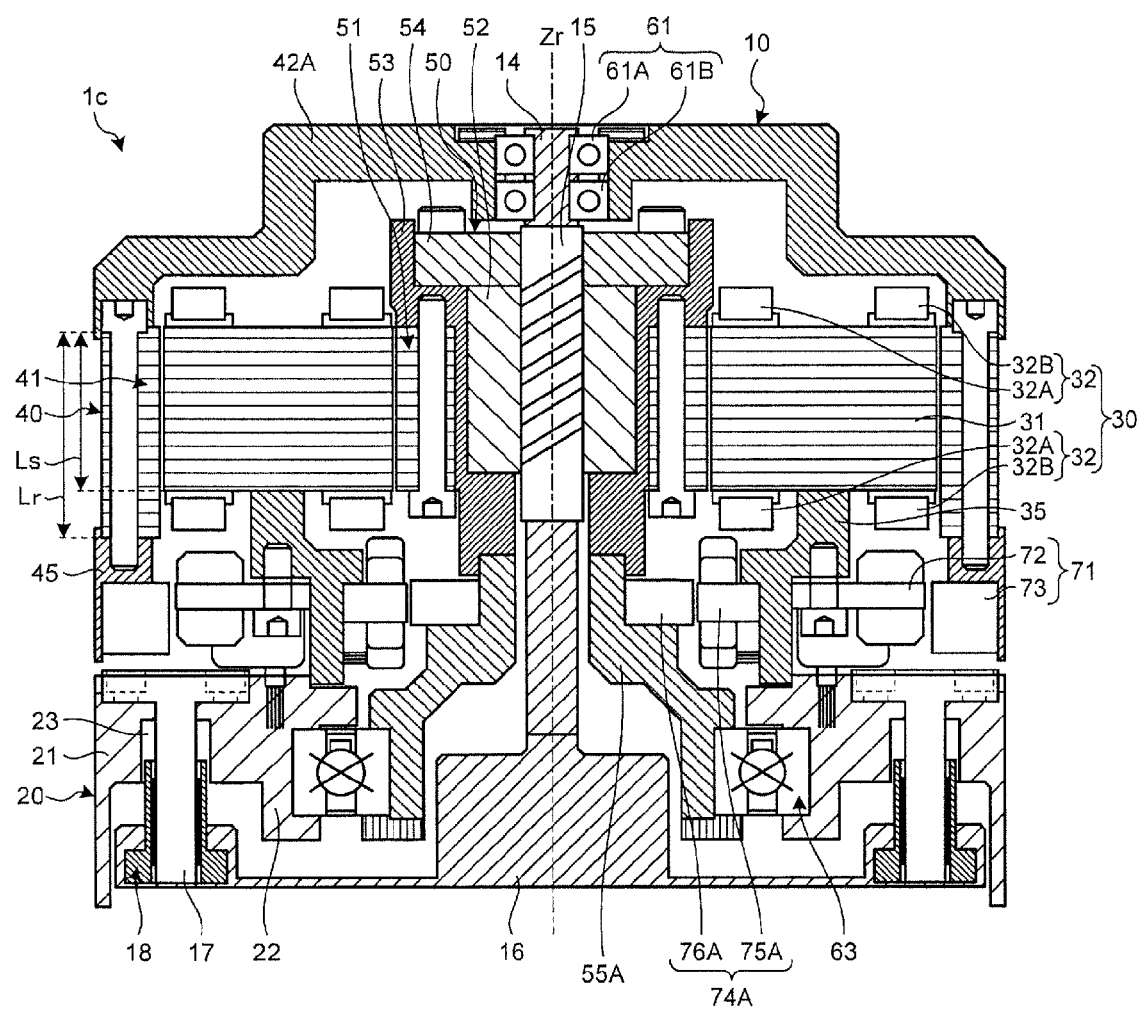
FIG. 8 is a schematic cross-sectional view taken along a virtual plane including a rotational center in an actuator according to a fourth embodiment of the present invention.

FIG. 8 is a schematic cross-sectional view taken along a virtual plane including a rotational center in an actuator according to a fourth embodiment of the present invention. The same elements as those explained in the embodiments described above are assigned with the same reference signs, and redundant explanations thereof are omitted hereunder.

In this actuator 1c according to the fourth embodiment, the rotating body 10 serves as a second rotor bracket 42A. The second rotor bracket 42A is fixed to an end of the rotor core 41 in the direction in parallel with the rotational center Zr, and can be rotated about the flange 14 via the third bearing 61.

When the first rotor 50 in the actuator 1c is rotated, the nut 52 fixed to the first rotor bracket 53 is also rotated. Because the nut 52 is screwed onto the thread on the ball screw shaft 15 in the actuator 1c, the ball screw shaft 15 is carried along the thread of the nut 52 in the linear motion direction, as the nut 52 is rotated. The ball screw shaft 15 is thus moved relatively to the nut 52 in the linear motion direction, as the nut 52 is rotated.

The second rotor 40 in the actuator 1c is also rotated independently from the rotating operation causing the first rotor 50 to rotate. When the second rotor 40 is rotated, the second rotor bracket 42A and the support member 45 are rotated by the rotation of the rotor core 41, so that the second rotor bracket 42A that is the rotating body 10 is moved with the ball screw shaft 15 in the linear motion direction. In the actuator 1c according to the fourth embodiment, taking the stroke of the linear motion direction into consideration, the length Lr of the rotor core 41 in the linear motion direction is set longer than the length Ls of the stator core 31 in the linear motion direction, so that the rotor core 41 can keep rotating as the rotor core 41 moves in the linear motion direction.

The actuator 1c according to the fourth embodiment can support rotations of the first rotor 50 and the second rotor 40 with the third bearing 61 and the first bearing 63, respectively. With this structure of the actuator 1c according to the fourth embodiment, the number of bearings can be reduced compared with that in the actuator 1 according to the first embodiment. Because the number of parts can thus be reduced, the production costs can be reduced. For the same reason, the actuator 1c according to the fourth embodiment can improve reliability, compared with the actuator 1 according to the first embodiment. It is also preferable, in consideration of the stroke of the linear motion direction, to ensure a sufficient length of the resolver rotor 73 in the linear motion direction.

Fifth Embodiment

Figure 9:
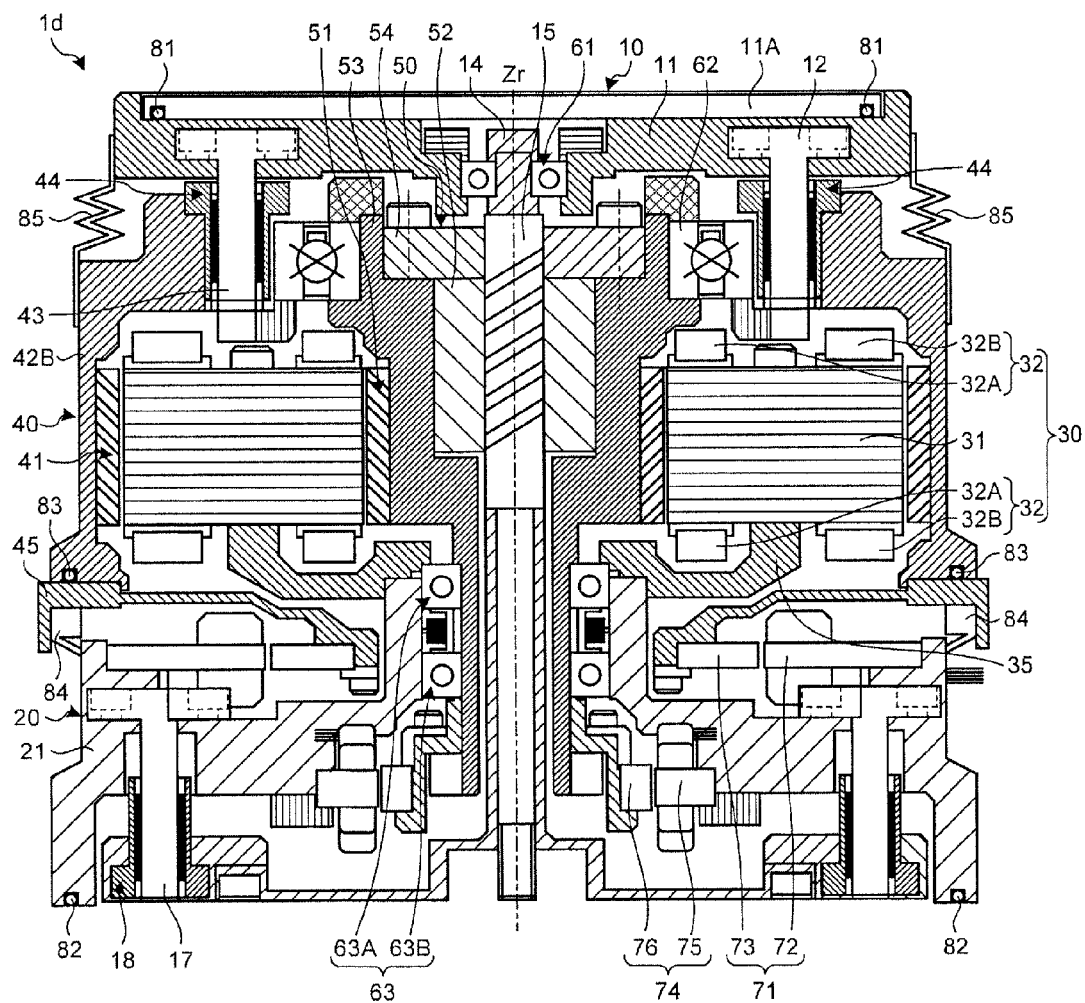
FIG. 9 is a schematic cross-sectional view taken along a virtual plane including a rotational center in an actuator according to a fifth embodiment of the present invention.

FIG. 9 is a schematic cross-sectional view taken along a virtual plane including a rotational center in an actuator according to a fifth embodiment of the present invention. The same elements as those explained in the embodiments described above are assigned with the same reference signs, and redundant explanations thereof are omitted hereunder.

This actuator 1d according to the fifth embodiment further includes a bellows 85 that covers the gap between the rotating body 10 and the second rotor 40, the bellows 85 provided along the outer circumference of the second rotor 40 in the radial direction. The rotor core 41 is provided inside of a second rotor bracket 42B of the second rotor 40 so that the rotor core 41 is surrounded by the second rotor bracket 42B. The rotor core 41 is provided with, for example, a plurality of magnets mounted on the inner circumferential surface of the second rotor 40, as illustrated in FIG. 4.

The magnetizing coils 32A and the magnetizing coils 32B illustrated in FIG. 9 are wound around the radially outer teeth 36 and the radially inner teeth 38, respectively, illustrated in FIG. 4. The magnetizing coils 32B produce magnetic fluxes in the radially outer teeth 36 illustrated in FIG. 4, for example. The magnetizing coils 32A produce magnetic fluxes in the radially inner teeth 38. With this structure, the magnetizing coils 32 can produce different magnetic fluxes in the outer teeth 36 and in the inner teeth 38 in the radial direction. In this manner, the actuator 1d can produce desirable torque in the rotor core 41 and the rotor core 51.

In the actuator 1d according to the fifth embodiment, when the first rotor 50 in the actuator 1d is rotated, the nut 52 fixed to the first rotor bracket 53 is also rotated. Because the nut 52 is screwed onto the thread on the ball screw shaft 15 in the actuator 1d, the ball screw shaft 15 is carried along the thread of the nut 52 in the linear motion direction as the nut 52 is rotated. The ball screw shaft 15 is thus moved relatively to the nut 52 in the linear motion direction, as the nut 52 is rotated.

In some cases, the gap between the rotating body 10 and the second rotor 40 is thus increased, but because the bellows 85 can extend, the clearance between the rotating body 10 and the second rotor 40 remains covered. Because the bellows 85 is capable of extending and shrinking depending on the distance by which the ball screw shaft 15 is moved in the linear motion direction, the actuator 1d according to the fifth embodiment can prevent entrance of foreign substances so that the reliability can be improved. The actuator 1d according to the fifth embodiment can also operate in an environment in which water proofing is required, for example.

By using the bellows 85 made of a rigid or a thick material, a rotational movement of the rotating body 10 can be restricted. In this manner, the actuator 1d can render the linear motion guiding mechanism that is a combination of the slider 43 and the linear bush 44 unnecessary. In other words, without the linear motion guiding mechanism that is a combination of the slider 43 and the linear bush 44, the rigid bellows 85 can maintain the position of the plate 11 in the rotating direction. The rigid bellows 85, serving as a linear motion guiding mechanism for guiding the linear motion direction of the rotating body 10, is rotated with the second rotor 40. With this structure, the internal space of the actuator 1d can be saved and used effectively. In this manner, the actuator 1d according to the fifth embodiment can reduce the number of parts, and improve the reliability.

The second rotor 40 in the actuator 1d is also rotated independently from the rotating operation causing the first rotor 50 to rotate. When the second rotor 40 is rotated, the second rotor bracket 42B and the support member 45 are rotated with the rotor core 41. The actuator 1d according to the fifth embodiment is, therefore, preferably provided with an oil seal 84 capable of sliding in the gap between the support member 45 and the housing base 21 of the housing 20.

The plate 11 of the rotating body 10 may be provided with a lid 11A sealed with an O ring 81. The second rotor bracket 42B and the support member 45 are also preferably secured with an O ring 83. The space between the support 95 and the housing base 21 of the housing 20 is also preferably sealed with an O ring 82. By providing the O rings 81, 82, and 83 between these members, the actuator 1d according to the fifth embodiment can be better waterproofed.

Sixth Embodiment

Figure 10:
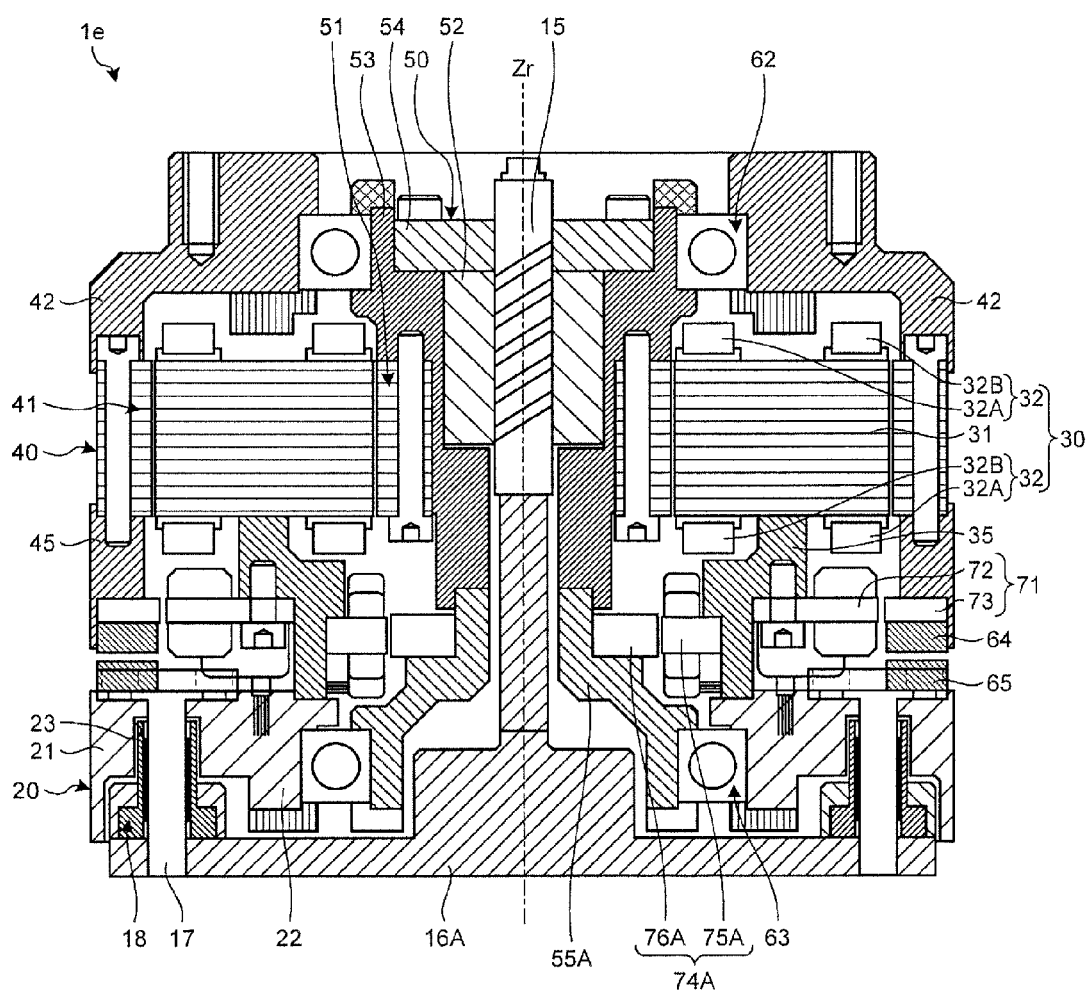
FIG. 10 is a schematic cross-sectional view taken along a virtual plane including a rotational center in an actuator according to a sixth embodiment of the present invention.
Figure 11:
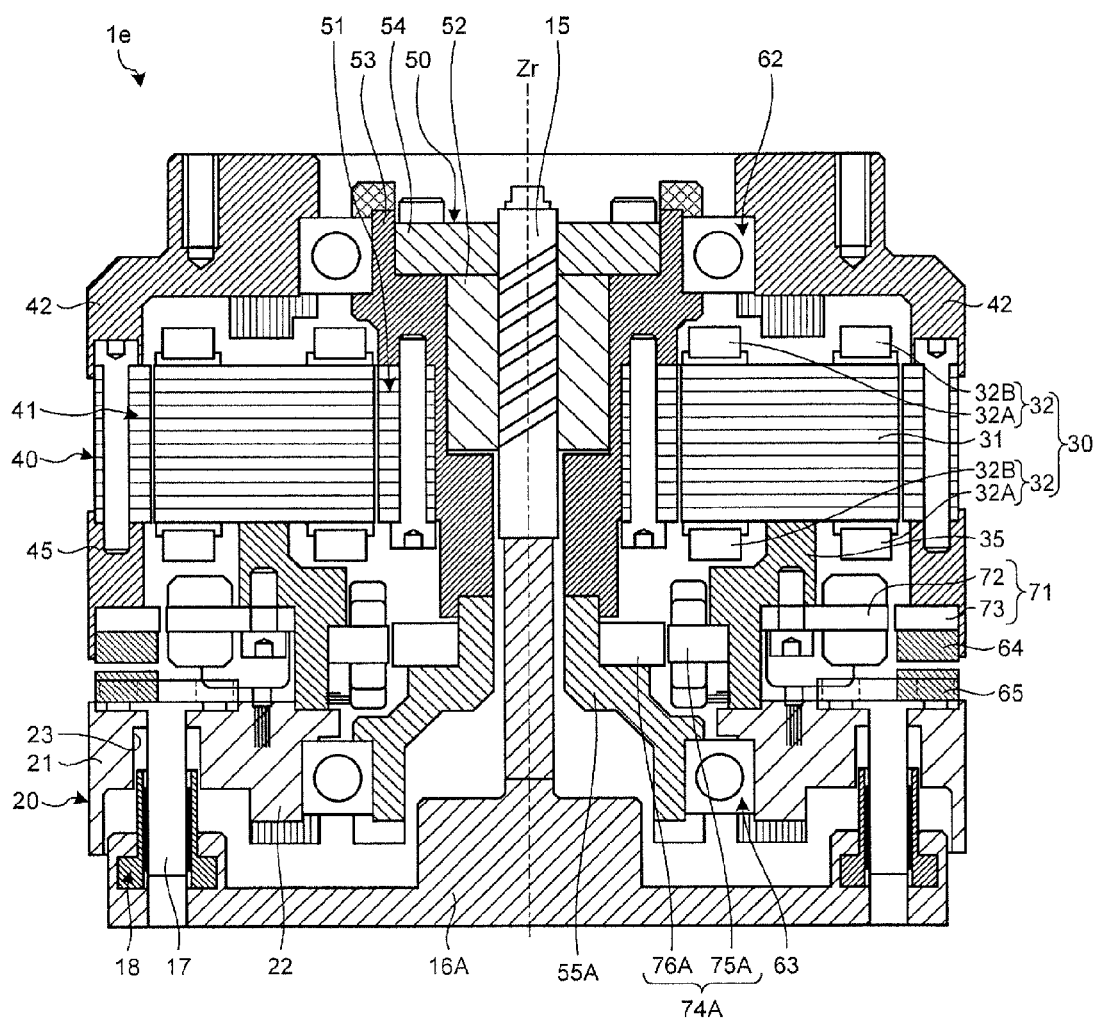
FIG. 11 is a schematic for explaining an operation of the actuator according to the sixth embodiment.

FIG. 10 is a schematic cross-sectional view taken along a virtual plane including a rotational center in an actuator according to a sixth embodiment of the present invention. FIG. 11 is a schematic for explaining an operation of the actuator according to the sixth embodiment. The same elements as those explained in the embodiments described above are assigned with the same reference signs, and redundant explanations thereof are omitted hereunder.

This actuator 1e according to the sixth embodiment does not have the rotating body 10 that is linearly moved by the ball screw shaft 15.

When the first rotor 50 in the actuator 1e is rotated, the nut 52 fixed to the first rotor bracket 53 is also rotated. Because the nut 52 is screwed onto the thread on the ball screw shaft 15 in the actuator 1e, the ball screw shaft 15 is carried along the thread of the nut 52 in the linear motion direction as the nut 52 is rotated. The ball screw shaft 15 is thus moved relatively to the nut 52 in the linear motion direction, as the nut 52 is rotated.

The actuator 1e according to the sixth embodiment moves the ball screw shaft 15 relatively to the housing 20 in the linear motion direction that is a direction in parallel with the rotational center Zr of the first rotor 50. It is therefore possible to move the housing 20 in the linear motion direction with respect to the ball screw shaft 15 by providing a stopper 16A fixed to the ball screw shaft 15 in a manner fixed to the support 95.

The second rotor 40 in the actuator 1e is rotated independently from the rotating operation causing the first rotor 50 to rotate. When the second rotor 40 is rotated, the second rotor bracket 42 and the support member 45 are caused to rotate by the rotation of the rotor core 41. The second rotor bracket 42 moves with the housing 20 that is moved when the ball screw shaft 15 is moved in the linear motion direction. In the embodiment, the actuator device 100 can move the housing 20 upwardly when the nut 52 is rotated, in a plane in front of the paper as illustrated in FIG. 11. The actuator device 100 can move the housing 20 downwardly when the nut 52 is reversely rotated, in a plane in front of the paper, reversely to the operation illustrated in FIG. 11. In other words, the actuator 1e according to the sixth embodiment can convert a rotational motion into a linear motion, and communicate the linear motion of the housing 20.

Seventh Embodiment

Figure 12:
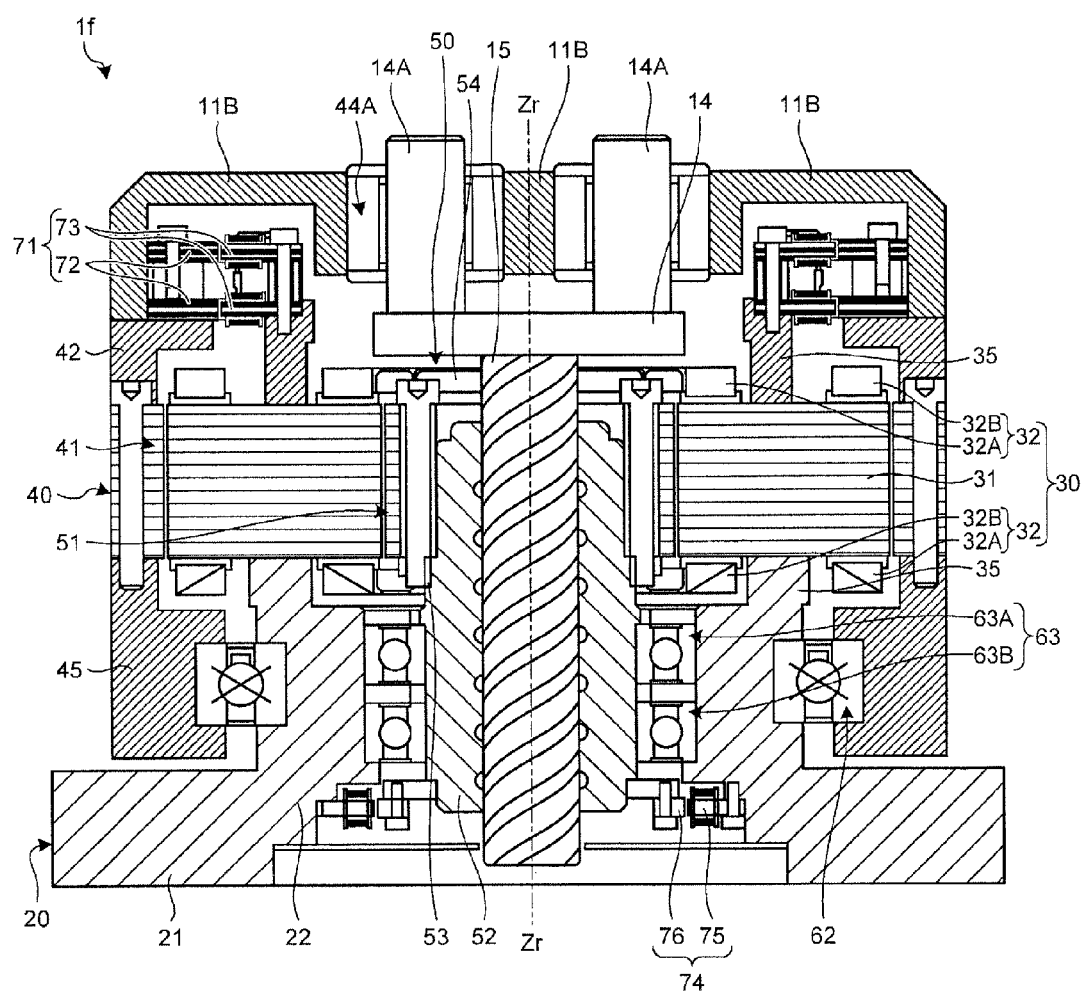
FIG. 12 is a schematic cross-sectional view taken along a virtual plane including a rotational center in an actuator according to a seventh embodiment of the present invention.
Figure 13:
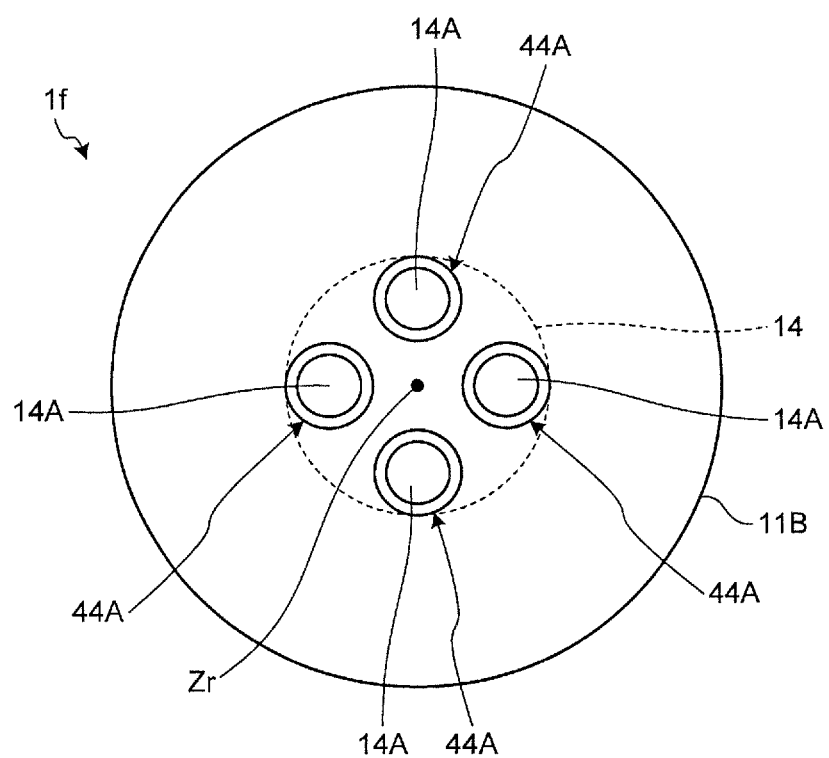
FIG. 13 is a plan view of a rotating body in the actuator according to the seventh embodiment viewed in a direction in parallel with the rotational center.
Figure 14:
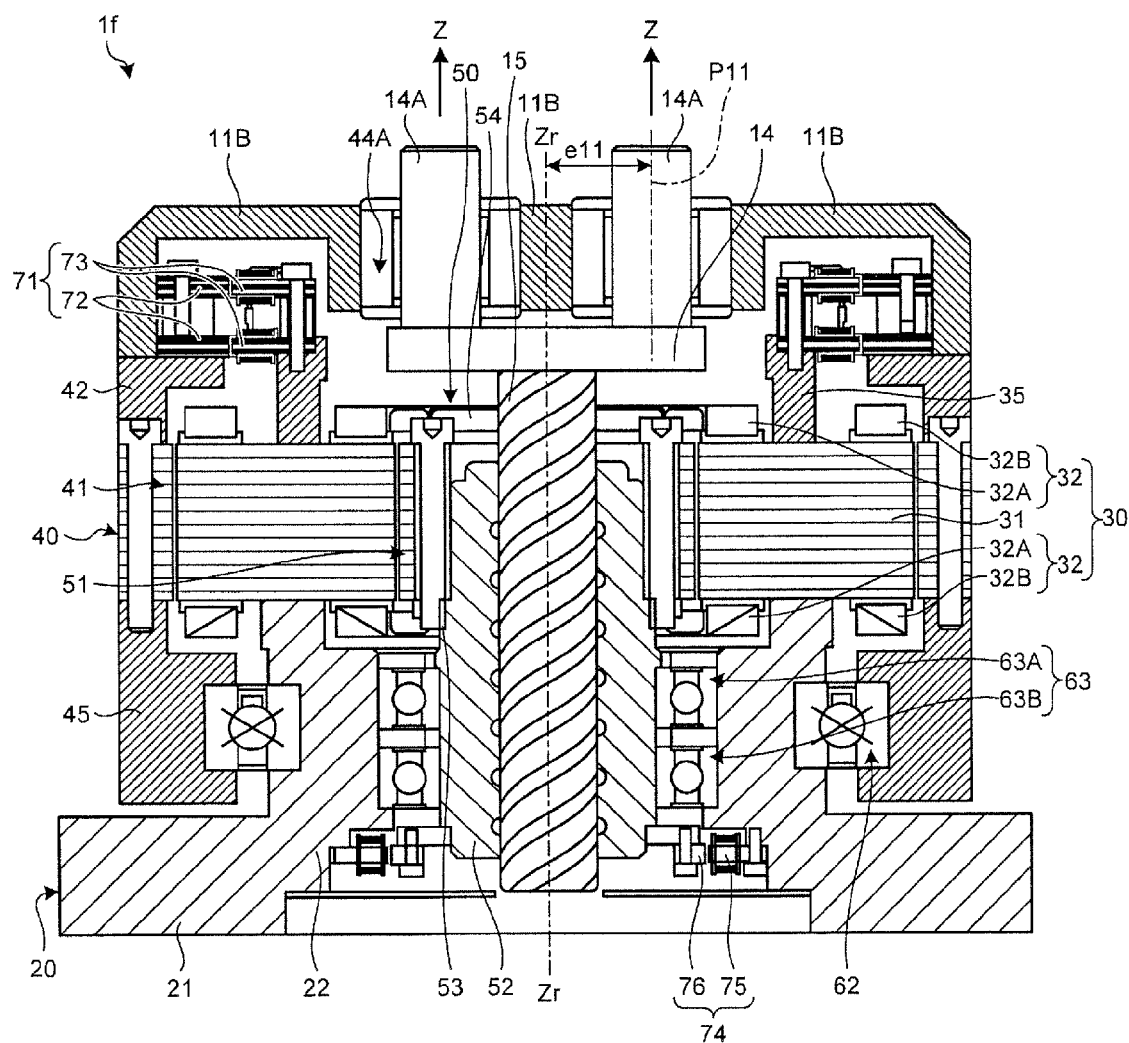
FIG. 14 is a schematic for explaining an operation of the actuator according to the seventh embodiment.

FIG. 12 is a schematic cross-sectional view taken along a virtual plane including a rotational center in an actuator according to a seventh embodiment of the present invention. FIG. 13 is a plan view of the rotating body in the actuator according to the seventh embodiment viewed in a direction in parallel with the rotational center. FIG. 14 is a schematic for explaining an operation of the actuator according to the seventh embodiment. The elements that are the same as those as described above are assigned with the same reference signs, and redundant explanations thereof are omitted hereunder.

This actuator 1f according to the seventh embodiment includes a rotating body 11B and linearly moving members 14A fixed to the flange 14. The rotating body 11B is fixed to the second rotor bracket 42, thereby allowing the rotating body 11B to be rotated about the rotational center Zr by the rotation of the second rotor 40.

As illustrated in FIGS. 12 and 13, each of the linearly moving members 14A is a rod-like member that extends in a direction in parallel with the rotational center Zr. The rotating body 11B is provided with linear bushes 44A at positions matching the positions of the respective linearly moving members 14A in a view in a direction in parallel with the rotational center Zr (linear motion direction). As illustrated in FIG. 13, in the actuator 1f according to the seventh embodiment, as an example, four linear motion guiding mechanisms, each of which is a combination of the linearly moving member 14A and the linear bush 44A, are arranged in the circumferential direction of the rotating body 11B. The linearly moving members 14A are offset from the rotational center Zr, that is, positioned radially outside of the rotational center Zr. The linearly moving members 14A are therefore rotated when the rotating body 11B is rotated.

In the actuator 1f according to the seventh embodiment, a bearing device corresponding to the third bearing 61 is omitted, compared with the actuator 1 according to the first embodiment. In this configuration, the rotational motion of the second rotor 40 is communicated to the first rotor 50 via the rotating body 11B, the linear motion guiding mechanisms each of which is a combination of the linearly moving member 14A and the linear bush 44A, and via the ball screw shaft 15 and the nut 52. In other words, the linearly moving members 14A move in the linear motion direction by a distance proportional to a rotational amount of the rotating body 11B. This structure according to the seventh embodiment allows the actuator 1f to control the rotating body 11B and the linearly moving members 14A to operate in four different operational modes implemented as different combinations of rotational and linear motions, such operation modes achieved by driving the second rotor 40 and the first rotor 50 in different combinations.

First Operation Mode

In the first operation mode, the linearly moving members 14A are moved in the direction in parallel with the rotational center Zr (linear motion direction), without causing the rotating body 11B to rotate. In this mode, the actuator 1f according to the seventh embodiment rotates the first rotor 50 without rotating the second rotor 40. The rotation of the first rotor 50 causes the nut 52 to rotate. As the nut 52 is rotated, the ball screw shaft 15 is moved in the linear motion direction relatively to the nut 52. As the ball screw shaft 15 moves in the actuator 1f according to the seventh embodiment, the flange 14 is moved in the linear motion direction. Because the rotating body 11B is fixed to the second rotor bracket 42, the linearly moving members 14A protrude from the rotating body 11B by a different length depending on the distance by which the flange 14 moves. The actuator 1f can thus communicate the linear motion achieved by the first rotor 50 alone to the workpiece 97 or a load on the loaded table 96 illustrated in FIG. 1. In the manner described above, the actuator 1f can communicate only the linear motion of the linearly moving members 14A, the linear motion of which is achieved by rotation of the first rotor 50, to the workpiece 97 or a load on the loaded table 96, without driving the second rotor 40.

Second Operation Mode

In the second operation mode, the rotating body 11B is rotated without moving the linearly moving members 14A in the direction in parallel with the rotational center Zr (linear motion direction). When the rotating body 11B is rotated, the linearly moving members 14A are rotated. As the rotating body 11B is rotated, the ball screw shaft 15 is rotated. In this operation mode, the actuator 1f according to the seventh embodiment drives the second rotor 40 and the first rotor 50 at the same rotational frequency but in the opposite directions. Through this operation, the actuator 1f according to the seventh embodiment keeps the relative position of the ball screw shaft 15 with respect to the nut 52 unchanged in the direction in parallel with the rotational center Zr (linear motion direction). In this manner, the linearly moving members 14A can rotate with the rotating body 11B while maintaining their relative positions in the direction in parallel with the rotational center Zr (linear motion direction). Although the rotation of the second rotor 40 causes the ball screw shaft 15 to rotate, the position of the ball screw shaft 15 can remain the same at a particular position in the linear motion direction.

Third Operation Mode

In the third operation mode, the rotating body 11B is rotated, while the linearly moving members 14A are moved in the Z direction (linear motion direction), which is the direction in parallel with the rotational center Zr, by a distance proportional to a rotational amount of the rotating body 11B. In this operation mode, the actuator 1f according to the seventh embodiment rotates the second rotor 40 without driving the first rotor 50. When the rotating body 11B is rotated by the rotation of the second rotor 40, the linearly moving members 14A are also rotated. As the rotating body 11B is rotated, the ball screw shaft 15 is also rotated.

The nut 52 is screwed onto the thread on the ball screw shaft 15 in the actuator 1f. Therefore, as the ball screw shaft 15 is rotated, the thread on the ball screw shaft 15 moves in the linear motion direction at a constant rate along the threaded part of the nut 52. In the third operation mode, because the ball screw shaft 15 rotates with respect to the nut 52, the ball screw shaft 15 is moved in the linear motion direction with respect to the nut 52. Because the rotating body 11B being rotated is fixed to the second rotor bracket 42, the linearly moving members 14A protrude by a different length from the rotating body 11B depending on the distance by which of the flange is moved with the ball screw shaft 15.

Fourth Operation Mode

In the fourth operation mode, the rotating body 11B is rotated while the linearly moving members 14A is moved in the direction in parallel with the rotational center Zr (linear motion direction) by a distance not proportional to a rotation of the rotating body 11B. In this operation mode, the actuator 1f according to the seventh embodiment drives the second rotor 40 and the first rotor 50 to rotate, but at different rotational frequencies.

The actuator 1f according to the seventh embodiment drives the second rotor 40 and the first rotor 50 at different rotational frequencies so that the difference in the rotation amounts of the ball screw shaft 15 and the nut 52, the difference resulting from the difference in the rotational frequencies of the second rotor 40 and the first rotor 50, can be converted into a linear motion of the ball screw shaft 15 in the linear motion direction. Because the rotating body 11B being rotated is fixed to the second rotor bracket 42, the linearly moving members 14A protrude from the rotating body 11B by a varying length correspondingly to a distance by which the flange 14 is moved by the movement of the ball screw shaft 15. While the ball screw shaft 15 is rotated by the rotation of the second rotor 40, the ball screw shaft 15 is enabled to move up or down at a given speed in the linear motion direction.

The actuator device 100 can communicate the rotational motion of the rotating body 11B and the linear motion of the linearly moving members 14A to the workpiece 97 or a load on the loaded table 96 by sequentially switching to the first operation mode, the second operation mode, the third operation mode, or the fourth operation mode. In the first operation mode, the third operation mode, and the fourth operation mode, for example, the actuator device 100 can move the linearly moving members 14A upwardly in a plane in front of the paper, as illustrated in FIG. 14. In the first operation mode, the third operation mode, and the fourth operation mode, the actuator device 100 can move the linearly moving members 14A downwardly in a plane in front of the paper reversely to the operation illustrated in FIG. 14.

An axial line P11 at the center of the linearly moving member 14A as illustrated in FIG. 14 extends in a direction in parallel with the rotational center Zr. In the actuator 1f according to the seventh embodiment, the linearly moving members 14A serve as linear motion guiding shafts, and the axial line P11 is decentered with respect to the axial line of the rotational center Zr by a decentering distance e11. The decentering distance e11 by which the axial line P11 of the linearly moving members 14A is decentered with respect to the axial line (the rotational center Zr) of the ball screw shaft 15 is a value larger than the radius of the ball screw shaft 15. The linearly moving members 14A are a plurality of linear motion guiding shafts decentered with respect to and extending in parallel with the axial line of the ball screw shaft 15 (the rotational center Zr). The linearly moving members 14A move linearly in the Z direction that is a direction in parallel with the rotational center Zr by moving through and sliding in the respective linear bushes 44A, while the rotation of the ball screw shaft 15 about the rotational center Zr upon receiving of the rotation of the nut 52 is restrained.

When the ball screw shaft 15 is allowed to be rotated by the rotating of the second rotor 40, the actuator 1f can communicate the rotational motion of the second rotor 40 to the rotating body 11B, while restraining the movement of the ball screw shaft 15 in the linear motion direction by rotating the first rotor 50 in a direction reverse to the rotation of the second rotor 40. As explained above, the actuator 1f can keep the ball screw shaft 15 at the same particular position in the linear motion direction, or be moved up or down in the linear motion direction at a given speed, even when the ball screw shaft 15 is rotated by the rotation of the second rotor 40.

Eighth Embodiment

Figure 15:
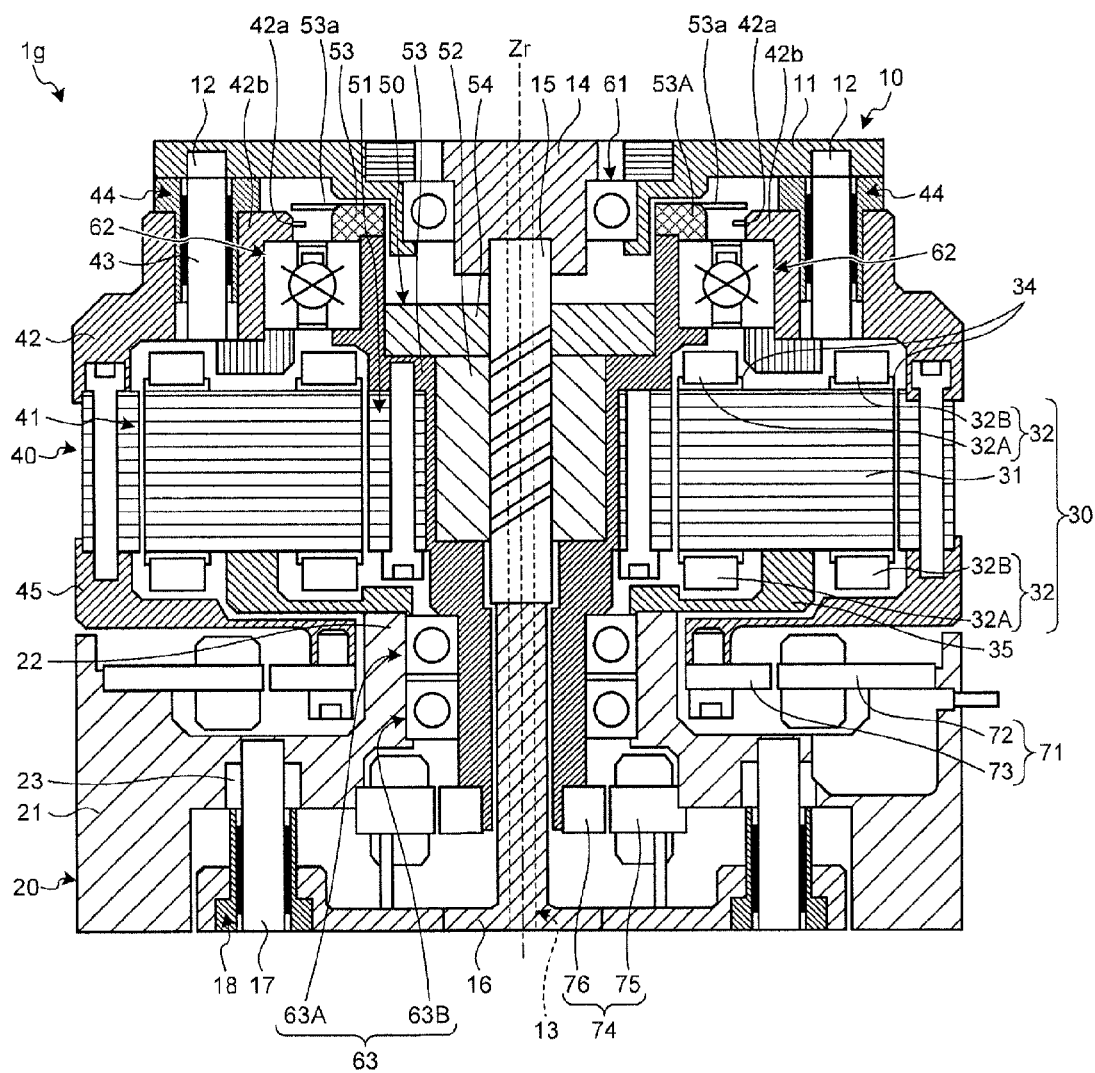
FIG. 15 is a schematic cross-sectional view taken along a virtual plane including a rotational center in an actuator according to an eighth embodiment of the present invention.

FIG. 15 is a schematic cross-sectional view taken along a virtual plane including a rotational center in an actuator according to an eighth embodiment of the present invention. The same elements as those explained in the embodiments described above are assigned with the same reference signs, and redundant explanations thereof are omitted hereunder.

In this actuator 1g according to the eighth embodiment, the ball screw shaft 15 has a hole 13 that is a hollow extending in parallel with the rotational center Zr, which is not provided in the actuator 1 according to the first embodiment. In the actuator 1g according to the eighth embodiment, the hole 13 is a through-hole extending into the flange 14 and the stopper 16, both of which share the same axis with the rotational center Zr. With this structure of the actuator 1g according to the eighth embodiment, a wire or a pipe can be passed through the hole 13.

The third bearing 61 for rotatably supporting the second rotor 40 is provided on the radially outer circumference of the flange 14. When the plate 11 of the rotating body 10 is elevated, the gap between the plate 11 and the second rotor bracket 42 increases. In some cases, it is preferable to protect the second bearing 62 from foreign substances. In the actuator 1g according to the eighth embodiment, therefore, covers 53a and 42a are provided on the side of the second bearing 62 nearer to the plate 11 of the rotating body 10, at positions overlapping with at least a part of the second bearing 62 in a view in the direction in parallel with the rotational center Zr (linear motion direction).

The cover 53a extends from an inner race fixing member 53A provided to the third bearing 61. The cover 53a is preferably a ring-shaped plate member having the center at the rotational center Zr. The cover 42a extends from an outer race fixing member 42b provided to the second rotor bracket 42. The cover 42a is also preferably a ring-shaped plate member having the center at the rotational center Zr. The actuator 1g according to the eighth embodiment can protect the second bearing 62 from foreign substances as long as at least one of the cover 53a and the cover 42a is provided. The cover 53a and the cover 42a preferably overlap each other at least partially in a view in the direction in parallel with the rotational center Zr (linear motion direction), and have a labyrinth structure in which the cover 53a and the cover 42a are positioned alternatingly at different heights (positions in the linear motion direction).

Ninth Embodiment

Figure 16:
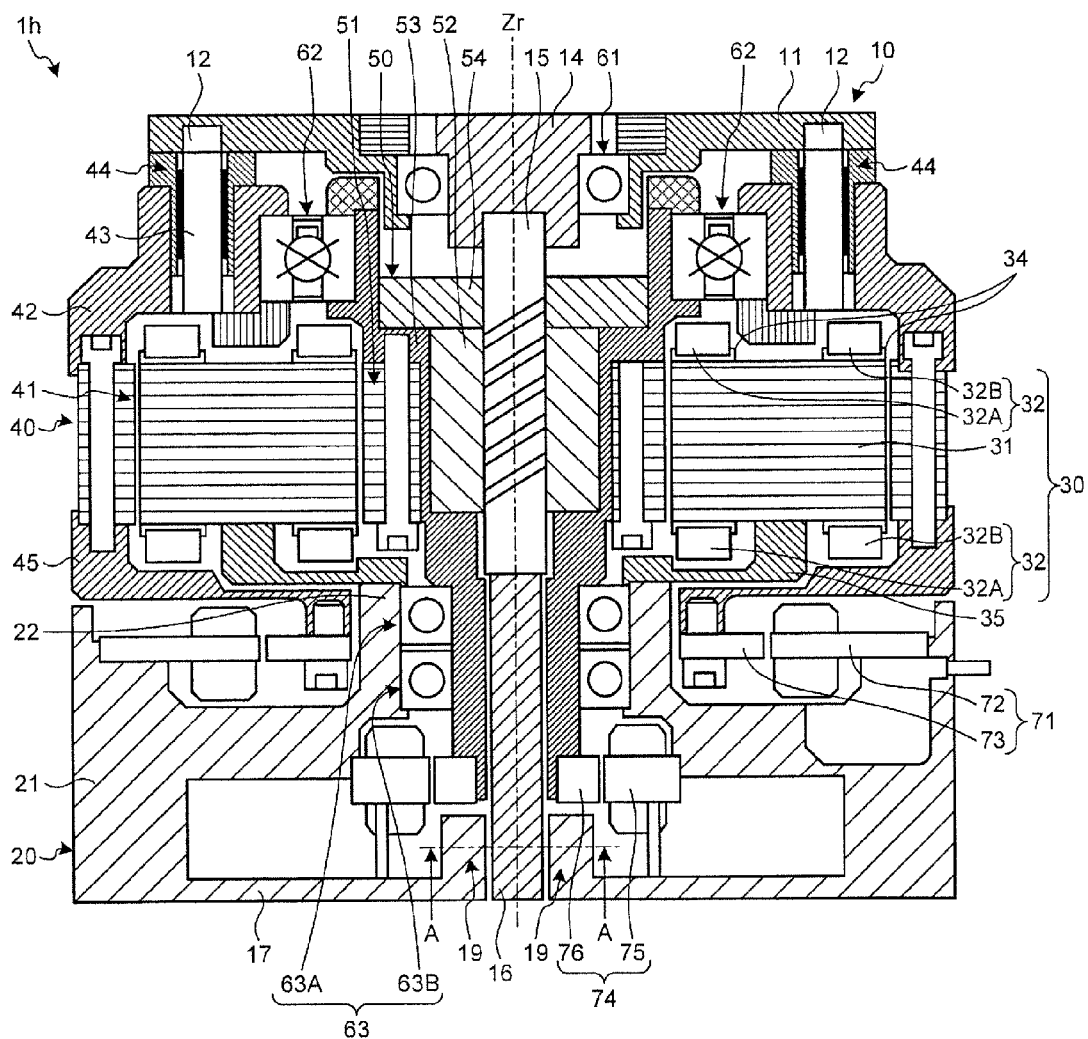
FIG. 16 is a schematic cross-sectional view taken along a virtual plane including a rotational center in an actuator according to a ninth embodiment of the present invention.
Figure 17:
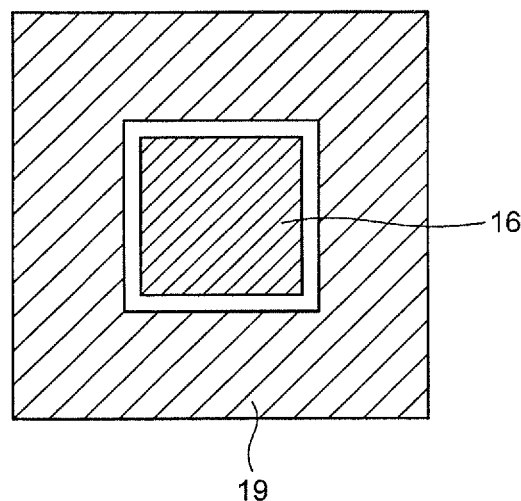
FIG. 17 is an exemplary cross-sectional view taken along A-A in FIG. 16.
Figure 18:
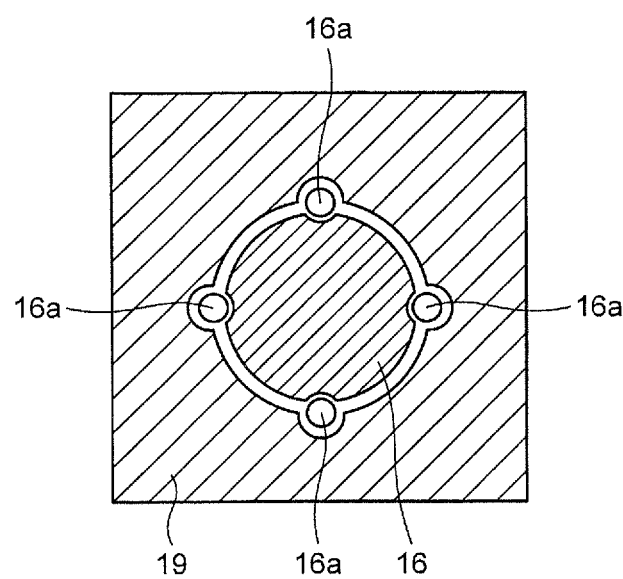
FIG. 18 is another exemplary cross-sectional view taken along A-A in FIG. 16.

FIG. 16 is a schematic cross-sectional view taken along a virtual plane including a rotational center in an actuator according to a ninth embodiment of the present invention. FIG. 17 is an exemplary cross-sectional view taken along A-A in FIG. 16. FIG. 18 is another exemplary cross-sectional view taken along A-A in FIG. 16. The same elements as those explained in the embodiments described above are assigned with the same reference signs, and redundant explanations thereof are omitted hereunder.

This actuator 1h according to the ninth embodiment includes a linear motion guiding mechanism 19. As illustrated in FIG. 17, the cross section of the outer circumference of the stopper 16 has a shape other than of a circle, e.g., a rectangular shape. To allow the outer circumference of the stopper 16 to be guided, the linear motion guiding mechanism 19 has a through-hole in such a size that the outer circumference of the stopper 16 is not brought into contact, by ensuring a given clearance around the non-circular cross section of the outer circumference of the stopper 16. The linear motion guiding mechanism 19 can restrain the ball screw shaft 15 from being rotated even when a rotational force is applied to the ball screw shaft 15, because the linear motion guiding mechanism 19 abuts against the outer circumference of the stopper 16.

The linear motion guiding mechanism 19 may have another structure, e.g., what is called a ball-spline structure as illustrated in FIG. 18. The outer circumference of the stopper 16 is held in point-contact with the linear motion guiding mechanism 19 via balls 16a. While the frictional force in the linear motion direction is small in the stopper 16, the rotation of the stopper 16 about the rotational center Zr is restrained. With this structure, the actuator 1h according to the ninth embodiment can restrain the ball screw shaft 15 from being rotated.

Tenth Embodiment

Figure 19:
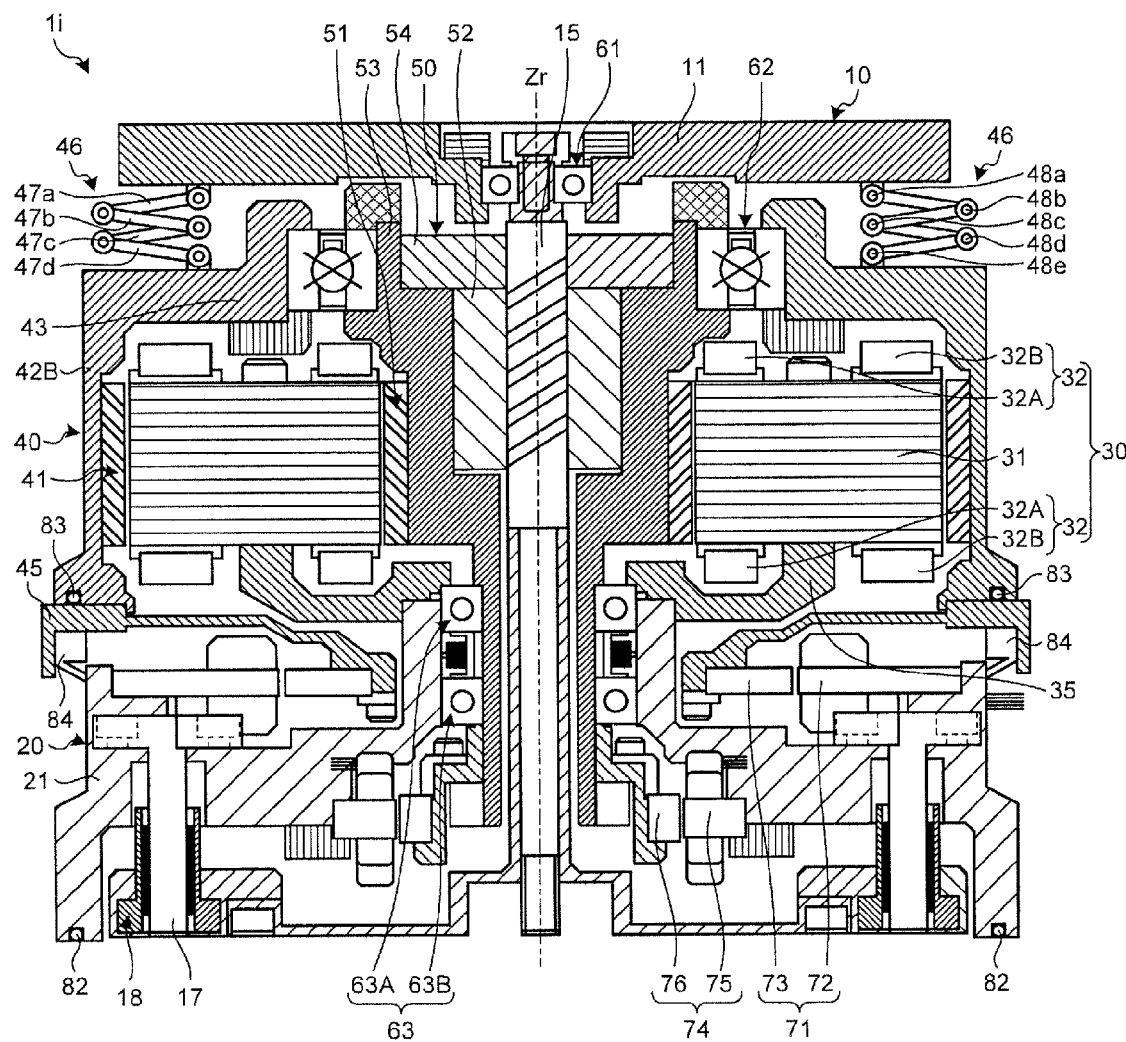
FIG. 19 is a schematic cross-sectional view taken along a virtual plane including a rotational center in an actuator according to a tenth embodiment of the present invention.

FIG. 19 is a schematic cross-sectional view taken along a virtual plane including a rotational center in an actuator according to a tenth embodiment of the present invention. The same elements as those explained in the embodiments described above are assigned with the same reference signs, and redundant explanations thereof are omitted hereunder.

This actuator 1i according to the tenth embodiment includes a linear motion guiding mechanism 46. The linear motion guiding mechanism 46 includes arms 47a, 47b, 47c, and 47d, and rotating portions 48a, 48b, 48c, 48d, and 48e, as illustrated in FIG. 19, acting as a linking mechanism that becomes extended or compressed correspondingly to the distance by which the plate 11 of the rotating body 10 is moved in the linear motion direction with respect to the second rotor bracket 42B. The linking mechanism can become extended or compressed correspondingly to the distance by which the ball screw shaft 15 is moved in the linear motion direction.

The rotating portion 48a is fixed to the surface of the plate 11 facing the second rotor bracket 42B, and is connected to one end of the arm 47a. The rotating portion 48b is connected to the other end of the arm 47a, and is connected to one end of the arm 47b. The rotating portion 48c is connected to the other end of the arm 47b, and is connected to one end of the arm 47c. The rotating portion 48d is connected to the other end of the arm 47c, and is connected to one end of the arm 47d. The rotating portion 48e is fixed to the surface of the second rotor bracket 42B facing the plate 11, and is connected to the other end of the arm 47d. The rotating portions 48a, 48b, 48c, 48d, and 48e rotatably support the ends of the arms 47a, 47b, 47c, and 47d.

When the first rotor 50 in the actuator 1i is rotated, the nut 52 fixed to the first rotor bracket 53 is also rotated. Because the nut 52 is screwed onto the thread on the ball screw shaft 15 in the actuator 1i, the ball screw shaft 15 is carried along the thread of the nut 52 in the linear motion direction as the nut 52 is rotated. The ball screw shaft 15 is thus moved relatively to the nut 52 in the linear motion direction, as the nut 52 is rotated. The rotating portion 48a as well as the plate 11 are also moved as the ball screw shaft 15 is moved in the linear motion direction, thereby causing the distance between the plate 11 of the rotating body 10 and the second rotor bracket 42B to change.

When the distance between the plate 11 of the rotating body 10 and the second rotor bracket 42B changes, the positions of the arms 47a, 47b, 47c, and 47d also change, while the rotating portions 48a, 48b, 48c, 48d, and 48e serve as fulcrums, so that the linear motion guiding mechanism 46 becomes extended or compressed.

The actuator 1i rotates the second rotor 40 independently from the operation of causing the first rotor 50 to rotate. When the second rotor 40 is rotated, the rotor core 41 is also rotated, so that the second rotor bracket 42B and the support member 45 are also rotated.

The linear motion guiding mechanism 46 allows the rotating body 10 to rotate by enabling the rotating portion 48e to rotate with the second rotor bracket 42B of the second rotor 40. The linear motion guiding mechanism 46 can communicate the rotation of the second rotor 40 to the rotating body 10 even when the rotating body 10 is moved in the linear motion direction while being rotated.

The linear motion guiding mechanism 46 can omit the linear motion guiding mechanism implemented as combinations of the sliders 43 and the linear bushes 44 described in the earlier embodiments. The internal space of the actuator 1i can therefore be used effectively, so that space saving can be achieved. The actuator 1i may also be provided with the linear motion guiding mechanism 46 instead of the linear motion guiding mechanism implemented as a combination of the linear bushes 18 and the sliders 17.

Eleventh Embodiment

Figure 20:
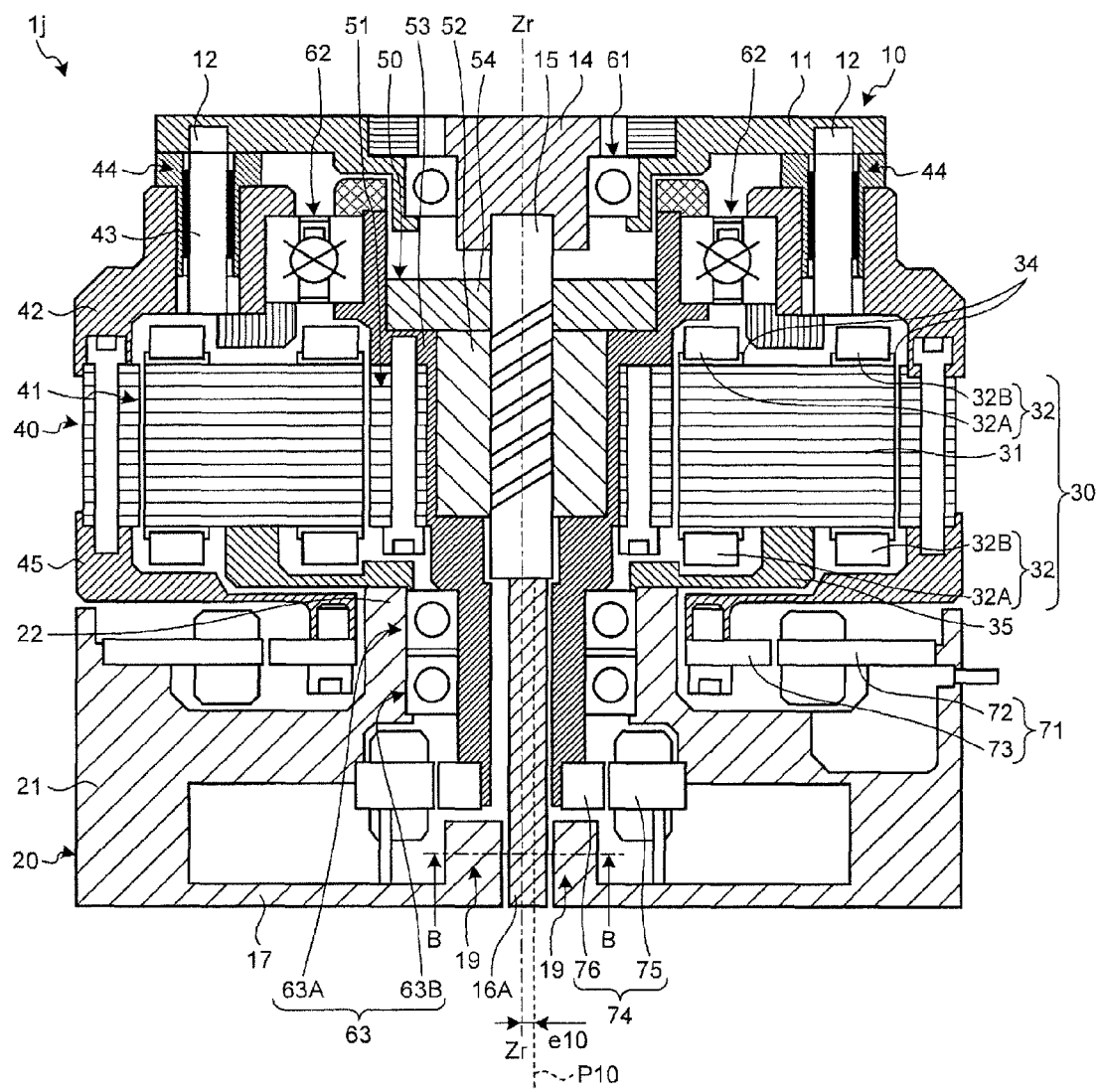
FIG. 20 is a schematic cross-sectional view taken along a virtual plane including a rotational center in an actuator according to an eleventh embodiment of the present invention.
Figure 21:
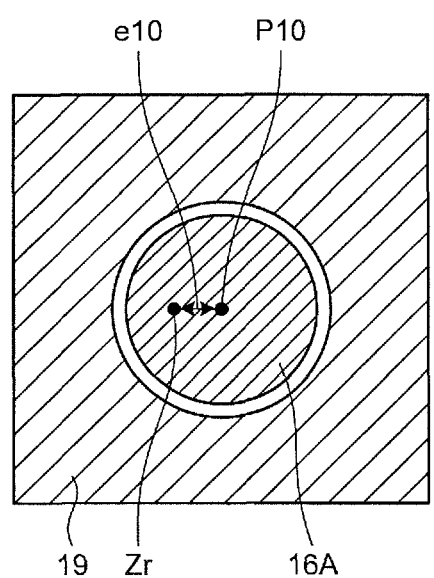
FIG. 21 is an exemplary cross-sectional view taken along B-B in FIG. 20.

FIG. 20 is a schematic cross-sectional view taken along a virtual plane including a rotational center in an actuator according to an eleventh embodiment. FIG. 21 is an exemplary cross-sectional view taken along B-B in FIG. 20. The same elements as those explained in the embodiments described above are assigned with the same reference signs, and redundant explanations thereof are omitted hereunder.

This actuator 1j according to the eleventh embodiment is also provided with the linear motion guiding mechanism 19. An axial line P10 representing the center of the stopper 16A extends in the direction in parallel with the rotational center Zr that is the axial line of the ball screw shaft 15, as illustrated in FIGS. 20 and 21. The stopper 16A serving as a linear motion guiding shaft is provided to one end of the ball screw shaft 15 in the axial direction (linear motion direction), and is decentered with respect to and extends in parallel with the rotational center Zr that is the axial line of the ball screw shaft 15. The outer circumference of the stopper 16A is circular, as illustrated in the cross section in FIG. 21 across B-B in FIG. 20. To allow the outer circumference of the stopper 16 to be guided, the linear motion guiding mechanism 19 has a through-hole in such a size that the outer circumference of the stopper 16A is not brought into contact, by ensuring a given clearance around the outer circumference of the stopper 16A.

The stopper 16A serves as a linear motion guiding shaft, and the axial line 210 of the stopper 16A is decentered with respect to the axial line by a decentering distance e10 along the rotational center Zr. The stopper 16A moves linearly in parallel with the rotational center Zr, by moving through and sliding in the linear motion guiding mechanism 19, while the rotation of the ball screw shaft 15 about the rotational center Zr upon receiving of the rotation of the nut 52 is restrained. The linear motion guiding mechanism 19 can restrain the ball screw shaft 15 from being rotated even when a rotational force is applied to the ball screw shaft 15, because the linear motion guiding mechanism 19 abuts against the outer circumference of the stopper 16A. Alternatively, the linear motion guiding mechanism 19 may be a linear bush.

Twelfth Embodiment

Figure 22:
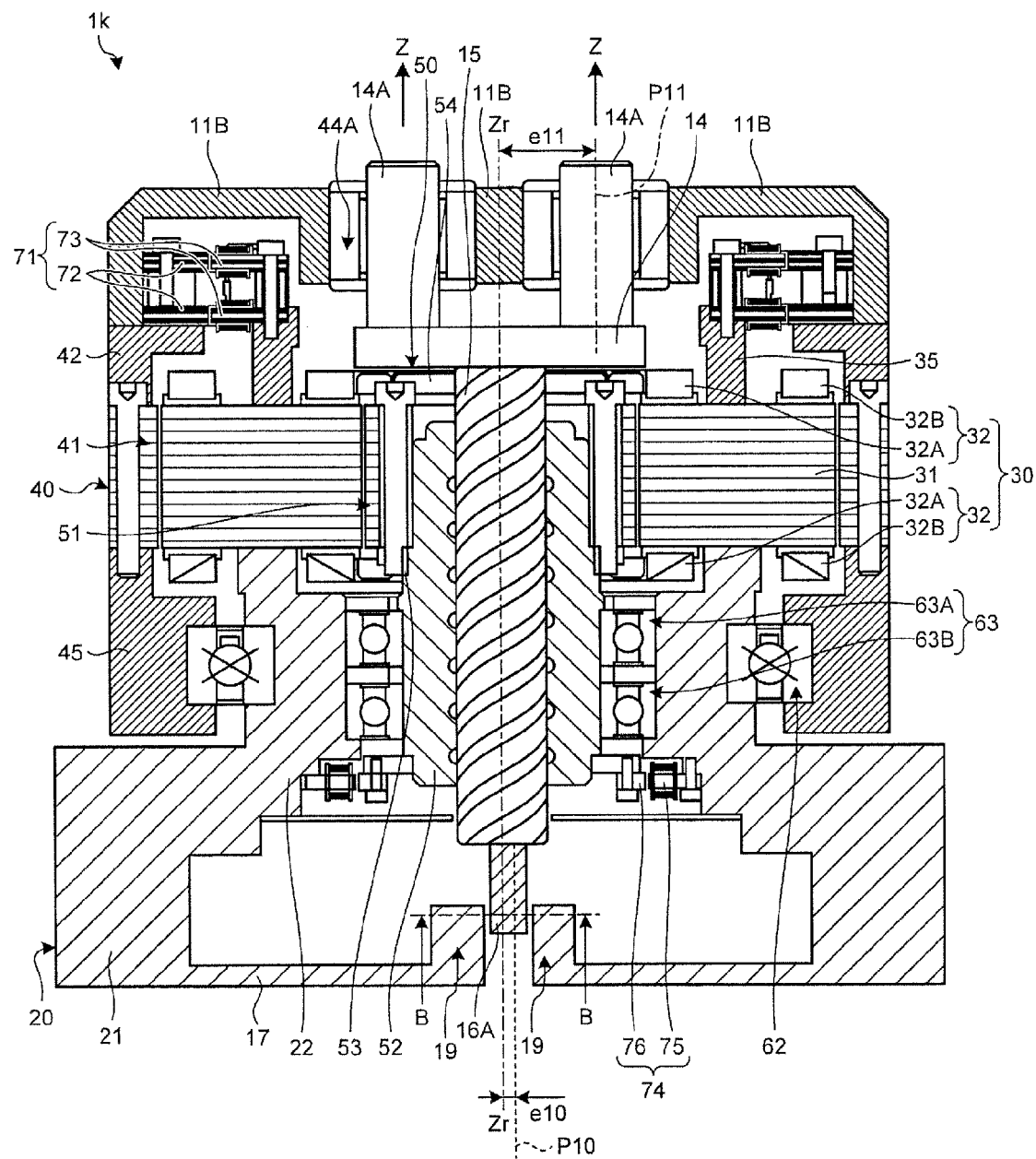
FIG. 22 is a schematic cross-sectional view taken along a virtual plane including a rotational center in an actuator according to a twelfth embodiment of the present invention.

FIG. 22 is a schematic cross-sectional view taken along a virtual plane including a rotational center in an actuator according to a twelfth embodiment of the present invention. The same elements as those explained in the embodiments described above are assigned with the same reference signs, and redundant explanations thereof are omitted hereunder.

This actuator 1k according to the twelfth embodiment has a structure of the actuator 1f according to the seventh embodiment further provided with the stopper 16A, which is provided to the actuator 1j according to the eleventh embodiment. The actuator 1k according to the twelfth embodiment can therefore control the rotating body 11B and the linearly moving members 14A to operate the first operation mode, the second operation mode, the third operation mode, and the fourth operation mode implementing four different combinations of rotational and linear motions, which are achieved by driving the second rotor 40 and the first rotor 50 in different combinations, in the same manner as the actuator 1f according to the seventh embodiment.

The linearly moving members 14A are rod-like members extending in a direction in parallel with the rotational center Zr. The rotating body 11B is provided with the linear bushes 44A at positions matching the positions of the respective linearly moving members 14A in a view in a direction in parallel with the rotational center Zr (linear motion direction). In the actuator 1k according to the twelfth embodiment, as an example, four linear motion guiding mechanisms, each of which is a combination of the linearly moving member 14A and the linear bush 44A, are arranged in the circumferential direction of the rotating body 11B, in the same manner as in the actuator 1f illustrated in FIG. 13. The linearly moving members 14A are provided at positions offset from the rotational center Zr, that is, are positioned radially outside of the rotational center Zr, so that the linearly moving members 14A are rotated as the rotating body 11B is rotated.

The axial line P11 at the center of the linearly moving member 14A extends in a direction in parallel with the rotational center Zr. In the actuator 1k according to the twelfth embodiment, the linearly moving member 14A serves as a linear motion guiding shaft, and the axial line P11 is decentered with respect to the axial line of the rotational center Zr by a decentering distance e11. The decentering distance e11 by which the axial line P11 is decentered is a value larger than the radius of the ball screw shaft 15. The linearly moving members 14A move linearly in the Z direction that is a direction in parallel with the rotational center Zr by moving through and sliding in the respective linear bushes 44A while the rotation of the ball screw shaft 15 about the rotational center Zr upon receiving of the rotation of the nut 52 is restrained.

In the actuator 1k according to the twelfth embodiment, however, the stopper 16A also serves as a linear motion guiding shaft, and the axial line P10 is also decentered with respect to the axial line of the rotational center Zr by the decentering distance e10, as illustrated in the cross section along B-B in FIG. 21. In other words, in the actuator 1k, one end of the ball screw shaft 15 in the axial direction (linear motion direction) is provided with the stopper 16A, and the other end is provided with the linearly moving members 14A, and the stopper 16A and the linearly moving members 14A both serve as the linear motion guiding shafts decentered with respect to and extending in parallel with the rotational center Zr that is the axial line of the ball screw shaft 15. The stopper 16A moves linearly in parallel with the rotational center Zr by moving through or sliding in the linear motion guiding mechanism 19, while the rotation of the ball screw shaft 15 about the rotational center Zr upon receiving of the rotation of the nut 52 is restrained. The stopper 16A thus serves as a linear motion guiding shaft, and therefore, when the stopper 16A is inside of in the linear motion guiding mechanism 19, the operation mode of the actuator 1k according to the twelfth embodiment is limited to the first operation mode in which the rotating body 11B is not permitted to rotate, while the linearly moving members 14A are allowed to move in a direction in parallel with the rotational center Zr (linear motion direction). By adjusting the length of the stopper 16A in the linear motion direction, the actuator 1k according to the twelfth embodiment can limit the operation mode to the first operation mode while the stopper 16A is inside of the linear motion guiding mechanism 19, among the first, the second, the third, and the fourth operation mode explained above.

Thirteenth Embodiment

Figure 23:
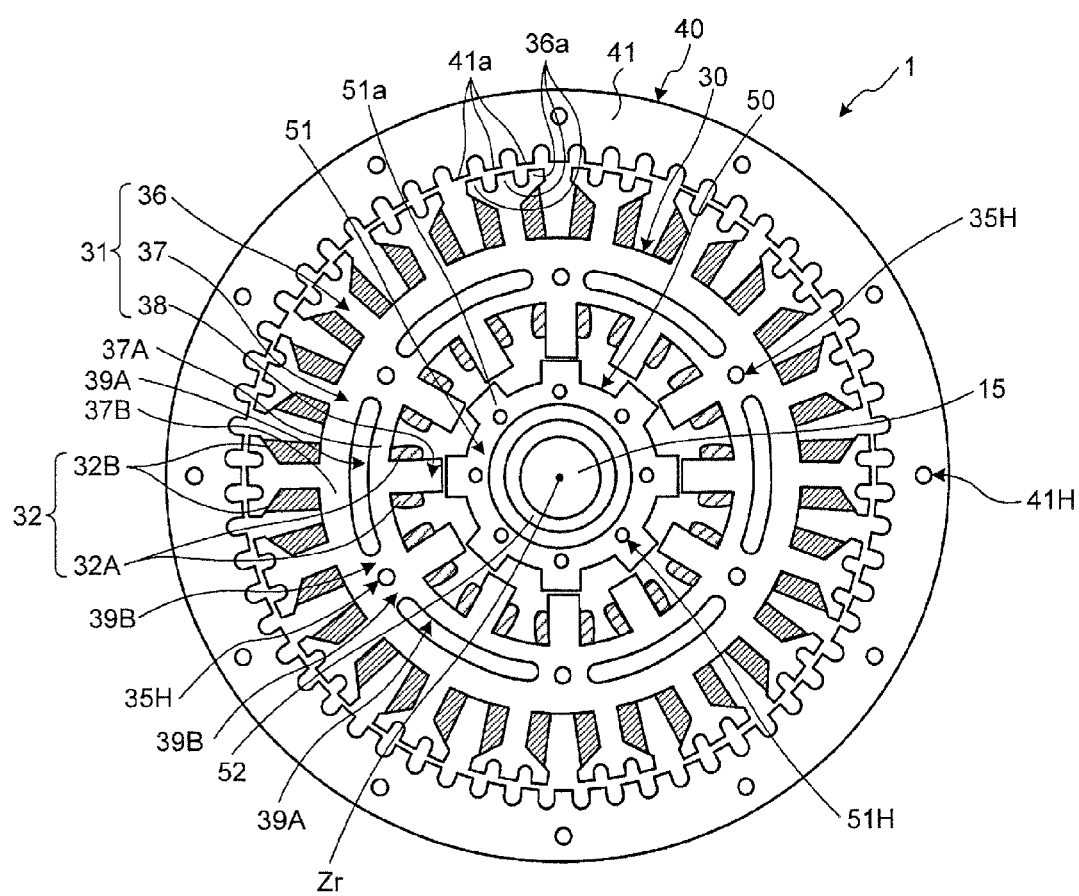
FIG. 23 is a schematic cross-sectional view taken along a virtual plane that is perpendicular to the rotational center in the first rotor, the second rotor, and the stator in the structure of the actuator illustrated in FIG. 2.

FIG. 23 is a schematic cross-sectional view taken along a virtual plane that is perpendicular to a rotational center in the first rotor, the second rotor, and the stator in the structure of the actuator illustrated in FIG. 2. The same elements as those explained in the embodiments described above are assigned with the same reference signs, and redundant explanations thereof are omitted hereunder.

As illustrated in FIG. 23, the first rotor 50 has a cylindrical shape surrounding the ball screw shaft 15 on the side of the rotational center Zr. The stator 30 also has a cylindrical shape surrounding the first rotor 50 on the side of the rotational center Zr. The second rotor 40 also has a cylindrical shape surrounding the stator 30 on the side of the rotational center Zr.

The stator core (stator pole) 31 of the stator 30 has the outer teeth (magnetic poles) 36 and the inner teeth (magnetic poles) 38 that are provided equally spaced along the circumferential direction of which center is at the rotational center Zr, and are integrated with the back yoke 37. The stator core 31 is fixed to the support member 35 illustrated in FIG. 2, with fastening members such as bolts inserted into bolt fastening holes 35H provided to the back yoke 37 illustrated in FIG. 23, and the stator core 31 is fixed to the housing base 21. The bolt fastening holes 35H are throughhole provided to and passing through the back yoke 37 in a direction in parallel with the rotational center Zr.

In the manner described above, the stator 30 includes the circular back yoke 37, the inner teeth 38 circumferentially provided and protruding from the back yoke 37 toward radial interior, and the outer teeth 36 provided in the circumferential direction and protruding from the back yoke 37 toward radial exterior. The back yoke 37 is provided with a plurality of slits 39A arranged along the circumferential direction.

The slits 39A divide the back yoke 37 into an inner back yoke 37A that is positioned radially internal to the slits 39A, and an outer back yoke 37B that is positioned radially external to the slits 39A. The slits 39A are voids provided between the radially inner and outer surfaces of the back yoke 37, and extending along circumferential direction. These voids are through-holes provided to and passing through the back yoke 37 in a direction in parallel with the rotational center Zr.

Connecting portions 39B lie between the adjacent slits 39A in the circumferential direction. The connecting portions 39B connect and integrate the inner back yoke 37A and the outer back yoke 37B. The connecting portion 39B is positioned between the adjacent slits 39A in the circumferential direction. In the thirteenth embodiment, each of the connecting portions 39B is provided between a slit 39A and a bolt fastening hole 35H. Because the stator 30 is provided with the bolt fastening holes 35H that are through-holes with which the stator 30 is fixed, and each of the bolt fastening holes 35H is provided between the adjacent slits 39A in the circumferential direction, the bolt fastening holes 35H can be also used for fixing the outer teeth 36 and the inner teeth 38. In this manner, the stator 30 can reduce the radial thickness of the back yoke 37. Because the stator 30 can be thus reduced in size, the actuator 1 itself can be reduced in size. If the bolt fastening holes 35H were not provided between the adjacent slits 39A, the connecting portion 39B would have a length equal to the circumferential distance between the adjacent slits 39A.

The void of the slit 39A is positioned between an inner tooth 38 and an outer tooth 36 on a radial extension. The inner tooth 38 and the outer tooth 36 on a radial extension are connected to the inner back yoke 37A and to the outer back yoke 37B, respectively, via the void of the slit 39A in the radial direction. The inner tooth 38 and the outer tooth 36 on a radial extension are thus divided by the void of the corresponding slit 39A. With this structure, the outer tooth 36 and the inner tooth 38 on a radial extension are magnetically separated by the void of the corresponding slit 39A, so that the possibility of the outer teeth 36 and the inner teeth 38 affecting each other is reduced. The rotational accuracies of the first rotor 50 and the second rotor 40 can therefore be improved.

In addition, each of the slit 39A extends in the circumferential direction toward the base of the inner tooth 38 or the outer tooth 36 that is adjacent to the inner tooth 38 and the outer tooth 36 arranged in line on the radial extension. With this structure, because the outer teeth 36 and the inner teeth 38 are separated by the voids extending in the circumferential direction, the possibility of the outer teeth 36 and the inner teeth 38 affecting each other can be reduced, even when the outer teeth 36 and the inner teeth 38 are separately magnetized, so that the rotational accuracies of the first rotor 50 and the second rotor 40 can be improved.

The circumferential width of the slit 39A is larger than the circumferential width of the connecting portion 39B. With this structure, because the circumferential width of the connecting portion 39B is smaller, the possibility of the outer teeth 36 and the inner teeth 38 affecting each other can be reduced even when the outer teeth 36 and the inner teeth 38 are separately magnetized, so that the rotational accuracies of the first rotor 50 and the second rotor 40 can be improved.

The circumferential width of the connecting portion 39B preferably has a length by which the magnetic flux generated by magnetization of the magnetizing coils 32A or the magnetizing coils 32B saturates. With this structure, the connecting portion 39B in the stator 30 reduces the possibility of magnetic fluxes generated by the outer teeth 36 and the inner teeth 38 affecting each other. This structure can also suppress the magnetic flux leakage from the rotor core 41 and the rotor core 51.

The magnetizing coils 32A are wound around the outer teeth 36 positioned radially external, and the magnetizing coils 32B are wound around the inner teeth 38 positioned radially internal, both of the teeth illustrated in FIG. 23. The magnetizing coils 32B, for example, produce a magnetic flux in the outer teeth 36 positioned radially external. The magnetizing coils 32A produce a magnetic flux in the inner teeth 38 positioned radially internal. While the magnetizing coils 32B are directly wound around each of the outer teeth 36, a bobbin around which the magnetizing coils 32A are wound is placed around each of the inner teeth 38. The ways in which the magnetizing coils 32A and 32B are wound may be the same, or the magnetizing coil 32A may be directly wound around each of the outer teeth 36, and a bobbin around which the magnetizing coil 32B is wound may be placed around each of the inner teeth 38. The ways in which the magnetizing coils 32A and 32B are wound around are not particularly limited.

In the thirteenth embodiment, the number of stator slots with the outer teeth 36 around which the magnetizing coils 32B are wound is 18 in the circumferential direction. The number of stator slots with the inner teeth 38 around which the magnetizing coils 32A are wound is 12. The numbers of stator slots in the circumferential direction are not limited thereto, and the stator slots are provided as appropriate, in an appropriate number.

The rotor core 41 has teeth 41a protruding from the inner circumferential surface. The rotor core 51 has teeth 51a protruding from the radially outer circumferential surface. In the thirteenth embodiment, 60 teeth 41a are provided on the inner circumferential surface of the rotor core 41 in the circumferential direction. Eight teeth 51a are provided on the outer circumferential surface of the rotor core 51 in the circumferential direction. The numbers of the teeth 41a and the teeth 51a provided in the circumferential direction are not limited to those mentioned above, and are provided as appropriate, in an appropriate number. Teeth 36a protruding from the radially outer circumferential surface of the radially outer teeth 36 may also be provided.

The rotor core 51 and the first rotor bracket 53 illustrated in FIG. 2 are fixed with the fastening members such as bolts inserted into bolt fastening holes 51H illustrated in FIG. 23. The rotor core 41 and the second rotor bracket 42 illustrated in FIG. 2 are fixed with fastening members such as bolts inserted into bolt fastening holes 41H illustrated in FIG. 23.

The rotor core 41 and the rotor core 51 are those generally referred to as variable reluctance (VR) rotors. Taking advantage of the fact that the reluctance (magnetic resistance) changes depending on the position in rotation, the rotor core 51 is rotated in such a manner that the magnetic resistance becomes minimum synchronously with the rotating magnetic fields in the inner teeth 38 of the stator core 31, generated by the magnetizing coils 32B. Also taking advantage of the fact that the reluctance (magnetic resistance) changes depending on the position in rotation, the rotor core 41 is rotated in such a manner that the magnetic resistance becomes minimum synchronously with the rotating magnetic fields in the outer teeth 36 of the stator core 31, generated by the magnetizing coils 32A. The actuator 1 according to the thirteenth embodiment uses a three-phase variable reluctance motor that is driven with a three-phase rotating magnetic field which is achieved by magnetizing the magnetizing coils 32A and 32B, for example. In the actuator 1 according to the thirteenth embodiment, the rotating magnetic field achieved by magnetizing the magnetizing coils 32A and 32B may be of two-phase or five-phase, and the number of phases are not particularly limited.

As explained above, the stator 30 includes the circular back yoke 37, the inner teeth 38, and the outer teeth 36. The circular back yoke 37 is provided with the slits 39A that are a plurality of voids that are circumferentially arranged, the inner back yoke 37A positioned radially internal to the slits 39A, the outer back yoke 37B positioned radially external to the slits 39A, and the connecting portion 39B that connects the inner back yoke 37A and the outer back yoke 37B between the adjacent slits 39A in the circumferential direction. The inner teeth 38 protrude from the inner back yoke 37A toward the radial interior and provided in plurality in the circumferential direction. The outer teeth 36 protrude from the outer back yoke 37B toward the radial exterior, and provided in plurality in the circumferential direction.

By providing voids between the inner back yoke 37A and the outer back yoke 37B, the magnetic resistance is increased, so that the effect of a magnetic interference between the inner back yoke 37A and the outer back yoke 37B is reduced. As a result, the possibility of the magnetic fields generated in the outer teeth 36 and the inner teeth 38 interfering each other is reduced. Therefore, when the first rotor 50 positioned radially internal and relatively rotating and the second rotor 40 positioned radially external and rotating relatively are driven independently, the possibility of the outer teeth 36 and the inner teeth 38 affecting each other is reduced, even when the outer teeth 36 and the inner teeth 38 are separately magnetized. Hence, the rotational accuracies of the first rotor 50 and the second rotor 40 can be improved.

With the structure described above, the circular back yoke 37, the inner teeth 38, and the outer teeth 36 can be manufactured with one mould. The stator 30 can thus reduce the mould cost. Furthermore, with the structure described above, assembly costs can be reduced, so that the cost reduction of the stator 30 can be promoted. Furthermore, because the circular back yoke 37, the inner teeth 38, and the outer teeth 36 can be manufactured with one mould, the hours required in stamping can be reduced as well.

With the structure described above, the slits 39A enables the back yoke 37 to be a hollow structure, so that the stator can be reduced in weight. Furthermore, because the slits 39A can be used as a space for enclosing the connections of the magnetizing coils 32A, 32B, or the like, the connections can be prevented from sticking out, so that the actuator 1 can be reduced in size.

In the controller 90 of the actuator device 100, the CPU 91 outputs a driving signal to the AMP 92, and the AMP 92 supplies the driving current Mi to the actuator 1. The actuator 1 drives the magnetizing coils 32A and the magnetizing coils 32B illustrated in FIG. 23 separately, based on the driving current Mi. The controller 90 can therefore control to drive and to stop the first rotor 50 independently from driving and stopping of the second rotor 40. Similarly, the controller 90 can control to drive and to stop the second rotor 40 independently from driving and stopping of the first rotor 50. The controller 90 can also control the rotational frequency and the rotating direction of the second rotor 40 independently from those of the first rotor 50, and vice versa.

Fourteenth Embodiment

Figure 24:
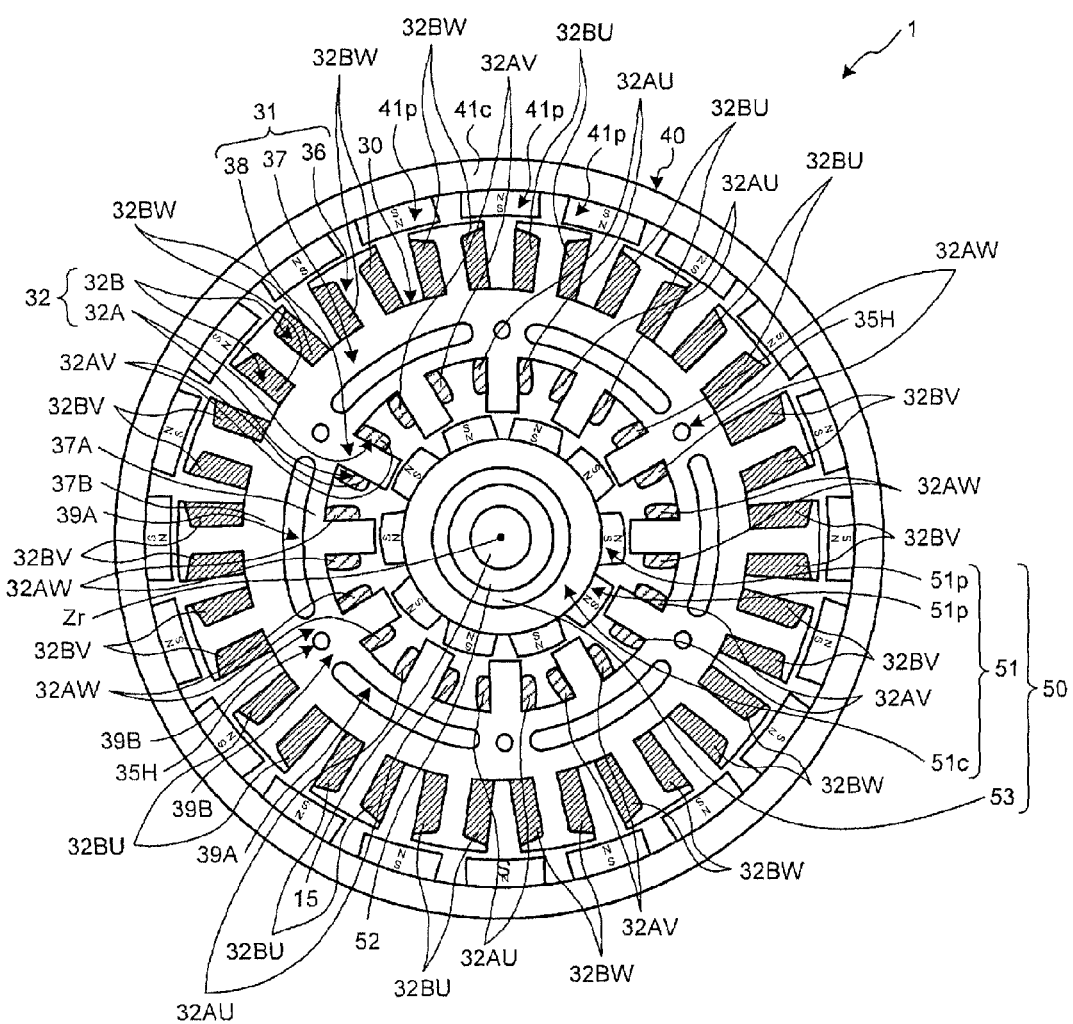
FIG. 24 is a schematic cross-sectional view taken along a virtual plane that is perpendicular to the rotational center in the first rotor, the second rotor, and the stator in the actuator illustrated in FIG. 2.

FIG. 24 is a schematic cross-sectional view taken along a virtual plane that is perpendicular to the rotational center in the first rotor, the second rotor, and the stator in the actuator illustrated in FIG. 2. The same elements as those explained in the embodiments described above are assigned with the same reference signs, and redundant explanations thereof are omitted hereunder.

A plurality of magnets 41p are mounted on the inner circumferential surface of a rotor core 41c of the second rotor 40. A plurality of magnets 51p are also mounted on the radially outer circumferential surface of a rotor core 51c of the first rotor 50. These magnets are permanent magnets, and the S pole and the N pole of these magnets are positioned alternatingly along the circumferential direction of the rotor cores 41, 51. In this embodiment, the rotor core 41 is what is called a surface-mounted magnet motor rotor, but may be modified as required, without limitation to that explained in the present embodiment. For example, the rotor core 41 may be a magnet-embedded rotor in which a plurality of magnets 41p are embedded in the rotor core 41c of the second rotor 40.

The magnetizing coils 32A are wound around the outer teeth 36 positioned radially external, and the magnetizing coils 32B are wound around the inner teeth 38 positioned radially internal, both of the teeth illustrated in FIG. 24. For example, the magnetizing coils 32B produce magnetic fluxes in the outer teeth 36 positioned radially external, and the magnetizing coils 32A produce magnetic fluxes in the inner teeth 38 positioned radially internal.

In the fourteenth embodiment, the number of stator slots with the outer teeth 36 around which the magnetizing coils 32B are wound is 18 in the circumferential direction. The number of stator slots with the inner teeth 38 around which the magnetizing coils 32A are wound around is 12. The numbers of stator slots in the circumferential direction are not limited thereto, and the stator slots are provided as appropriate, in an appropriate number.

To allow a three-phase current to be passed, the magnetizing coils 32A includes a magnetizing coil 32AU, a magnetizing coil 32AV, and a magnetizing coil 32AW. The magnetizing coil 32AU, the magnetizing coil 32AV, and the magnetizing coil 32AW according to the embodiment are connected in what is called a Y-connection. Alternatively, the magnetizing coil 32AU, the magnetizing coil 32AV, and the magnetizing coil 32AW may be connected in a delta-connection. The AMP 92 outputs driving signals of which phase are shifted by 120 degrees from one another to the magnetizing coil 32AU, the magnetizing coil 32AV, and the magnetizing coil 32AW, so that these magnetizing coils function as a U-phase coil, a V-phase coil, and a W-phase coil.

Similarly, to allow a three-phase current to be passed, the magnetizing coils 32B include a magnetizing coil 32BU, a magnetizing coil 32BV, and a magnetizing coil 32BW. The magnetizing coil 32BU, the magnetizing coil 32BV, and the magnetizing coil 32BW according to the embodiment is connected in what is called a Y-connection. Alternatively, the magnetizing coil 32BU, the magnetizing coil 32BV, and the magnetizing coil 32BW may be connected in a delta-connection. The AMP 92 outputs driving signals of which phase are shifted by 120 degrees from one another to the magnetizing coil 32BU, the magnetizing coil 32BV, and the magnetizing coil 32BW, so that these magnetizing coils function as a U-phase coil, a V-phase coil, and a W-phase coil.

In the fourteenth embodiment, three slots (three sets) of an outer tooth 36 around which the magnetizing coil 32BU is wound are arranged in the circumferential direction. Three slots (three sets) of an outer tooth 36 around which the magnetizing coil 32BV is wound are arranged in the circumferential direction, and three slots (three sets) of an outer tooth 36 around which the magnetizing coil 32BW is wound are arranged in the circumferential direction. The units of three slots including the magnetizing coil 32BU, the magnetizing coil 32BV, or the magnetizing coil 32BW are circumferentially arranged sequentially in the clockwise direction, for example.

Two slots (two sets) of an inner tooth 38 around which the magnetizing coil 32AU is wound are arranged in the circumferential direction. Two slots (two sets) of an inner tooth 38 around which the magnetizing coil 32AV is wound are arranged in the circumferential direction, and two slots (two sets) of an inner tooth 38 around which the magnetizing coil 32AW is wound are provided in the circumferential direction. The units of two slots with the magnetizing coils 32AU, the magnetizing coil 32AV, or the magnetizing coil 32AW are circumferentially arranged sequentially in the clockwise direction, for example.

The connecting portions 39B are evenly provided in the circumferential direction between the three-slot units of the magnetizing coil 32BU, the magnetizing coil 32BV, and the magnetizing coil 32BW that are arranged in the circumferential direction. The connecting portions 39B are evenly provided to have a corresponding relation with the three-slot units of the magnetizing coil 32BU, the magnetizing coil 32BV, and the magnetizing coil 32BW that are arranged in the circumferential direction. The connecting portions 39B are also evenly provided so that the connecting portions 39B have a corresponding relation to the two-slot units of the magnetizing coil 32AU, the magnetizing coil 32AV, and the magnetizing coil 32AW arranged in the circumferential direction. With this structure, the connecting portions 39B can suppress the magnetic interference between any of the U-phase, the V-phase, and the W-phase with which the inner teeth 38 and the outer teeth 36 are magnetized. The stator 30 can therefore improve the rotational accuracies of the first rotor 50 and the second rotor 40.

In the fourteenth embodiment, the number of the magnets 41p circumferentially provided on the inner circumferential surface of the rotor core 41 is 20, and thus, the number of poles is 20. The number of the magnets 51p circumferentially provided on the outer circumferential surface of the rotor core 51 is 10, and thus, the number of poles is 10. The numbers of poles of the magnets 41p and the magnets 51p provided in the circumferential direction are not limited to these mentioned above, and may be provided as appropriate, in an appropriate number.

Such rotor cores 41 and 51 are those generally referred to as permanent magnet (PM) rotors. The rotor core 51 is rotated by the rotating magnetic fields in the inner teeth 38 of the stator core 31 generated by the magnetizing coils 32A. The rotor core 41 is rotated by the rotating magnetic fields in the outer teeth 36 of the stator core 31 generated by the magnetizing coils 32B.

In the controller 90 of the actuator device 100, the CPU 91 outputs a driving signal to the AMP 92, and the AMP 92 supplies the driving current Mi to the actuator 1. Based on the driving current Mi, the actuator 1 drives the magnetizing coils 32A and the magnetizing coils 32B illustrated in FIG. 24 independently. The controller 90 can therefore control to drive and to stop the first rotor 50 independently from driving and stopping of the second rotor 40. Similarly, the controller 90 can control to drive and to stop the second rotor 40 independently from driving and stopping of the first rotor 50. The controller 90 can also control the rotational frequency and the rotating direction of the second rotor 40 independently from those of the first rotor 50, and vice versa.

The magnetizing coils 32A may include a plurality of coil circuits each of which is driven with a pulse, and the timing at which each of the coil circuits is driven may be changed with the pulse. The magnetizing coils 32B may also include a plurality of coil circuits each of which is driven with a pulse, and the timing at which each of the coil circuits is driven may be changed with the pulse. With this structure, each of the magnetizing coils 32A and the magnetizing coils 32B is driven with a pulse, so that the rotor core 41 and the rotor core 51 function as what are called stepping motors that are positioned internally and externally, respectively, and are independently rotated in synchronization with the respective driving pulses. By controlling the pulse of the driving current Mi, the controller 90 can control to drive and to stop the first rotor 50 independently from driving and stopping of the second rotor 40. In this manner, the actuator 1 can determine the positioning of the first rotor 50 and the second rotor 40 without the angle detectors 71, 74. The actuator 1 can therefore reduce the number of parts, so that the space can be saved and costs can be reduced. The actuator 1 can also improve reliability because the number of parts is reduced.

The rotor core 41 and the rotor core 51 described in the thirteenth embodiment and the fourteenth embodiment may be combined. For example, the rotor core 41 may be a VR rotor, and the rotor core 51 may be a PM rotor. Alternatively, the rotor core 51 may be a VR rotor, and the rotor core 41 may be a PM rotor. With such structures as well, the rotor core 51 is rotated by the rotating magnetic fields generated in the inner teeth 38 of the stator core 31 by the magnetizing coils 32A. The rotor core 41 is rotated by the rotating magnetic fields generated in the outer teeth 36 of the stator core 31 by the magnetizing coils 32B.

Fifteenth Embodiment

Figure 25:
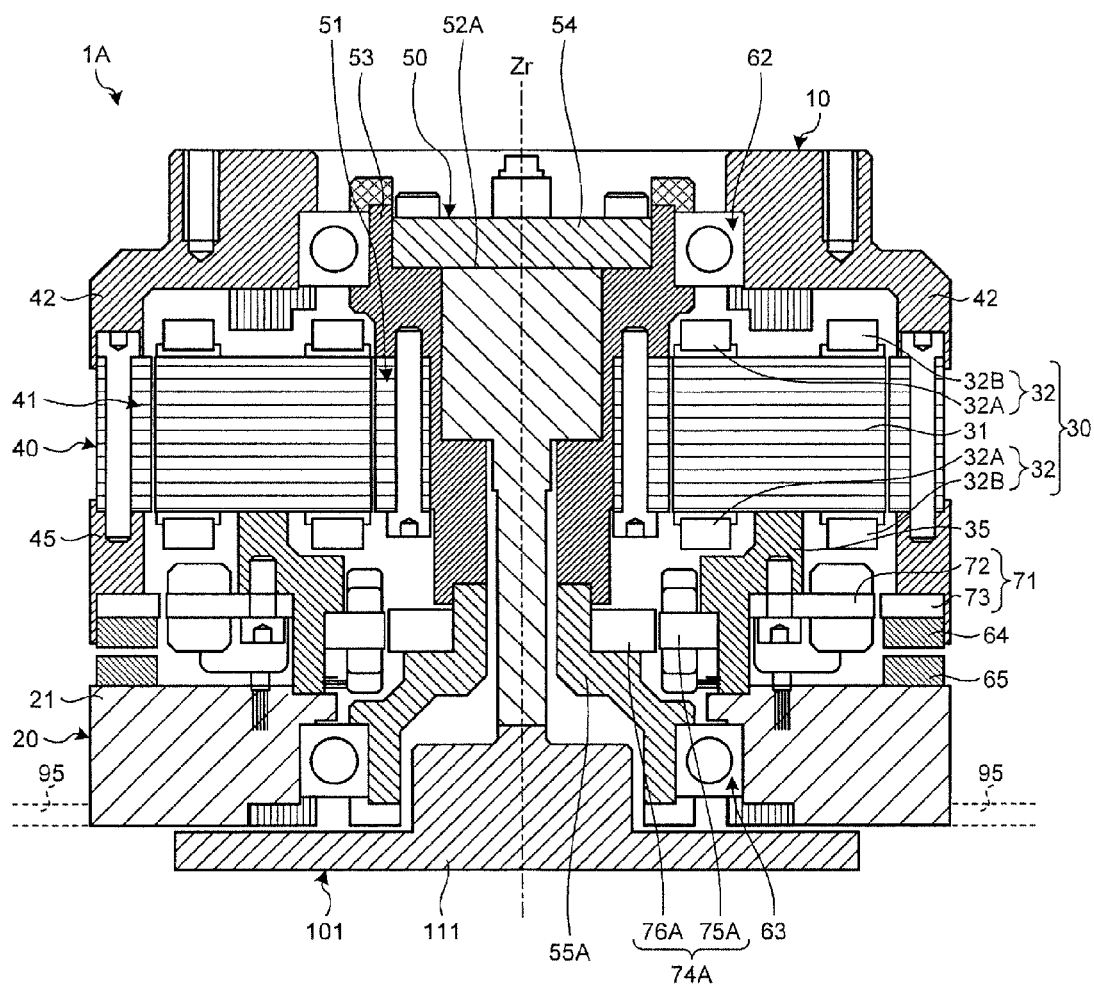
FIG. 25 is a schematic cross-sectional view taken along a virtual plane including a rotational center in a structure of a motor according to a fifteenth embodiment of the present invention.

FIG. 25 is a schematic cross-sectional view taken along a virtual plane including a rotational center in a structure of a motor according to a fifteenth embodiment of the present invention. The same elements as those explained in the embodiments described above are assigned with the same reference signs, and redundant explanations thereof are omitted hereunder.

This motor 1A according to the fifteenth embodiment is what is called a dual rotor motor capable of communicating the rotational motions of the first rotor 50 and of the second rotor 40. In the motor 1A, the housing base 21 of the housing 20 is fixed to the support 95 illustrated in FIG. 1. The motor 1A does not include the ball screw shaft 15 and the nut 52 described above.

The first rotor 50 includes the rotor core 51, the first rotor bracket 53, and the fixing member 54. The fixing member 54 is a disk-like member with which one open end of the first rotor bracket 53 is closed, and connects the first rotor bracket 53 to a central rotating body 52A. The central rotating body 52A is supported by the first bearing 63 rotatably about the rotational center Zr. The motor 1A according to the fifteenth embodiment includes a plate 111 that is a second rotating body 101 that is fixed coaxially with the central rotating body 52A.

In the motor 1A, when the first rotor 50 is rotated, the central rotating body 52A fixed to the first rotor bracket 53 is also rotated. In the motor 1A, when the central rotating body 52A is rotated, the plate 111 that is the second rotating body 101 is also rotated.

In the same manner as in the actuator 1 described above, in the motor 1A, the second rotor 40 is rotated independently from the rotating operation of rotating the first rotor 50. When the second rotor 40 is rotated, the second rotor bracket 42 and the support member 45 are rotated by the rotation of the rotor core 41. The motor 1A also includes a preload mechanism that preloads the first bearing 63 and the second bearing 62 in a direction in parallel with the rotational center Zr (linear motion direction). The preload mechanism includes the magnetic body 64 and the magnet 65. The magnetic body 64 is made of electromagnetic soft iron, for example. The magnetic body 64 may be a magnet. The magnet 65 included in the preload mechanism is provided on the outer circumferential edge of the housing base 21, and the magnetic body 64 is mounted on the support member 45 in a manner facing the magnet 65 in the linear motion direction.

The preload mechanism preloads the first bearing 63 and the second bearing 62 in a direction in parallel with the linear motion direction, by allowing the magnetic body 64 to be attracted to the magnet 65. In this manner, the first bearing 63 and the second bearing 62 can support the first rotor 50 and the second rotor 40 stably. This structure also allows a single-row bearing, which cannot provide a preload mechanism alone, to be used as the first bearing 63 and the second bearing 62.

The motor 1A explained above includes the stator 30, the first rotor 50, and the second rotor 40 described in the thirteenth embodiment or the fourteenth embodiment. As illustrated in FIG. 23 or FIG. 24, the stator 30 includes the circular back yoke 37, the inner teeth 38, and the outer teeth 36. The circular back yoke 37 is provided with the slits 39A that are a plurality of voids that are circumferentially arranged, the inner back yoke 37A that is positioned radially internal to the slits 39A, the outer back yoke 37B that is positioned radially external to the slits 39A, and the connecting portion 39B that connects the inner back yoke 37A and the outer back yoke 37B at a position between the adjacent slits 39A in the circumferential direction. The inner teeth 38 protrude from the inner back yoke 37A toward the radial interior, and provided in plurality along the circumferential direction. The outer teeth 36 protrude from the outer back yoke 37B toward the radial exterior, and provided in plurality along the circumferential direction.

By providing voids between the inner back yoke 37A and the outer back yoke 37B, the magnetic resistance is increased, so that the effect of a magnetic interference between the inner back yoke 37A and the outer back yoke 37B is reduced. As a result, the possibility of the magnetic fields generated in the outer teeth 36 and the inner teeth 38 interfering each other is reduced. Therefore, when the first rotor 50 positioned radially internal and relatively rotating and the second rotor 40 positioned radially external and relatively rotating are driven independently, the possibility of the outer teeth 36 and the inner teeth 38 affecting each other is reduced, even when the outer teeth 36 and the inner teeth 38 are separately magnetized. The rotational accuracies of the first rotor 50 and the second rotor 40 can therefore be improved.

With the structure described above, the circular back yoke 37, the inner teeth 38, and the outer teeth 36 can be manufactured with one mould. The stator 30 can therefore reduce the mould cost. With the structure described above, assembly costs can also be reduced, so that the cost reduction of the stator 30 can be promoted. Furthermore, because the circular back yoke 37, the inner teeth 38, and the outer teeth 36 can be manufactured with one mould, the hours required in stamping can be reduced as well.

With the structure described above, the slits 39A enables the back yoke 37 to be a hollow structure, so that the stator can be reduced in weight. Furthermore, because the slits 39A can be used as a space for enclosing the connections of the magnetizing coils 32A, 32B, or the like, the connections can be prevented from sticking out, so that the motor 1A can be reduced in size.

Sixteenth Embodiment

Figure 26:
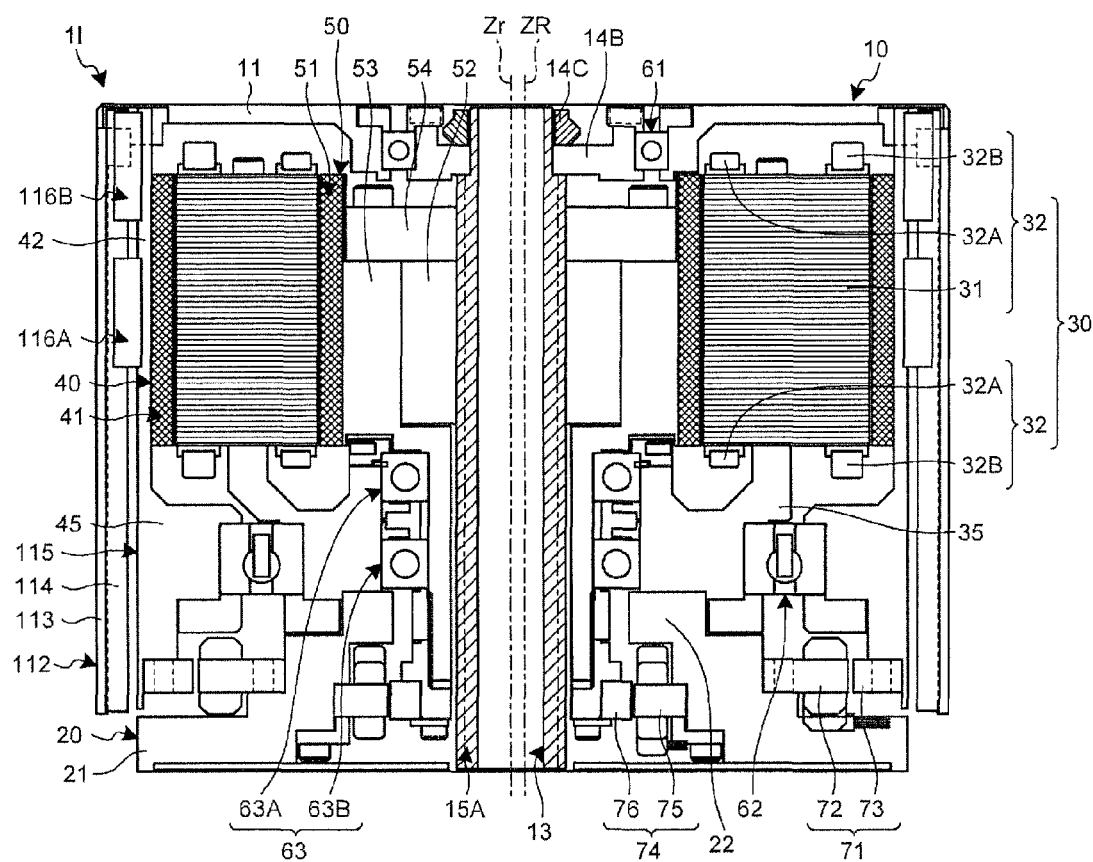
FIG. 26 is a schematic cross-sectional view taken along a virtual plane including the rotational center of a first rotor and the rotational center of a second rotor in an actuator according to a sixteenth embodiment of the present invention.
Figure 27:
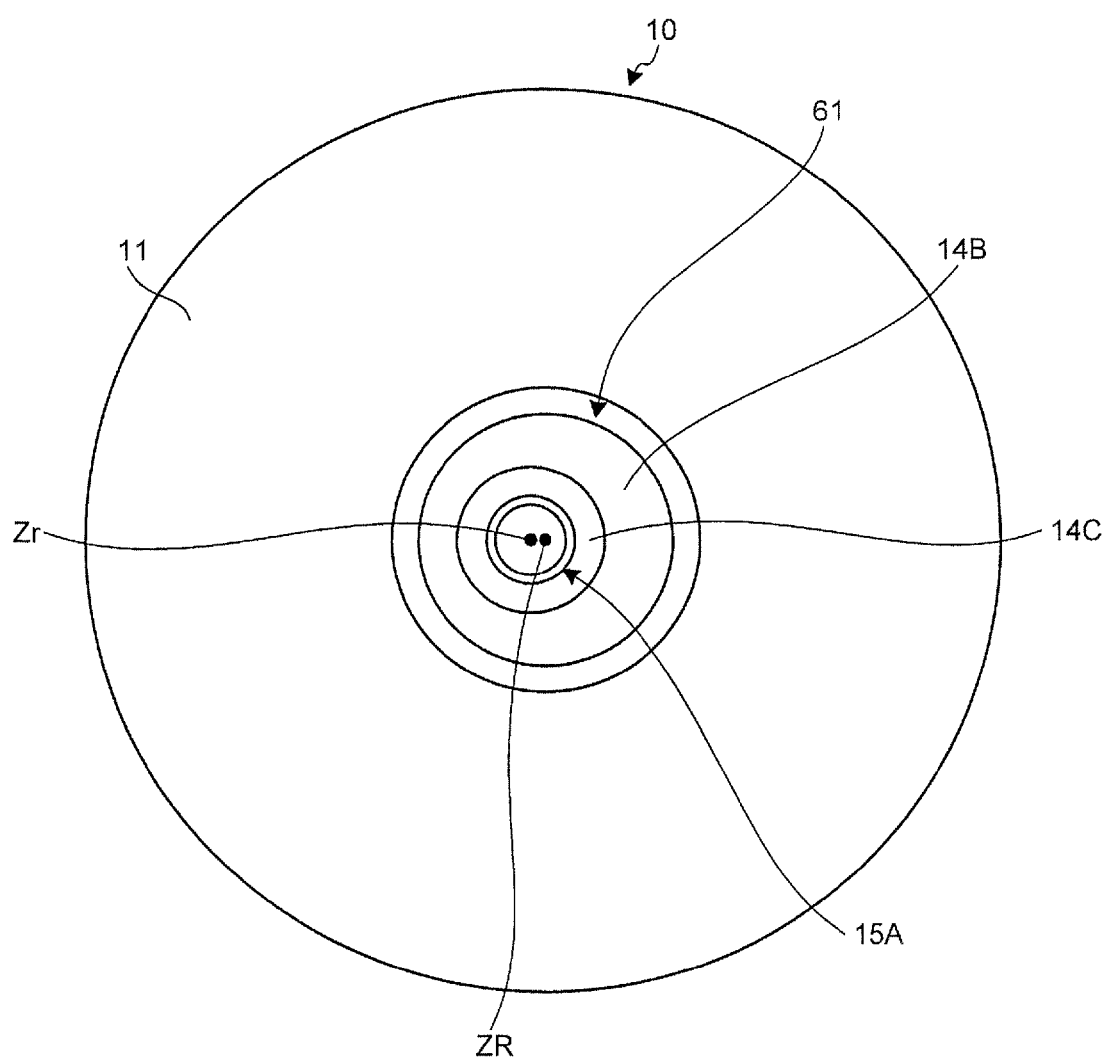
FIG. 27 is a schematic of a plane viewed in a direction in parallel with the rotational center in a rotating body in the actuator according to the sixteenth embodiment.

FIG. 26 is a schematic cross-sectional view taken along a virtual plane including the rotational center of a first rotor and the rotational center of a second rotor in an actuator according to a sixteenth embodiment of the present invention. FIG. 27 is a schematic of a plane viewed in a direction in parallel with the rotational center in a rotating body in the actuator according to the sixteenth embodiment. The same elements as those explained in the embodiments described above are assigned with the same reference signs, and redundant explanations thereof are omitted hereunder.

As described earlier, the actuator 1 according to the first embodiment illustrated in FIG. 2 includes the sliders 43, and the first linear motion guiding mechanism for guiding the movement of the rotating body 10 in the linear motion direction is rotated with the second rotor 40. The actuator 1 according to the first embodiment is also provided with the second linear motion guiding mechanism that is a combination of the slider 17 and the linear bush 18, and the first linear motion guiding mechanism and the second linear motion guiding mechanism are arranged with the stator 30 interposed therebetween in the linear motion direction. The length by which a ball screw shaft 15A is allowed to move in the linear motion direction is restricted by the first linear motion guiding mechanism and the second linear motion guiding mechanism. Therefore, when the length by which the ball screw shaft 15A is moved in the linear motion direction becomes extended, it is necessary to extend the distance guided by the first linear motion guiding mechanism and the second linear motion guiding mechanism. In such a case, the size of the actuator 1 in the linear motion direction becomes increased. If the second linear motion guiding mechanism is omitted to address this issue, it is necessary for the actuator 1 to restrain the ball screw shaft 15A from being rotated by the rotating plate 11 in the rotating body 10.

As illustrated in FIG. 26, in an actuator 1*l* according to the sixteenth embodiment, the first rotor 50 is rotated about the rotational center Zr, and the second rotor 40 is rotated about a rotational center ZR that is in parallel with the rotational center Zr but offset from the rotational center Zr. In this manner, in the actuator 1*l*, the first rotor 50 and the second rotor 40 that are two rotors provided rotatably with respect to the stator 30 do not share the same rotational center, but the rotational center ZR of the second rotor 40 is decentered with respect to the rotational center Zr.

The nut 52 that is fixed to the first rotor 50 and screwed onto the ball screw shaft 15A is rotated about the rotational center Zr. The ball screw shaft 15A is also provided with the hole 13 that is a hollow extending in parallel with the rotational center Zr. The hole 13 is a through-hole extending in parallel with the rotational center Zr. With this structure, the actuator 1*l* according to the sixteenth embodiment allows a wire or a pipe to be passed through the hole 13.

A linear motion communicating member 14B that is a flange on the ball screw shaft 15A is fixed near an end of the ball screw shaft 15A in the linear motion direction, with a ring-like fastening member 14C. This structure allows the linear motion communicating member 14B to move with the ball screw shaft 15A when the ball screw shaft 15A is moved in the linear motion direction. The linear motion communicating member 14B is a disk-shaped plate member, and the ball screw shaft 15A is passed through the linear motion communicating member 14B. As illustrated in FIG. 27, the radially outer circumference of the linear motion communicating member 14B is circular. The center of the radially outer circumference of the linear motion communicating member 14B is at the rotational center ZR of the second rotor 40. The third bearing 61 rotatably supporting the plate 11 is provided on the radially outer circumference of the linear motion communicating member 14B.

As illustrated in FIG. 26, the rotating body 10 includes an outer cylindrical member 112 that is a cylindrical member provided on the radially outer circumference of the plate 11, and of which radius is larger than those of the rotor core 41 and the second rotor bracket 42. The outer cylindrical member 112 includes a cylinder 113 and a plurality of guide rails 114. One end of the cylinder 113 is fixed to the outer edge of the plate 11. The guide rails 114 are fixed to the inner circumferential surface of the cylinder 113, extend in the linear motion direction, and are provided in the circumferential direction. Four guide rails 114 are provided equally spaced in the circumferential direction, for example. The number of the guide rails 114 provided in the circumferential direction is not limited to four, but the guide rails 114 are provided as appropriate, in an appropriate number.

The second rotor 40 includes the rotor core 41, and an inner cylindrical member 115 that is a cylindrical member covering the radially outer surface of the rotor core 41. The inner cylindrical member 115 includes the second rotor bracket 42, and the support member 45 supporting the resolver rotor 73 of the angle detector 71. The support member 45 is integrated with the second rotor bracket 42, and the second rotor bracket 42 and the support member 45 are rotated when the rotor core 41 is rotated. The support member 45 may be provided as a member separated from the second rotor bracket 42, and be connected to the second rotor bracket 42. Sliders 116A and 116B both sliding on the corresponding guide rails 114 are fixed on the radially outer circumferential surface of the inner cylindrical member 115. The sliders 116A and 116B are circumferentially arranged in the same number as that of the guide rails 114 that are circumferentially arranged.

A track groove through which balls roll and that extends in the longitudinal direction of the rail is formed on a pair of sides of the guide rail 114. Each of the U-shaped sliders 116A and 116B mounted straddling over the guide rail 114 is also provided with a track groove through which balls roll, the track groove provided in a manner facing the track groove on the guide rail 114. The sliders 116A and 116B provide an infinite recirculation passage filled with a large number of balls. The infinite recirculation passage includes a ball return through-hole passing through the sliders 116A and 116B in the longitudinal direction of the rail, and an arc-shaped ball passage provided to each of the end-caps fixed to the respective end surfaces of the slider. The infinite recirculation passage allows the balls to recirculate into the rolling passage formed between the track grooves on the guide rail 114 and the sliders 116A and 116B. The sliders 116A and 116B are thus allowed to move freely in the longitudinal direction of the guide rails 114.

The sliders 116A, 116B and the guide rails 114 function as the linear motion guiding mechanism. Even if a force causing a rotational moment about the sliders 116A, 116B is applied to the guide rails 114, the guide rails 114 are supported by the sliders 116A and 116B. This structure allows the rotating body 10 to remain highly stiff when the outer cylindrical member 112 moves relatively to the inner cylindrical member 115. The moving operation can therefore be stabilized. Although, in the linear motion guiding mechanism according to the sixteenth embodiment, the guide rails 114 are provided on the outer cylindrical member 112, and the sliders 116A and 116B are provided on the inner cylindrical member 115, the sliders 116A and 116B may be provided on the outer cylindrical member 112, and the guide rails 114 may be provided on the inner cylindrical member 115.

Only one of the sliders 116A and 116B may be mounted on one guide rail 114. In a configuration in which a plurality of sliders are mounted on the same guide rail 114, e.g., in the configuration with the sliders 116A and 116B, the sliders 116A and 116B are provided at different positions in the linear motion direction, thereby allowing the sliders 116A and 116B to receive the moment applied to the guide rail 114 in a distributed manner. This configuration can improve the stiffness of the rotating body 10 and improve the moving operation when the outer cylindrical member 112 moves relatively to the inner cylindrical member 115.

A support member 35 to which the stator 30 is fixed is connected to the housing inner protrusion 22. The stator 30 is fixed to the housing base 21 via the housing inner protrusion 22 and the support member 35. The first bearing 63 rotatably supporting the first rotor 50 and the first rotor bracket 53 with respect to the housing 20 is fixed to the radially inner wall of the support member 35. Alternatively, the first bearing 63 may be fixed to the radially inner wall of the housing inner protrusion 22. Furthermore, the first bearing 63 may be a back-to-back duplex bearing including the first bearings 63A and 63B.

The second bearing 62 for rotatably supporting the inner cylindrical member 115 and the second rotor 40 with respect to the housing 20 is fixed to the radially outer wall of the support member 35. Alternatively, the second bearing 62 may be fixed to the radially outer wall of the housing inner protrusion 22. In the manner described above, the actuator 1*l* includes the first bearing 63 rotatably supporting the first rotor 50 with respect to the housing 20, and the second bearing 62 rotatably supporting the second rotor 40 with respect to the housing 20. Unlike the actuator 1 according to the first embodiment, the first rotor bracket 53 is not supported by the second bearing 62. With this structure, it is possible to reduce the possibility of the first rotor 50 being rotated unintentionally when the second rotor 40 starts being rotated, because of a reactive force from the second rotor 40 acting on the first rotor bracket 53 as a starting frictional torque of the second bearing 62.

Furthermore, the first bearing 63B and the second bearing 62 are positioned on the same cross section taken across a virtual plane that is perpendicular to the rotational center Zr (the rotational center ZR) in the actuator 1*l*. This configuration reduces the difference between the position at which the first rotor 50 and the first rotor bracket 53 are supported and the position at which the inner cylindrical member 115 and the second rotor 40 are supported. In this manner, the rotations of the first rotor 50 and the second rotor 40 can be stabilized.

Stator

Figure 28:
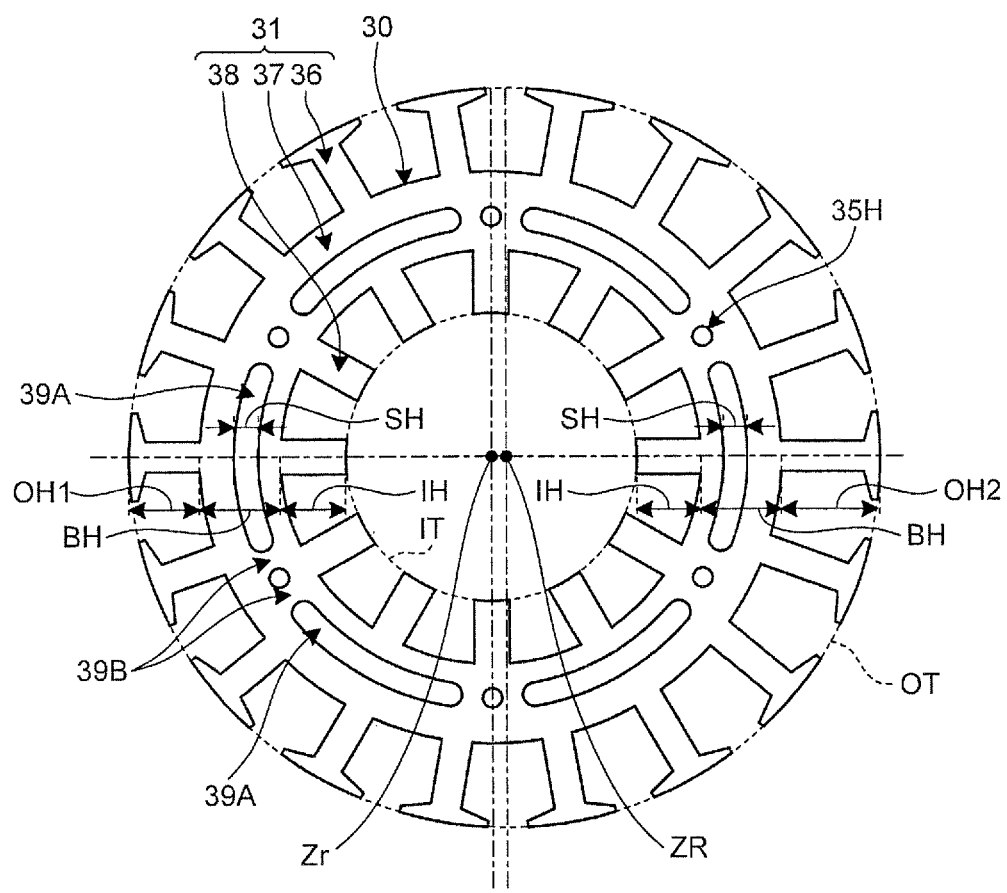
FIG. 28 is a schematic cross-sectional view taken along a virtual plane that is perpendicular to a rotational center in an exemplary stator in the structure of the actuator illustrated in FIG. 26.

FIG. 28 is a schematic cross-sectional view taken along a virtual plane that is perpendicular to a rotational center in an exemplary stator in the structure of the actuator illustrated in FIG. 26. In the same manner as in FIG. 24, the first rotor 50 has a cylindrical shape surrounding the ball screw shaft 15A on the side of the rotational center Zr. The stator 30 has a cylindrical shape surrounding the first rotor 50 on the side of the rotational center Zr. The second rotor 40 has a cylindrical shape surrounding the stator 30 on the side of the rotational center Zr.

As mentioned earlier, in the actuator 1*l*, the first rotor 50 is rotated about the rotational center Zr, and the second rotor 40 is rotated about the rotational center ZR that is offset from and extends in parallel with the rotational center Zr. In the stator 30, therefore, an outer circumferential arc OT of the stator core 31, that is, a circle circumferentially connecting the most radially outer points of the outer teeth 36 is centered at the rotational center ZR, and an inner circumferential arc IT of the stator core 31, that is, a circle circumferentially connecting the most radially inner points of the inner teeth 38 is centered at the rotational center Zr. In the stator core 31 illustrated in FIG. 28, the radial width BH of the circular back yoke 37 is constant, and all of the inner teeth 38 that are circumferentially provided protrude by the same length IH from the back yoke 37 toward the interior in the radial direction. All of the slits 39A circumferentially provided also have the same radial width SH. In the stator core 31, however, the length by which the outer teeth 36 radially protrude from the back yoke 37 toward the exterior is changed and varied in such a manner that the center of the outer circumferential arc OT is matched with the rotational center ZR.

As illustrated in FIG. 28, in a view taken along a virtual plane that is perpendicular to the rotational center Zr in the actuator 1*l*, the length OH1 by which one of the outer teeth 36 protrudes is different from another length OH2 by which another outer tooth 36 protrudes, the teeth positioned on the same virtual line connecting the rotational center Zr and the rotational center ZR. The protrusion length OH1 of the outer tooth 36 is the circumferentially smallest among those of the other outer teeth 36. The protrusion length OH2 of the outer tooth 36 is the circumferentially largest among those of the outer teeth 36. With this structure, the inner circumferential arc IT of the stator core 31 becomes decentered with respect to the outer circumferential arc OT. In this manner, the rotational center of the second rotor 40 is positioned offset from and extends in parallel with the rotational center of the first rotor 50. The actuator 1*l* can therefore restrain the screw shaft from being rotated by the rotating second rotor 40.

As a modification, the protrusion length of the outer teeth 36 circumferentially provided on the stator core 31 may be constant, and the center of the outer circumferential arc OT may be matched to the rotational center Zr. In this modification, the protrusion length of the inner teeth 38, circumferentially provided and protruding from the back yoke 37 toward the radially exterior, is varied in such a manner that the center of the inner circumferential arc IT is matched with the rotational center ZR, so that the inner circumferential arc IT becomes decentered with respect to the outer circumferential arc OT. With this structure of the actuator 1*l*, the first rotor 50 is rotated about the rotational center ZR, and the second rotor 40 is rotated about the rotational center Zr.

Figure 29:
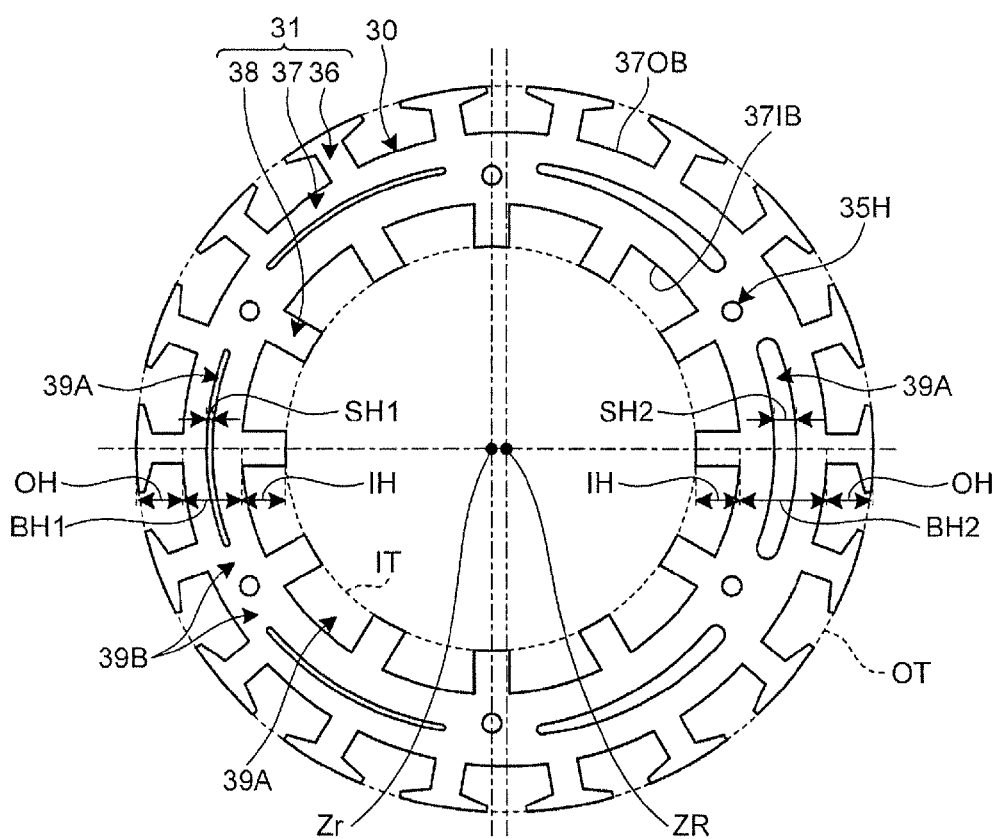
FIG. 29 is a schematic cross-sectional view taken along a virtual plane that is perpendicular to a rotational center in another exemplary stator in the actuator illustrated in FIG. 26.

FIG. 29 is a schematic cross-sectional view taken along a virtual plane that is perpendicular to a rotational center in another exemplary stator in the actuator illustrated in FIG. 26. In the stator core 31 illustrated in FIG. 29, the radially outer circumference 370B of the circular back yoke 37 is centered at the rotational center ZR, and the radially inner circumference 371B of the back yoke 37 is centered at the rotational center Zr. The radial width of the back yoke 37 is circumferentially changed. In a view taken along a virtual plane that is perpendicular to the rotational center Zr in the structure of the actuator 1*l*, a radial width BH1 of the back yoke 37 is different from another radial width BH2 of the back yoke 37, both widths of the back yoke being positioned on the same virtual line connecting the rotational center Zr and the rotational center ZR. The radial width BH1 of the back yoke 37 is the shortest among those of the back yoke 37 in the circumferential direction. The radial width BH2 of the back yoke 37 is the largest among those of the back yoke 37 in the circumferential direction.

The radial width of the slits 39A is increased as the radial width the back yoke 37 is increased. For example, the slit 39A at the position of the back yoke 37 with the radial width BH1 has the smallest radial width SH1 among the slits 39A in the circumferential direction. Similarly, the slit 39A at the position of the back yoke 37 with the radial width BH2 has the largest radial width SH2 among the slits 39A in the circumferential direction. Because the radial width of the slits 39A is changed correspondingly to the radial width of the back yoke 37, the circumferential magnetic flux distribution in the back yoke 37 can be even out. With this structure, the outer tooth 36 and the inner tooth 38 on a radial extension are magnetically separated by the void of the corresponding slit 39A. The inner back yoke that is positioned radially internal to the slits 39A and the outer back yoke that is positioned radially external to the slits 39A are magnetically separated by the voids of the slits 39A in such a manner that the inner back yoke and the outer back yoke have the same the radial width in the circumferential direction. In this manner, the possibility of the outer teeth 36 and the inner teeth 38 affecting each other can be reduced, so that the rotational accuracies of the first rotor 50 and the second rotor 40 can be improved.

In the stator core 31, the lengths by which of the inner teeth 38 circumferentially provided protrude from the back yoke 37 toward the radial interior are all set to IH. In the stator core 31, the lengths by which the outer teeth 36 circumferentially provided protrude from the back yoke 37 toward the exterior in the radial direction are all set to OH. The outer circumference 370B and the outer circumferential arc OT, therefore, are both centered at the rotational center ZR, while the radius of the outer circumferential arc OT is larger than that of the outer circumference 370B. The inner circumference 371B and the inner circumferential arc IT also share the same center at the rotational center Zr, while the inner circumferential arc IT has a smaller radius than the inner circumference 371B. With this structure, the outer circumferential arc OT of the stator core 31 is decentered with respect to the inner circumferential arc IT, and the rotational center of the first rotor 50 is offset from and extends in parallel with the rotational center of the second rotor 40. The actuator 1*l* can therefore restrain the screw shaft from being rotated by the rotating second rotor 40.

Figure 30:
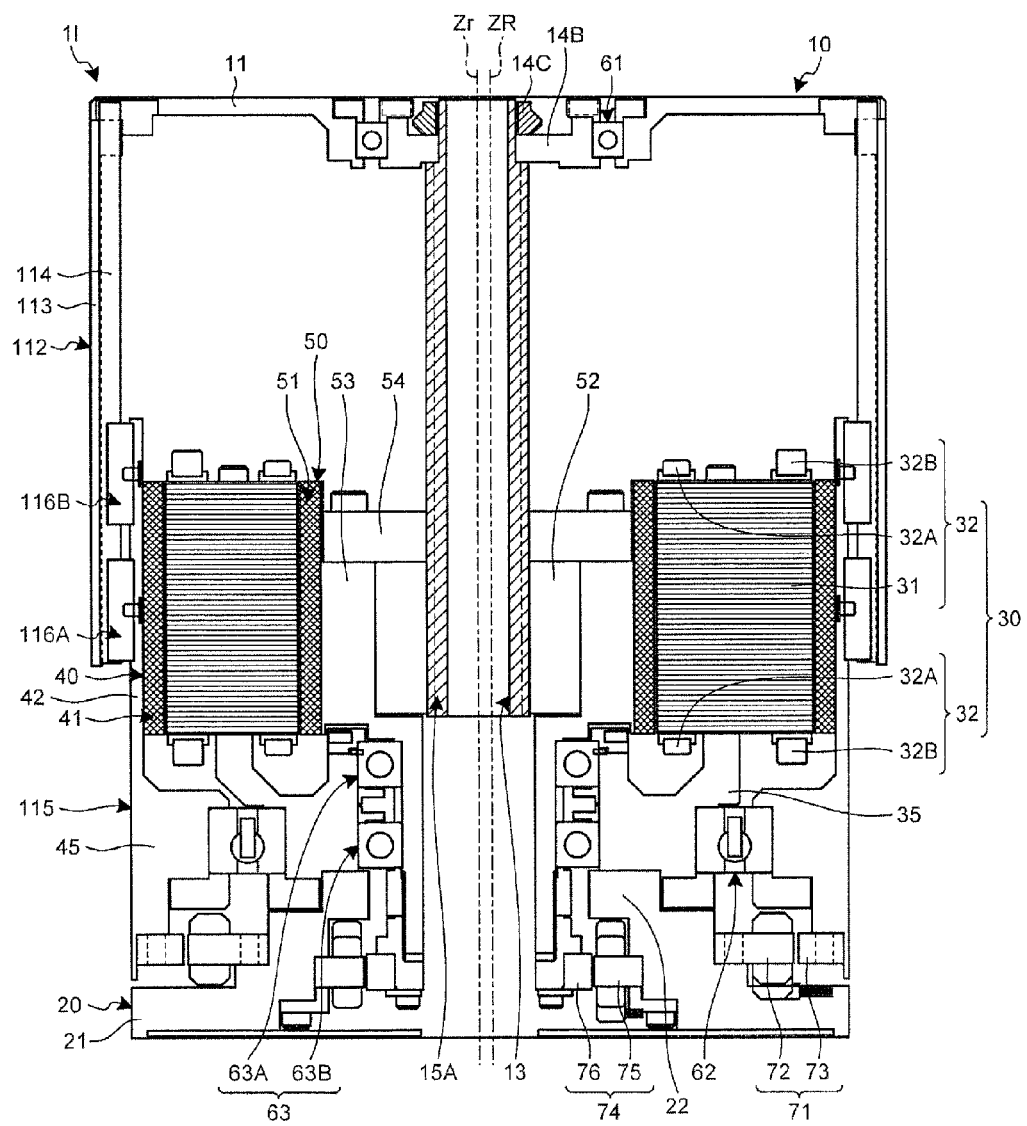
FIG. 30 is a schematic for explaining an operation of the actuator according to the sixteenth embodiment.

The actuator device 100 and the actuator 1 will now be explained with reference to FIGS. 1, 26, 27, and 30. FIG. 30 is a schematic for explaining an operation of the actuator according to the sixteenth embodiment. The controller 90 of the actuator device 100 illustrated in FIG. 1 applies, for example, an alternating current to the magnetizing coils 32 of the stator 30, and changes the voltage applied to the magnetizing coils 32 at a predetermined interval. In this manner, the driving forces for rotating the first rotor 50 and the second rotor 40 with respect to the stator 30 are generated.

When the first rotor 50 in the actuator 11 is rotated, the nut 52 fixed to the first rotor bracket 53 is also rotated. When the nut 52 is rotated, the thread on the ball screw shaft 15A is carried along the thread of the nut 52 in the linear motion direction. The ball screw shaft 15A is then moved relatively to the nut 52 in the linear motion direction as the nut 52 is rotated. As illustrated in FIGS. 26 and 30, the actuator 11 can move the ball screw shaft 15A upwardly in a plane in front of the paper when the nut 52 is rotated. The actuator 11 can also move the ball screw shaft 15A downwardly in a plane in front of the paper when the nut 52 is reversely rotated, reversely to the operation illustrated in FIG. 30. As illustrated in FIGS. 26 and 30, the linear motion communicating member 14B is moved downwardly or upwardly in a plane in front of the paper, depending on the movement of the ball screw shaft 15A. The plate 11 of the rotating body 10 is rotatably supported by the linear motion communicating member 14B via the third bearing 61. The plate 11 of the rotating body 10 is therefore moved upwardly or downwardly in the linear motion direction, depending on the movement of the linear motion communicating member 14B.

The second rotor 40 in the actuator 1*l* is rotated independently from the rotating operation causing the first rotor 50 to rotate. When the second rotor 40 is rotated, the rotating rotor core 41 rotates the inner cylindrical member 115, the second rotor bracket 42, and the support member 45. The sliders 116A and 116B are rotated with the inner cylindrical member 115 (the second rotor bracket 42 on the second rotor 40), so that the outer cylindrical member 112 is also rotated. As the outer cylindrical member 112 is rotated, the plate 11 is also caused to rotate.

As mentioned earlier, the plate 11 of the rotating body 10 is rotatably supported by the linear motion communicating member 14B via the third bearing 61. When the second rotor 40 is rotated, the rotating rotor core 41 rotates the plate 11 of the rotating body 10 illustrated in FIG. 27 about the rotational center ZR, around the linear motion communicating member 14B. As the plate 11 is rotated, a force is applied to the linear motion communicating member 14B via the third bearing 61 in a direction causing the linear motion communicating member 14B to rotate about the rotational center ZR. Consequently, a rotational force in a direction causing the ball screw shaft 15A fixed to the linear motion communicating member 14B to rotate about the rotational center ZR is applied to the ball screw shaft 15A. The rotational center of the nut 52 screwed onto the ball screw shaft 15A is at the rotational center Zr. When the distance by which the rotational center ZR is offset from the rotational center Zr is increased, a lesser amount of the rotational force in a direction causing the ball screw shaft 15A to rotate about the rotational center ZR is converted into a rotational force actually causing the ball screw shaft 15A to rotate, thereby causing the nut 52 to rotate. In other words, a larger resisting force is generated between the nut 52 and the ball screw shaft 15A on which the nut 52 is screwed. As a result, the actuator 1*l* can restrain the ball screw shaft 15A from being rotated by the rotating plate 11 of the rotating body 10.

Unlike the actuator 1 according to the first embodiment, the actuator 1*l* according to the sixteenth embodiment does not have a structure in which the stator 30 is interposed between the first linear motion guiding mechanism and the second linear motion guiding mechanism in a direction in parallel with the rotational center. The actuator 1*l* can therefore reduce the number of parts, thereby allowing the space to be saved and costs to be reduced. The actuator 1 can also improve reliability because the number of parts is reduced.

Furthermore, the actuator 1*l* is provided with a linear motion guiding mechanism including the sliders 116A, 116B and the guide rails 114 that allow the outer cylindrical member 112 to move relatively to the inner cylindrical member 115. Because the inner cylindrical member 115 is surrounded by the outer cylindrical member 112, the actuator 1*l* can increase the length by which the ball screw shaft 15A is moved in the linear motion direction (movable range). With the structure in which the inner cylindrical member 115 is surrounded by the outer cylindrical member 112, it is possible to suppress an increase in the size of the actuator 1*l*, and to reduce the size of the actuator 1*l*.

Because the ball screw shaft 15A has the hole 13 extending in parallel with the rotational center Zr, wiring space of the magnetizing coils 32A is reduced. To prevent the torque in the first rotor 50 from reducing as the space is reduced, the thicknesses of the stator core 31, the rotor core 41, and the rotor core 51 in the linear motion direction are increased, for example. To increase the thicknesses in the linear motion direction, the number by which a sheet such as a magnetic steel sheet or a cold rolled sheet is laminated is increased in the stator core 31, the rotor core 41 and the rotor core 51. Because the size of the actuator 1*l* in the linear motion direction is suppressed and reduced, a space enough to accommodate with the thickness increases of the stator core 31, the rotor core 41, and the rotor core 51 in the linear motion direction can be ensured. To prevent the torque in the first rotor 50 from reducing as the space for the magnetizing coils 32A is reduced, the radius of the magnets mounted on the radially outer circumferential surface of the first rotor 50 illustrated in FIG. 24 may be increased.

Seventeenth Embodiment

Figure 31:
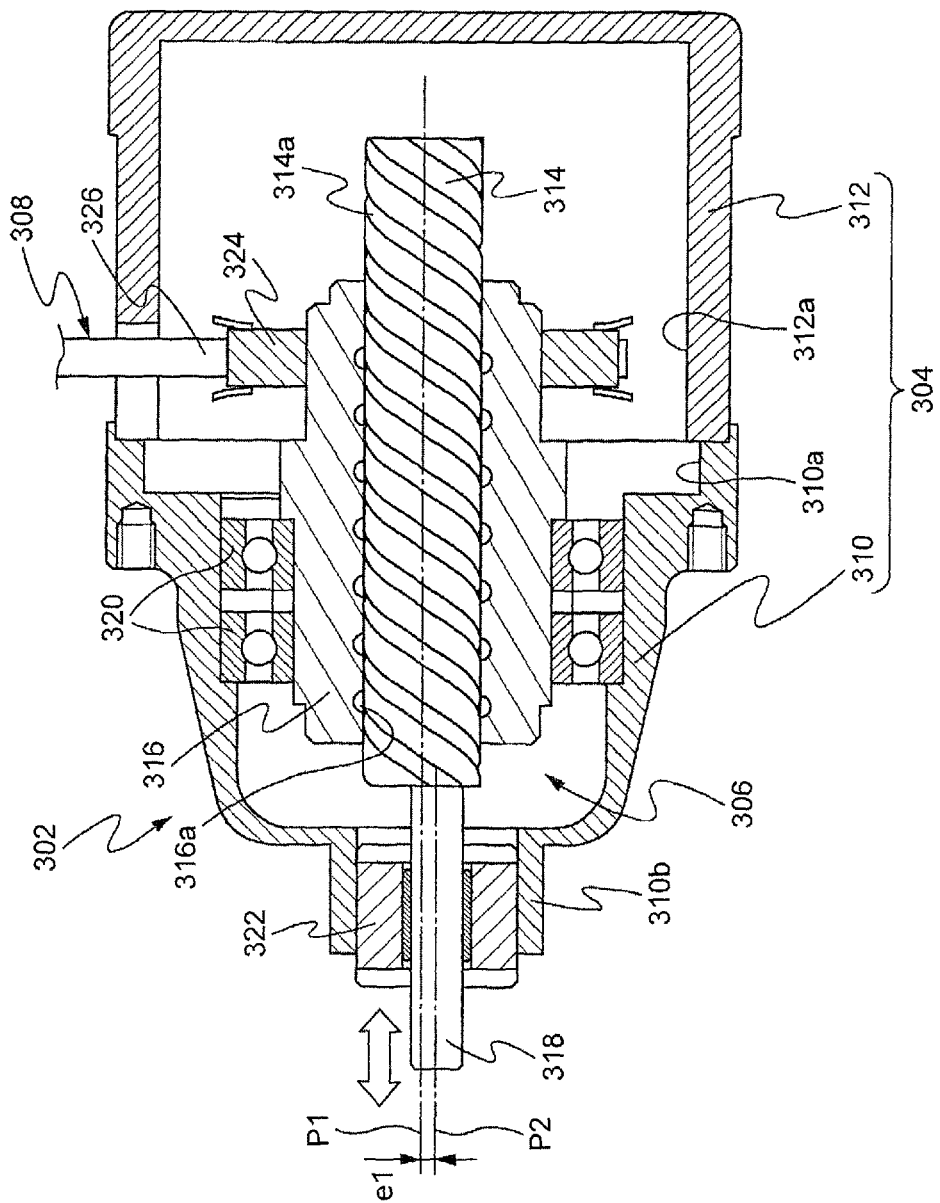
FIG. 31 is a cross-sectional view of a linear actuator according to a seventeenth embodiment of the present invention.

FIG. 31 is a cross-sectional view illustrating a linear actuator according to a seventeenth embodiment of the present invention. This linear actuator 302 according to the seventeenth embodiment illustrated in FIG. 31 is used in industrial machines such as robots and conveyors. The same elements as those explained in the embodiments described above are assigned with the same reference signs, and redundant explanations thereof are omitted hereunder. In the linear actuator 302, a rotational-to-linear motion conversion mechanism 306 is housed in a casing 304, and a rotation driving unit 308 inserted into the casing 304 from the external is connected to a part of the rotational-to-linear motion conversion mechanism 306.

The casing 304 is composed of a first casing part 310 having an approximately cylindrical shape, and a second casing part 312 having an approximately cylindrical shape and of which one end is closed. The outer periphery of a large-diameter opening 310*a* of the first casing part 310 is coupled with the outer periphery of a large-diameter opening 312*a* of the second casing part 312 with fasteners such as bolts (not illustrated). A cylindrical bearing holder 310*b* is provided on one end of the first casing part 310 that axially faces the large-diameter opening 310*a*.

The rotational-to-linear motion conversion mechanism 306 includes a ball screw shaft 314 having the outer circumferential surface provided with a spiral groove 314*a*, a ball screw nut 316 having the inner circumferential surface provided with a spiral groove 316*a*, a large number of balls (not illustrated) rolling through a ball rolling passage formed between the spiral grooves 314*a* and 316*a* facing each other and provided on the ball screw shaft 314 and the ball screw nut 316, respectively, a linear motion guiding shaft 318 that protrudes from one end of the ball screw shaft 314 in the axial direction, a radial bearing 320 that is provided between the inner surface of the casing 304 (the first casing part 310) and the outer circumference of the ball screw nut 316 and rotatably supports the ball screw nut 316, and a linear motion guide bush 322 that is mounted on the bearing holder 310*b* provided to the first casing part 310 and slidably supports the linear motion guiding shaft 318 in the axial direction.

The reference sign P1 in FIG. 31 represents the axial line of the ball screw shaft 314, and the reference sign P2 represents the axial line of the linear motion guiding shaft 318. The ball screw shaft 314 is integrated with the linear motion guiding shaft 318 while the axial line P1 extends in parallel with and is decentered with respect to the axial line P2 by a decentering distance e1. The decentering distance e1 is a value smaller than the radius of the ball screw shaft 314. The rotation driving unit 308 includes a driven pulley 324 fixed to the outer circumferential surface of the ball screw nut 316, and an endless belt 326 stretched across the driven pulley 324 and a driving pulley (not illustrated) provided to a rotation driving source (not illustrated).

The ball screw shaft 314 corresponds to the screw shaft according to the present invention, the ball screw nut 316 corresponds to the nut according to the present invention, and the linear guide bush 322 corresponds to the thrust bearing member according to the present invention. In the linear actuator 302 according to the embodiment, when a rotational force is generated by the rotation driving source in the rotation driving unit 308, the rotational force is communicated to the ball screw nut 316 via the endless belt 326 and the driven pulley 324. The ball screw shaft 314 receiving the rotational force from the ball screw nut 316 is moved linearly in the axial direction (in the direction of the arrow in FIG. 31) by allowing the linear motion guiding shaft 318 to slide in the linear guide bush 322, while the rotation of the linear motion guiding shaft 318 about the axial line P1 is restrained because the axial line P1 of the ball screw shaft 314 is decentered with respect to the axial line P2 of the linear motion guiding shaft 318 supported in the linear guide bush 322.

The linear actuator 302 according to the embodiment can therefore output the rotation communicated from the rotation driving source of the rotation driving unit 308 as a linear motion of the linear motion guiding shaft 318. Furthermore, in the linear actuator 302 according to the embodiment, the ball screw shaft 314 is integrated with the linear motion guiding shaft 318 that is provided at one end of the ball screw shaft 314 in such a manner that the axial line P1 extends in parallel with and is decentered with respect to the axial line P2, and the linear motion guiding shaft 318 is supported by the casing 304 (the bearing holder 310*b*) via the linear guide bush 322. The ball screw shaft 314 is therefore allowed to move axially while a rotation of the ball screw shaft 314 about the axial line P1 is restrained. In this manner, the ball screw shaft 314 can be linearly guided with a simple structure without increasing the number of parts.

Furthermore, when the rotational force is communicated from the ball screw nut 316 to the ball screw shaft 314, a radial preload becomes exerted on the linear motion guiding shaft 318 having the axial line P2 offset from the axial line P1 of the ball screw shaft 314. Because such an application of a radial preload reduces the play between the linear guide bush 322 and the linear motion guiding shaft 318, the radial stiffness can be improved. A linear ball bearing may be used instead of the linear guide bush 322, as a member for slidably supporting the linear motion guiding shaft 318 in the axial direction.

Eighteenth Embodiment

Figure 32:
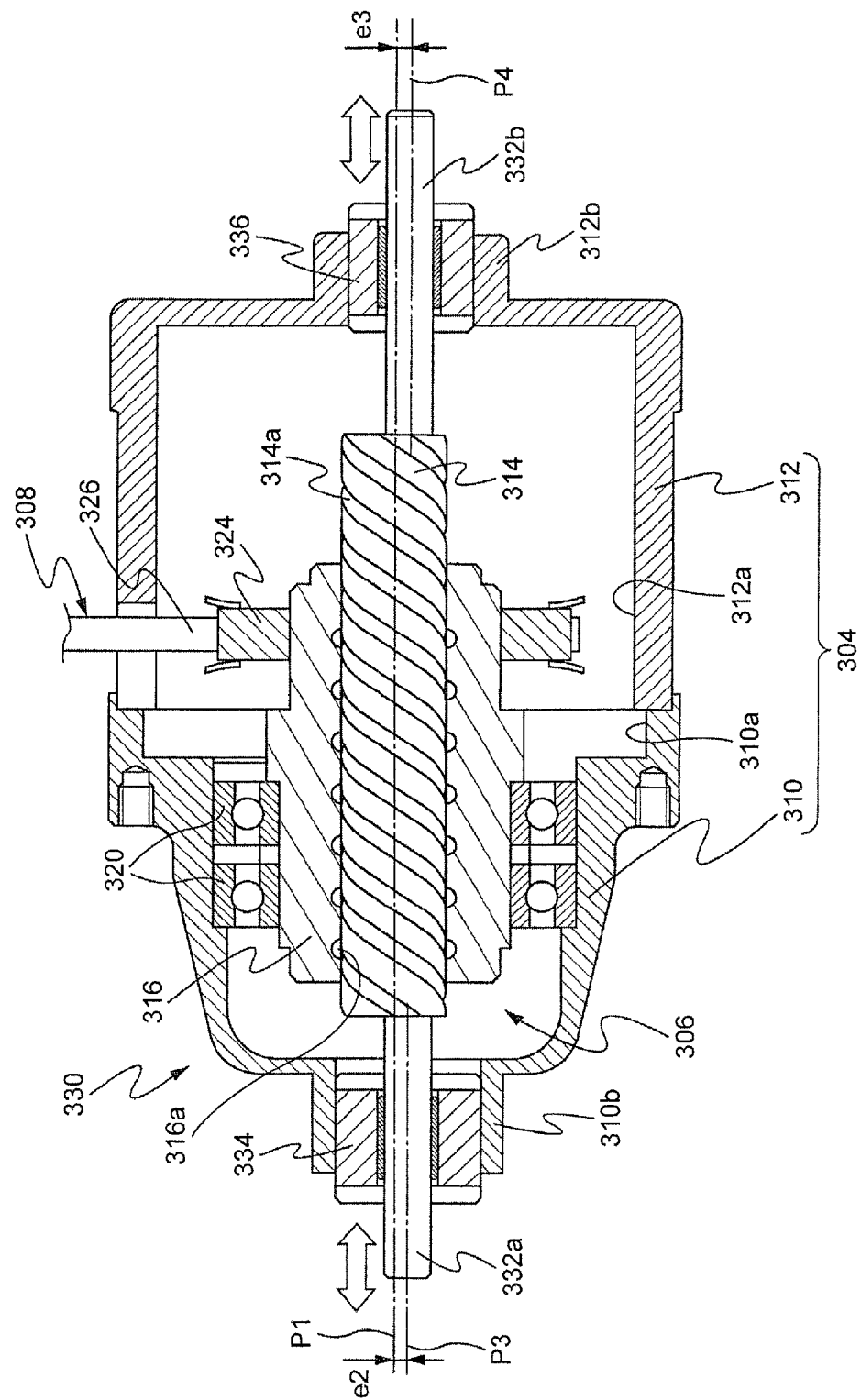
FIG. 32 is a cross-sectional view of a linear actuator according to an eighteenth embodiment of the present invention.

FIG. 32 is a cross-sectional view of a linear actuator according to an eighteenth embodiment of the present invention. The linear actuator illustrated in FIG. 32 is a linear actuator 330 according to the eighteenth embodiment. The same elements as those in the embodiments described above are assigned with the same reference signs, and explanations thereof are omitted hereunder. In the linear actuator 330 according to the embodiment, a cylindrical bearing holder 312b is provided to one end of the second casing part 312, which is a part of the casing 304, in the axial direction, the end facing the large-diameter opening 312a.

A pair of linear motion guiding shafts 332a and 332b protrude from the respective ends of the ball screw shaft 314 in the axial direction. The axial line P3 of the linear motion guiding shaft 332a, which is one of the linear motion guiding shafts 332a and 332b, extends in parallel with and is decentered with respect to the axial line P1 of the ball screw shaft 314 by a decentering distance e2. The axial line P4 of the other linear motion guiding shaft 332b extends in parallel with and is decentered with respect to the axial line P1 of the ball screw shaft 314 by a decentering distance e3. Each of the decentering distances e2 and e3 is a value smaller than the radius of the ball screw shaft 314.

The rotational-to-linear motion conversion mechanism 306 includes a linear motion guide bushes 334 and 336. The linear motion guide bush 334 is fitted in the bearing holder 310b provided to the first casing part 310, and slidably supports the linear motion guiding shaft 332a in the axial direction. The linear motion guide bush 336 is fitted in the bearing holder 312b provided to the second casing part 312, and slidably supports the linear motion guiding shaft 332b in the axial direction. The ball screw shaft 314 corresponds to the screw shaft according to the present invention. The ball screw nut 316 corresponds to the nut according to the present invention, and the linear motion guide bushes 334 and 336 correspond to the thrust bearing member according to the present invention.

In the linear actuator 330 according to the embodiment, when a rotational force is generated by the rotation driving source in the rotation driving unit 308, the rotational force is communicated to the ball screw nut 316 via the endless belt 326 and the driven pulley 324. The ball screw shaft 314 receiving the rotational force from the ball screw nut 316 moves in the axial direction (in the direction of the arrow in FIG. 32) by allowing the linear motion guiding shafts 332a and 332b to slide in the respective linear motion guide bushes 334 and 336 while the rotations of the linear motion guiding shafts 332a and 332b about the axial line P1 are restrained because the axial line P1 of the ball screw shaft 314 is decentered with respect to the axial lines P3 and P4 of the respective linear motion guiding shafts 332a and 332b respectively supported in the linear motion guide bushes 334 and 336.

In the linear actuator 330 according to the embodiment, the rotations of the linear motion guiding shafts about the axial line P1 of the ball screw shaft 314 can be restrained with a simple structure, in the same manner as in the linear actuator 302 according to the seventeenth embodiment. Furthermore, when a rotational force is communicated from the ball screw nut 316 to the ball screw shaft 314, the linear motion guiding shafts 332a and 332b of which the respective axial lines P3 and P4 are offset from the axial line P1 of the ball screw shaft 314 become radially preloaded. Because the linear motion guiding shafts 332a and 332b thus radially preloaded are positioned separate from each other in the axial direction, the radial stiffness can be further improved, so that the ball screw shaft 314 can be moved smoothly in the axial direction.

The decentering distances e2 and e3 according to the embodiment do not need to be the same. Linear ball bearings may be used instead of the linear motion guide bushes 334 and 336, as members for slidably supporting the linear motion guiding shafts 332a and 332b in the axial direction.

Nineteenth Embodiment

Figure 33:
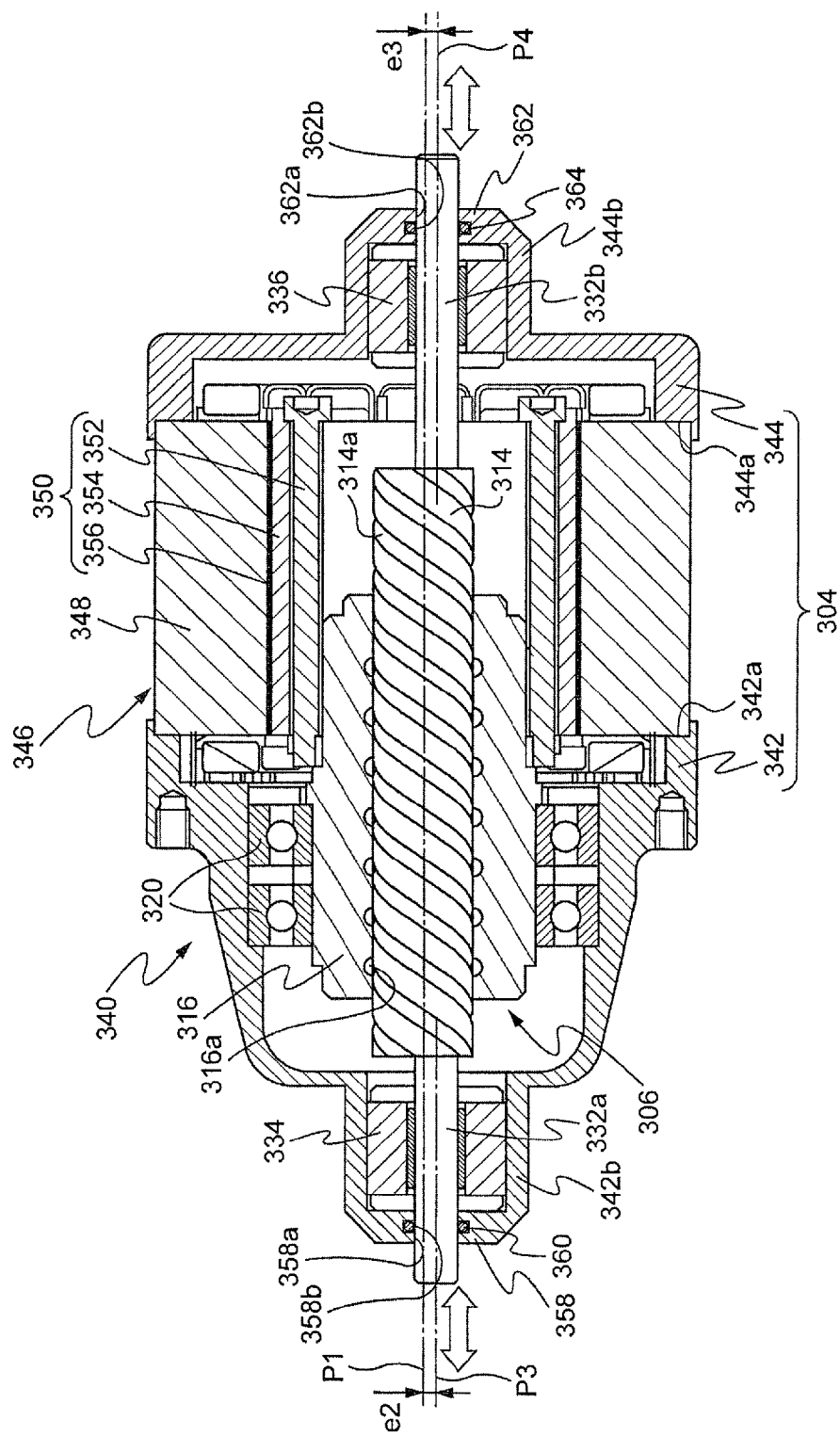
FIG. 33 is a cross-sectional view of a linear actuator according to a nineteenth embodiment of the present invention.

FIG. 33 is a cross-sectional view of a linear actuator according to a nineteenth embodiment of the present invention. The linear actuator illustrated in FIG. 33 is a linear actuator 340 according to the nineteenth embodiment. The same elements as those in the embodiments described above are assigned with the same reference signs, and explanations thereof are omitted hereunder.

In the linear actuator 340 according to the embodiment, a brushless motor 346 that is a rotation driving unit is provided between a first casing part 342 and a second casing part 344 that together form the casing 304. A cylindrical bearing holder 342b is provided on one end of the first casing part 342 facing a large-diameter opening 342a in the axial direction. Another cylindrical bearing holder 344b is provided to one end of the second casing part 344 facing a large-diameter opening 344a in the axial direction.

The brushless motor 346 includes a stator 348 having an approximately cylindrical shape and mounted between the large-diameter opening 342a on the first casing part 342 and the large-diameter opening 344a on the second casing part 344, and a rotor 350 positioned on the inner circumferential side of the stator 348. The stator 348 includes a stator core (not illustrated) made from a lamination of metal core plates (not illustrated), for example, and has a structure in which a multiple-phase coils (not illustrated) are wound via an insulator (not illustrated) on the inner circumferential side of the stator core.

The rotor 350 includes a rotor core 352 splined to the outer circumferential surface of the ball screw nut 316, a magnet 354 fixed to the outer circumferential surface of the rotor core 352, and a rotor cover 356 covering the outer circumferential surface of the magnet 354. In the rotational-to-linear motion conversion mechanism 306 according to the embodiment, a pair of linear motion guiding shafts 332a and 332b protrude from the respective ends of the ball screw shaft 314 in the axial direction, and the axial line P3 of the linear motion guiding shaft 332a, which is one of the linear motion guiding shafts 332a and 332b, extends in parallel with and is decentered with respect to the axial line P1 of the ball screw shaft 314 by the decentering distance e2, and the axial line P4 of the other linear motion guiding shaft 332b extends in parallel with and is decentered with respect to the axial line P1 of the ball screw shaft 314 by the decentering distance e3, in the same manner as in the eighteenth embodiment.

A partitioning plate 358 extending toward the linear motion guiding shaft 332a is integrated to the open end of the bearing holder 342b (on the left side in FIG. 33). The partitioning plate 358 has an insertion hole 358a through which the linear motion guiding shaft 332a is passed, and an O ring mounting groove 358b is formed on the inner circumferential surface of the insertion hole 358a. An O ring 360 elastically deforming and cohering tightly with the linear motion guiding shaft 332a is fitted in the O ring mounting groove 358b.

A partitioning plate 362 extending toward the linear motion guiding shaft 332b is integrated to the open end of the bearing holder 344b (the right side in FIG. 33). The partitioning plate 362 has an insertion hole 362a through which the linear motion guiding shaft 332b is passed, and an O ring mounting groove 362b provided on the inner circumferential surface of the insertion hole 362a. An O ring 364 elastically deforming and cohering tightly with the linear motion guiding shaft 332b is fitted in the O ring mounting groove 362b.

The ball screw shaft 314 corresponds to the screw shaft according to the present invention. The ball screw nut 316 corresponds to the nut according to the present invention, and the linear motion guide bush 334, 336 correspond to the thrust bearing member according to the present invention. In the linear actuator 340 according to the embodiment, when a motor driving current is supplied to the multiple-phase coil of the stator 348 in the brushless motor 346, a rotating magnetic field is generated in the stator 348, by which the rotor 350 is driven in rotation, and the rotational force is communicated to the ball screw nut 316.

In the embodiment as well, the ball screw shaft 314 receiving the rotational force from the ball screw nut 316 is moved linearly in the axial direction by allowing the linear motion guiding shafts 332a and 332b to slide in the respective linear motion guide bushes 334 and 336, while a rotation of the ball screw shaft 314 about the axial line P1 is restrained because the axial line P1 of the ball screw shaft 314 is decentered with respect to the axial lines P3 and P4 of the linear motion guiding shafts 332a and 332b supported in linear motion guide bushes 334 and 336, respectively.

In the linear actuator 340 according to the embodiment, therefore, a rotation about the axial line P1 of the ball screw shaft 314 can be restrained with a simple structure in the same manner as in the eighteenth embodiment illustrated in FIG. 32. Because the radially preloaded linear motion guiding shafts 332a and 332b are positioned separate from each other in the axial direction, the ball screw shaft 314 can be moved smoothly in the axial direction.

By using iron-based materials for the members other than the coils, insulating parts, and wiring parts in the brushless motor 346, adversary effects of thermal deformation resulting from a difference in the thermal expansions of the parts made of different materials can be reduced. Furthermore, because the O ring 360 is fitted between the linear motion guiding shaft 332a and the partitioning plate 358 provided to the bearing holder 342b, and the O ring 364 is fitted between the linear motion guiding shaft 332b and the partitioning plate 362 provided to the bearing holder 344b, the interior of the linear actuator 340 can be water-proofed.

The decentering distances e2 and e3 in the present embodiment do not need to be the same. Furthermore, linear ball bearings may be used instead of the linear motion guide bushes 334 and 336, as members for slidably supporting the linear motion guiding shafts 332a and 332b, respectively, in the axial direction.

Twentieth Embodiment

Figure 34:
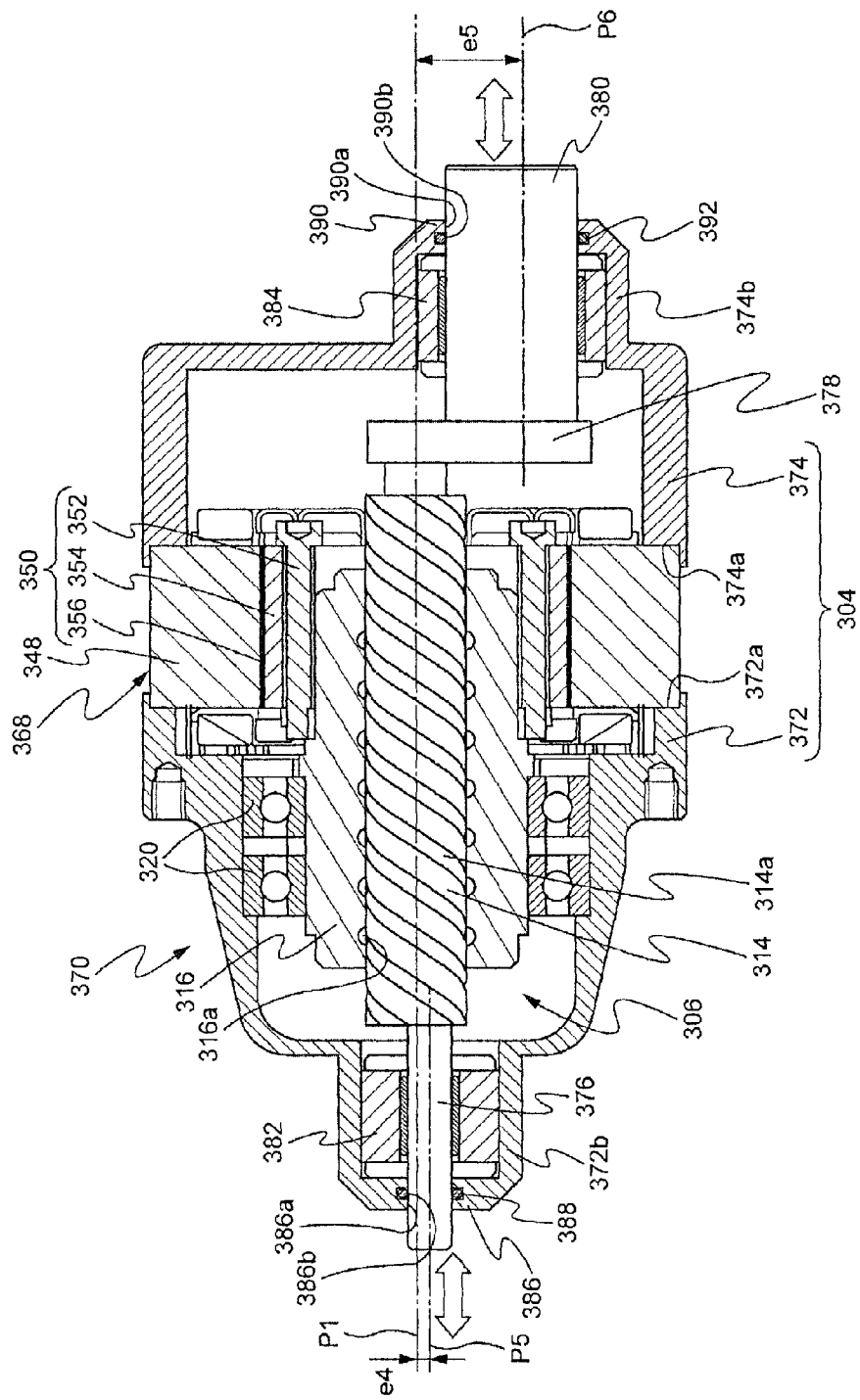
FIG. 34 is a cross-sectional view of a linear actuator according to a twentieth embodiment of the present invention.

FIG. 34 is a cross-sectional view of a linear actuator according to a twentieth embodiment of the present invention. The linear actuator illustrated in FIG. 34 is a linear actuator 370 according to the twentieth embodiment. The same elements as those in the embodiments described above are assigned with the same reference signs, and explanations thereof are omitted hereunder.

The linear actuator 370 according to the embodiment includes a brushless motor 368 that is a rotation driving unit positioned between a first casing part 372 and a second casing part 374 that together form the casing 304. A cylindrical bearing holder 372b is provided to one end of the first casing part 372 facing a large-diameter opening 372a in the axial direction. A cylindrical bearing holder 374b is provided to one end of the second casing part 374 facing a large-diameter opening 374a in the axial direction.

The brushless motor 368 includes a stator 348 and a rotor 350. The stator 348 has an approximately cylindrical shape, and is mounted between the large-diameter opening 372a of the first casing part 372 and the large-diameter opening 374a of the second casing part 374. The rotor 350 is positioned on the inner circumferential side of the stator 348, and includes the same members as those of the brushless motor 346 illustrated in FIG. 33. In the rotational-to-linear motion conversion mechanism 306 according to the embodiment, a linear motion guiding shaft 376 protrudes from one axial end of the ball screw shaft 314, and a linear motion guiding shaft 380 protrudes from the other axial end of the ball screw shaft 314 via a decentering member 378.

The axial line P5 of the linear motion guiding shaft 376, which is one of the linear motion guiding shafts, extends in parallel with and is decentered with respect to the axial line P1 of the ball screw shaft 314 by the decentering distance e4. The decentering distance e4 is a value smaller than the radius of the ball screw shaft 314. The decentering member 378 is a member extending from the other end of the ball screw shaft 314 in a direction perpendicular to the axial line P1. The other linear motion guiding shaft 380 is fixed to the tip of the decentering member 378. The axial line P6 of the linear motion guiding shaft 380 extends in parallel with and is decentered with respect to the axial line P1 of the ball screw shaft 314 by the decentering distance e5. The decentering distance e5 is a value larger than the radius of the ball screw shaft 314 but smaller than the diameter of the ball screw shaft 314. The external dimensions of the linear motion guiding shaft 380 are larger than those of the ball screw shaft 314.

The linear motion guide bush 382 fitted in the bearing holder 372b provided to the first casing part 372 slidably supports the linear motion guiding shaft 376 in the axial direction, and a linear motion guide bush 384 fitted in the bearing holder 374b provided to the second casing part 374 slidably supports the linear motion guiding shaft 380 in the axial direction. A partitioning plate 386 extending toward the linear motion guiding shaft 376 is integrated to the open end of the bearing holder 372b (on the left side in FIG. 34). The partitioning plate 386 has an insertion hole 386a through which the linear motion guiding shaft 376 is passed. An O ring mounting groove 386b is formed on the inner circumferential surface of the insertion hole 386a. An O ring 388 elastically deforming and cohering tightly with the linear motion guiding shaft 376 is fitted in the O ring mounting groove 386b.

A partitioning plate 390 extending toward the linear motion guiding shaft 380 is integrated to the open end of the bearing holder 374b (the right side in FIG. 34). The partitioning plate 390 has an insertion hole 390a through which the linear motion guiding shaft 380 is passed. An O ring mounting groove 390b is formed on the inner circumferential surface of the insertion hole 390. An O ring 392 elastically deforming and cohering tightly with linear motion guiding shaft 380 is fitted in the O ring mounting groove 390b.

The ball screw shaft 314 corresponds to the screw shaft according to the present invention. The ball screw nut 316 corresponds to the nut according to the present invention, and the linear motion guide bushes 382 and 384 correspond to the thrust bearing member according to the present invention. In the linear actuator 370 according to the embodiment, when a motor driving current is supplied to the multiple-phase coil of the stator 348 in the brushless motor 368, a rotating magnetic field is generated in the stator 348, by which the rotor 350 is driven in rotation, and the rotational force is communicated to the ball screw nut 316.

In the embodiment as well, the ball screw shaft 314 receiving the rotational force from the ball screw nut 316 is moved linearly in the axial direction by allowing the linear motion guiding shafts 376 and 380 to slide in the respective linear motion guide bushes 382 and 384, while the rotation of the ball screw shaft 314 about the axial line P1 is restrained because the axial line P1 of the ball screw shaft 314 is decentered with respect to the axial lines P5 and P6 of the respective linear motion guiding shafts 376 and 380 supported in the linear motion guide bushes 382 and 384, respectively.

A difference between the linear actuator 370 according to the embodiment and the linear actuator according to the other embodiments is in that the axial line P6 of the linear motion guiding shaft 380 extends in parallel with and is decentered with respect to the axial line P1 of the ball screw shaft 314 by the decentering distance e5 that is larger than the radius of the ball screw shaft 314 but smaller than the diameter of the ball screw shaft 314. By ensuring a large distance between the axial line P6 of the linear motion guiding shaft 380 and the axial line P1 of the ball screw shaft 314 as the decentering distance e5, a large radial preload is exerted on the linear motion guiding shaft 380, thereby allowing the radial stiffness to be improved, so that the ball screw shaft 314 can be moved smoothly in the axial direction.

Furthermore, the decentering member 378 extending perpendicularly to the axial line P1 of the ball screw shaft 314 is provided on the axial other end of the ball screw shaft 314, and the linear motion guiding shaft 380 is provided at the tip of the decentering member 378. In this manner, a linear motion output member can be provided at a position decentered with respect to the axial line P1 of the ball screw shaft 314 by a large distance. In this manner, it becomes possible to provide a linear actuator 370 in which the position of the linear motion output member can be easily modified.

Linear ball bearings may be used as members for supporting the linear motion guiding shafts 376 and 380 slidably in the axial direction, instead of the linear motion guide bushes 382 and 384.

Twenty-First Embodiment

Figure 35:
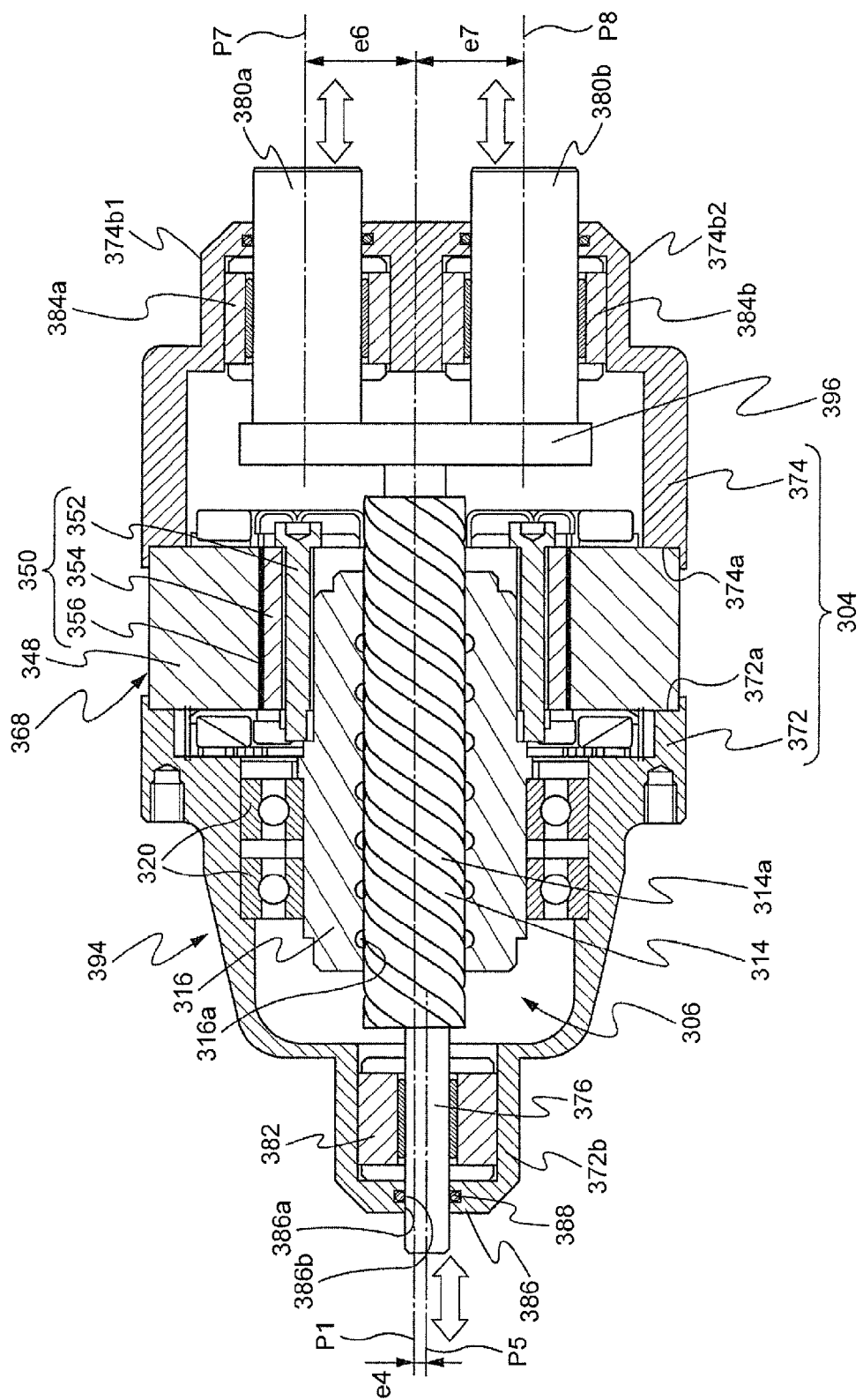
FIG. 35 is a cross-sectional view of a linear actuator according to a twenty-first embodiment of the present invention.

FIG. 35 is a cross-sectional view illustrating a linear actuator according to a twenty-first embodiment of the present invention. The linear actuator illustrated in FIG. 35 is a linear actuator 394 according to the twenty-first embodiment. The same elements as those in the embodiments described above are assigned with the same reference signs, and explanations thereof are omitted hereunder. In the linear actuator 394 according to the embodiment, a pair of bearing holders 374b1 and 374b2 are provided on one end of the second casing part 374 which is a part of the casing 304, the one end facing the large-diameter opening 374a in the axial direction.

In the rotational-to-linear motion conversion mechanism 306 according to the embodiment, a decentering member 396 is provided on the axial other end of the ball screw shaft 314, in a manner extending in a direction perpendicular to the axial line P1. A pair of linear motion guiding shafts 380a and 380b are then provided in a manner projecting from the decentering member 396. The axial line P7 of the linear motion guiding shaft 380a, which is one of the linear motion guiding shaft pair, extends in parallel with and is decentered with respect to the axial line P1 of the ball screw shaft 314 by a decentering distance e6. The decentering distance e6 is a value larger than the radius of the ball screw shaft 314. The external dimensions of the linear motion guiding shaft 380a are larger than those of the ball screw shaft 314.

The axial line P8 of the other linear motion guiding shaft 380b is line-symmetrically positioned with the one linear motion guiding shaft 380a with respect to the axial line P1 of the ball screw shaft 314, and extends in parallel with and is decentered with respect to the axial line P1 of the ball screw shaft 314 by a decentering distance e7. The decentering distance e7 is also a value larger than the radius of the ball screw shaft 314. The external dimensions of the linear motion guiding shaft 380b are also larger than those of the ball screw shaft 314.

The ball screw shaft 314 corresponds to the screw shaft according to the present invention. The ball screw nut 316 corresponds to the nut according to the present invention, and the linear motion guide bushes 382, 384a, and 384b correspond to the thrust bearing member according to the present invention. In the linear actuator 394 according to the embodiment, when a motor driving current is supplied to the multiple-phase coil of the stator 348 in the brushless motor 368, a rotating magnetic field is generated in the stator 384, by which the rotor 350 is driven in rotation, and the rotational force is communicated to the ball screw nut 316.

In the embodiment as well, the ball screw shaft 314 receiving the rotational force from the ball screw nut 316 is moved linearly in the axial direction by allowing the linear motion guiding shafts 376, 380a, and 380b to slide in the respective linear motion guide bushes 382, 384a, and 384b, while the rotation of the ball screw shaft 314 about the axial line P1 is restrained because the axial line P1 of the ball screw shaft 314 is decentered with respect to the axial lines P5, P7, and P8 of the respective linear motion guiding shafts 376, 380a, and 380b supported in linear motion guide bushes 382, 384a, and 384b, respectively.

According to the present embodiment, the pair of linear motion guiding shafts 380a and 380b are provided to the axial other end of the ball screw shaft 314. The axial line P7 of the linear motion guiding shaft 380a and the axial line P8 of the linear motion guiding shaft 380b are decentered by the decentering distances e6 and e7, respectively, which are large, with respect to the axial line P1 of the ball screw shaft 314. A large radial preload is thus exerted on the linear motion guiding shafts 380a and 380b, thereby allowing the radial stiffness to be improved, so that the ball screw shaft 314 can be moved smoothly in the axial direction.

Furthermore, the decentering member 396 extending perpendicularly to the axial line P1 of the ball screw shaft 314 is provided to the axial other end of the ball screw shaft 314, and the linear motion guiding shafts 380a and 380b are provided at the tip of the decentering member 396. In this manner, a linear motion output member can be provided to a position largely decentered with respect to the axial line P1 of the ball screw shaft 314. This structure can provide a linear actuator 394 in which the position of the linear motion output member can be easily modified.

The decentering distances e6 and e7 in the present embodiment do not need to be the same. The rotational-to-linear motion conversion mechanism 306 according to the embodiments described above includes the ball screw shaft 314 having the outer circumferential surface provided with the spiral groove 314a, the ball screw nut 316 having the inner circumferential surface provided with the spiral groove 316a, a large number of balls rolling through the ball rolling passage formed between the spiral groove 314a and the spiral groove 316a facing each other and provided on the ball screw shaft 314 and the ball screw nut 316, respectively. Alternatively, the rotational-to-linear motion conversion mechanism may be achieved by a shaft having the outer circumferential surface provided with a male thread, and a nut having the inner circumferential surface provided with a female thread.

The linear motion guiding shafts 318, 332a, 332b, 376, 380, 380a, and 380b integrated with the ball screw nut 316, the ball screw shaft 314, and the ball screw shaft 314 according to the embodiments are preloaded so that a highly stiff rotational-to-linear motion conversion mechanism 306 with less play can be provided. Furthermore, linear ball bearings may be used instead of the linear motion guide bushes 382, 384a, and 384b, as members for slidably supporting the linear motion guiding shaft 376, 380a, and 380b in the axial direction. Furthermore, in the example explained in the embodiments, the linear motion guiding shafts 376, 380a, and 380b are explained to have a circular cross section, but may have another shape, e.g., an oval shape, depending on the applications.

REFERENCE SIGNS LIST 1, 1a, 1b, 1c, 1d, 1e, 1f, 1g, 1h, 1i, 1j, 1k, 1l actuator
1A motor
10, 11B rotating body
11A lid
11, 111 plate
12 fixing member
13 hole
14 flange
14A linearly moving member
15, 15A ball screw shaft
16, 16A stopper
17, 43 slider
18, 44, 44A linear bush
19 linear motion guiding mechanism
20 housing
21 housing base
22 housing inner protrusion
23 recess
30 stator
31 stator core
32, 32A, 32B magnetizing coil
34 coil insulator
35H bolt fastening hole
35 support member
36 outer teeth
36a teeth
37 back yoke
37A inner back yoke
37B outer back yoke
38 inner teeth
39A slit
39B connecting portion
40 second rotor
41, 41c, 51, 51c rotor core
41H bolt fastening hole
41p magnet
41a, 51a teeth
42, 42A, 42B second rotor bracket
43 slider
44 linear bush
45 support member
46 linear motion guiding mechanism
50 first rotor
51H bolt fastening hole
51p magnet
51a teeth
52 nut
52A central rotating body
52 nut
53 first rotor bracket
54 fastening member
55, 55A fixing flange
61, 61A, 61B third bearing
62 second bearing
63, 63A, 63B first bearing
64 magnetic body
65 magnet
71, 74, 74A the angle detector
72, 75, 75A resolver stator
73, 76, 76A resolver rotor
90 controller
95 support
96 loaded table
97 workpiece
100 actuator device
101 second rotating body
Zr rotational center
302, 330, 340, 370, 394 linear actuator
304 casing
306 rotational-to-linear motion conversion mechanism
308 rotation driving unit
310, 342, 372 first casing part
310a, 312a, 342a, 344a, 372a, 374a large-diameter opening
310b, 312b, 342b, 344b, 372b, 374b, 374b1, 374b2 bearing holder
312, 344, 374 second casing part
314 ball screw shaft
314a spiral groove
316 ball screw nut
316a spiral groove
318, 332a, 332b, 376, 380, 380a, 380b linear motion guiding shaft
320 radial bearing
322, 334, 336, 382, 384, 384a, 384b linear motion guide bush
324 driven pulley
326 endless belt
346, 368 brushless motor
348 stator
350 rotor
352 rotor core
354 magnet
356 rotor cover
358, 362, 386, 390 partitioning plate
358a, 362a, 362b, 386a, 390a insertion hole
358b, 362b, 386b, 390b O ring mounting groove
360, 364, 388, 392 O ring
378, 396 decentered member
e1 to e7, e10, e11 decentered distance
P1 to P8, P10, P11 axial line IT inner circumferential circle
OT outer circumferential circle

The invention claimed is:

1. An actuator comprising:
   a stator including a magnetizing coil and a stator core;
   a housing on which the stator is fixed;
   a first rotor that is positioned radially internal to the stator and is rotated relatively to the stator;
   a screw shaft that is a rod-like member positioned at rotational center of the first rotor, at least a part of a surface of the screw shaft having a thread;
   a nut that is screwed onto the thread of the screw shaft and rotates with the first rotor to move the screw shaft in a linear motion direction that is a direction in parallel with the rotational center of the first rotor;
   a second rotor that is positioned radially external to the stator and is rotated relatively to the stator;
   a first bearing that rotatably supports the first rotor with respect to the housing;
   a second bearing that rotatably supports the second rotor with respect to the first rotor;
   a rotating body that is rotated with the second rotor;
   a flange that is fixed to the screw shaft;
   a third hearing that rotatably supports the second rotor with respect to the flange; and
   a linear motion guiding mechanism that guides motion of the rotating body in the linear motion direction, wherein
   the linear motion guiding mechanism is rotated with the second rotor to cause the rotating body to rotate.

2. The actuator according to claim 1, wherein the rotational center of the first rotor and the rotational center of the second rotor are positioned in parallel with and offset from each other.

3. The actuator according to claim 2, wherein
   the stator comprises:
      a circular back yoke including: a plurality of slits that are voids arranged in a circumferential direction; an inner back yoke that is radially internal to the slits; an outer back yoke that is radially external to the slits; and a connecting portion that connects the inner back yoke and the outer back yoke and is provided between adjacent slits in the circumferential direction;
      a plurality of inner teeth circumferentially provided and protruding from the inner back yoke toward radial interior; and
      a plurality of outer teeth circumferentially provided and protruding from the outer back yoke toward radial exterior.

4. The actuator according to claim 3, wherein the inner teeth and the outer teeth on a radial extension are separated by the voids of the slits.

5. The actuator according to claim 4, wherein the slits extend circumferentially toward a base portion of an inner tooth and a base portion of an outer tooth that are adjacent to the inner tooth and the outer tooth on a radial extension.

6. The actuator according to claim 3, wherein a circumferential width of the slits is longer than a circumferential width of the connecting portion.

7. The actuator according to claim 3, wherein magnetic fluxes generated in the inner teeth or the outer teeth saturate at the connecting portion.

8. The actuator according to claim 3, wherein a through-hole for fixing the stator is provided between adjacent slits in the circumferential direction.

9. The actuator according to claim 2, further comprising a linear motion guiding shaft that guides motion of the rotating body in the linear motion direction, wherein
   the linear motion guiding shaft has an axial line that is decentered with respect to and extends in parallel with an axial line of the screw shaft.

10. The actuator according to claim 9, wherein the linear motion guiding shaft is provided in a manner projecting from both ends of the axial direction of the screw shaft.

11. The actuator according to claim 9, wherein a distance by which the axial line of the linear motion guiding shaft is decentered with respect to the axial line of the screw shaft is larger than a radius of the screw shaft.

12. The actuator according to claim 9, wherein a plurality of linear motion guiding shafts decentered with respect to and extending in parallel with the axial line of the screw shaft are provided to at least one of one end and the other end of the screw shaft in the axial direction.

13. The actuator according to claim 1, wherein frictional torque of the second bearing is smaller than frictional torque of the third bearing.

14. The actuator according to claim 1, wherein the linear motion guiding mechanism becomes extended or shrunk correspondingly to a distance by which the screw shaft moves in the linear motion direction.

15. The actuator according to claim 1, wherein
   the rotating body includes a cylindrical portion having a larger radius from the rotational center of the second rotor than the radius of the second rotor, and
   the linear motion guiding mechanism is positioned between the cylindrical portion and the second rotor to guide motion of the cylindrical portion in the linear motion direction.

16. The actuator according to claim 1, further comprising a second linear motion guiding mechanism that guides motion of the screw shaft in the linear motion direction, in addition to the linear motion guiding mechanism serving as a first linear motion guiding mechanism, wherein
   the first linear motion guiding mechanism and the second linear motion guiding mechanism are positioned with the stator interposed between the first and second linear motion guiding mechanisms in the linear motion direction.

17. The actuator according to claim 1, wherein the screw shaft is moved in the linear motion direction relatively to the housing.

* * * * *